(12) United States Patent
Kim

(10) Patent No.: US 12,105,390 B2
(45) Date of Patent: Oct. 1, 2024

(54) DISPLAY DEVICE

(71) Applicant: Samsung Display Co., Ltd., Yongin-Si (KR)

(72) Inventor: In Woo Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 30 days.

(21) Appl. No.: 17/177,251

(22) Filed: Feb. 17, 2021

(65) Prior Publication Data
US 2021/0373377 A1 Dec. 2, 2021

(30) Foreign Application Priority Data
May 29, 2020 (KR) .................. 10-2020-0065015

(51) Int. Cl.
*G02F 1/1362* (2006.01)
*G02F 1/1368* (2006.01)

(52) U.S. Cl.
CPC .... *G02F 1/13629* (2021.01); *G02F 1/136204* (2013.01); *G02F 1/136295* (2021.01); *G02F 1/1368* (2013.01); *G02F 2202/103* (2013.01)

(58) Field of Classification Search
CPC ............. G02F 1/136204; G02F 1/1345; G02F 1/1368; G02F 1/136295; G02F 1/13629; G02F 2202/103; G02F 1/136286; G02F 1/13458; G02F 1/13452; G02F 1/133345; G02F 1/13454; G02F 1/133388; G02F 1/136263; G09G 3/3648; G09G 3/3233; G09G 2300/0426; G09G 3/3266; G09G 3/36; G09G 2310/027; G09G 3/3225; G09G 3/3696; G09G 2310/0267; G09G 3/3275; G09G 3/3674; G09G 3/3685; G09G 2300/0876; G09G 3/2092; G09G 2300/08
See application file for complete search history.

(56) References Cited

U.S. PATENT DOCUMENTS 5,835,177 A * 11/1998 Dohjo .................. G02F 1/1345
257/E27.111
6,011,309 A * 1/2000 Ahn ..................... H01L 23/5226
257/776
(Continued)

FOREIGN PATENT DOCUMENTS

JP 2005099861 A * 4/2005
KR 10-1897747 B1 10/2018

*Primary Examiner* — Hoan C Nguyen
(74) *Attorney, Agent, or Firm* — Innovation Counsel LLP

(57) ABSTRACT

A display device includes a lower substrate, a light emitting structure, a lower wire, an upper wire, an insulating layer, and a connection pattern. The light emitting structure is disposed in a display area on the lower substrate. The lower wire is disposed in a peripheral area on the lower substrate. The upper wire is disposed on the lower wire, and partially overlaps the lower wire. The insulating layer structure includes a first contact hole that exposes a first portion of the upper wire, which overlaps the lower wire, and a first portion of the lower wire, which is adjacent to a portion of the lower wire that overlaps the upper wire. The connection pattern is disposed on the insulating layer structure, the lower wire, and the upper wire, and electrically connects the upper wire to the lower wire through the first contact hole.

20 Claims, 38 Drawing Sheets

(56) References Cited

U.S. PATENT DOCUMENTS

| | | | | |
|---|---|---|---|---|
| 6,163,356 | A | * | 12/2000 | Song ..................... G02F 1/1345 |
| | | | | 438/30 |
| 6,690,442 | B1 | * | 2/2004 | Kohtaka ............... G02F 1/1345 |
| | | | | 349/149 |
| 6,929,392 | B2 | | 8/2005 | Kim et al. |
| 6,950,159 | B2 | | 9/2005 | Kubo et al. |
| 7,259,810 | B2 | | 8/2007 | Kim |
| 9,244,317 | B2 | * | 1/2016 | Ogasawara ......... G02F 1/13454 |
| 10,930,680 | B2 | * | 2/2021 | Kang .................. H01L 27/1255 |
| 2009/0016001 | A1 | * | 1/2009 | Miyakawa ........ G02F 1/133555 |
| | | | | 445/25 |
| 2012/0248443 | A1 | * | 10/2012 | Katsui ................... H01L 27/124 |
| | | | | 438/479 |
| 2013/0009160 | A1 | * | 1/2013 | Katsui ................ H01L 27/1248 |
| | | | | 257/59 |
| 2017/0084631 | A1 | * | 3/2017 | Kim ..................... H01L 27/124 |

\* cited by examiner

FIG. 4
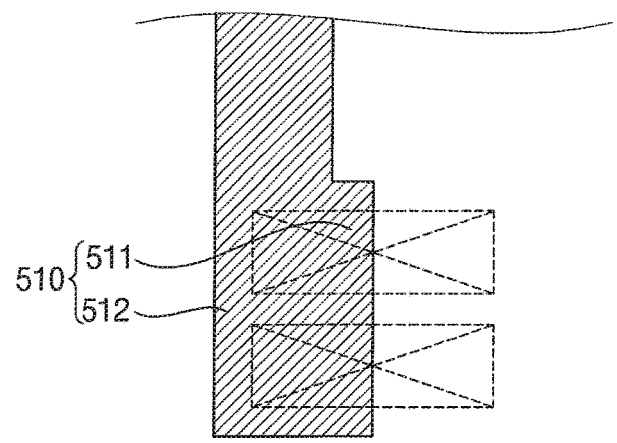
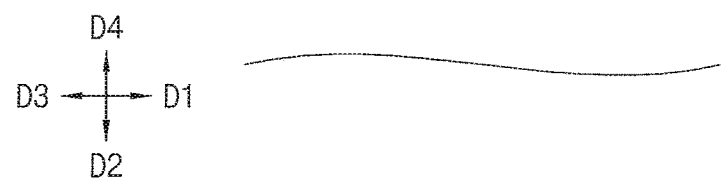
FIG. 5
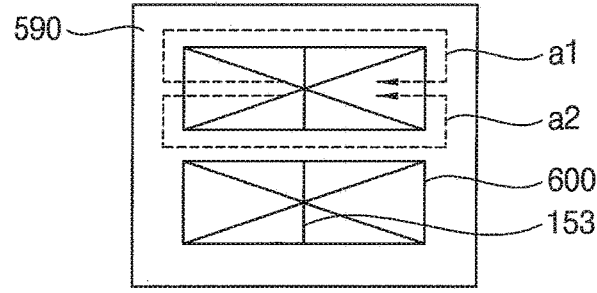
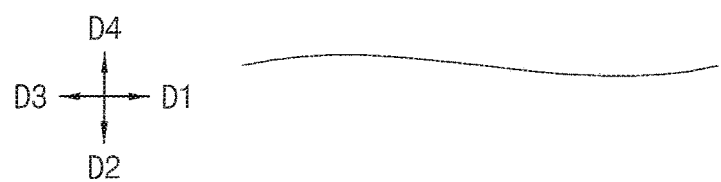

FIG. 25
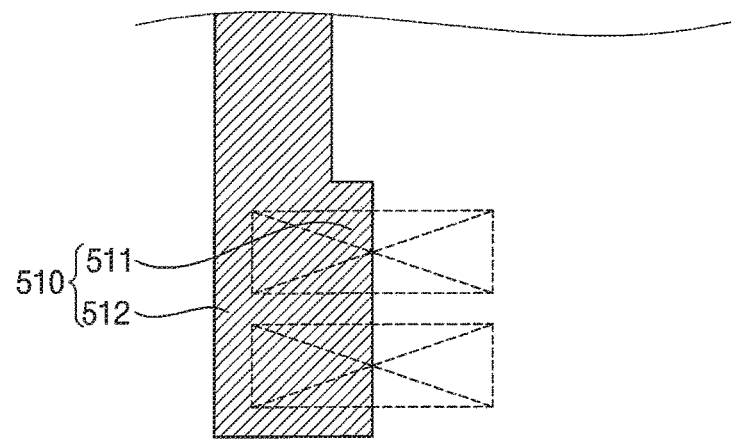
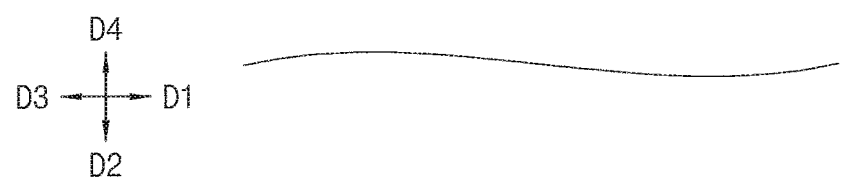
FIG. 26
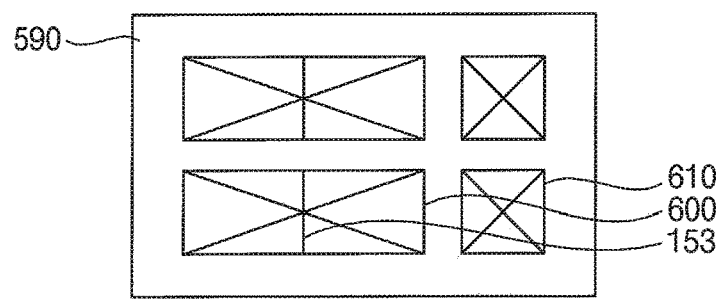
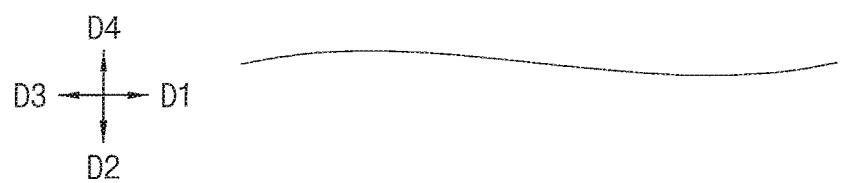

FIG. 36
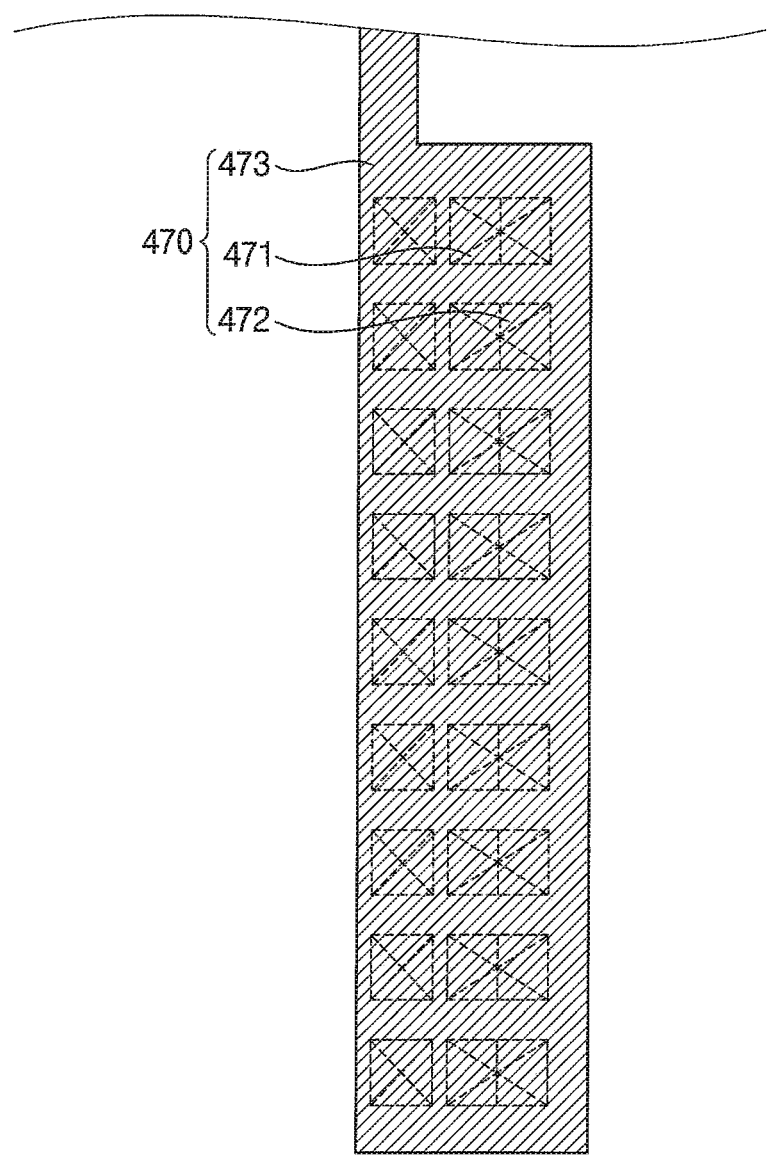
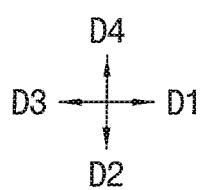

FIG. 40
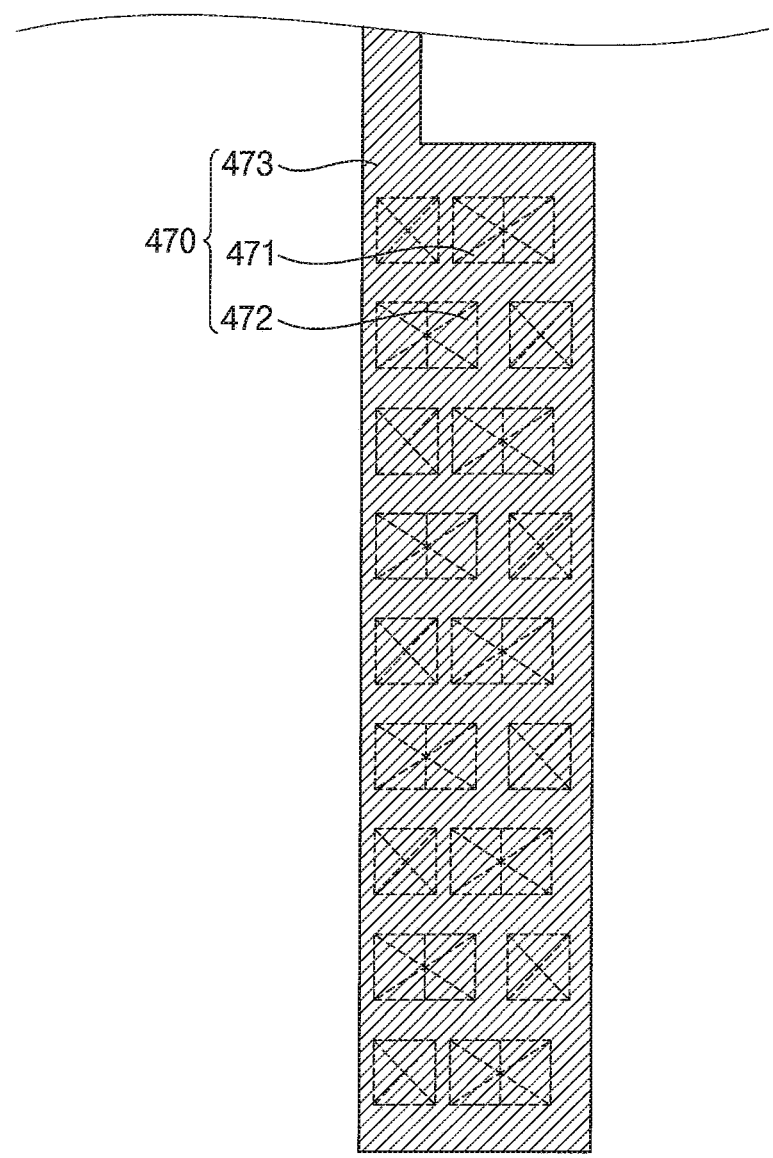
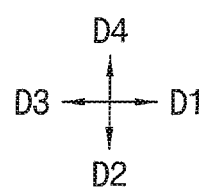

DISPLAY DEVICE

CROSS-REFERENCE TO RELATED APPLICATION

This application claims priority under 35 USC § 119 to Korean Patent Application No. 10-2020-0065015 filed on May 29, 2020 in the Korean Intellectual Property Office (KIPO), the entire disclosure of which is incorporated herein by reference.

BACKGROUND

1. Field

Embodiments relate generally to a display device. More particularly, embodiments of the present inventive concept relate to a display device including a wire.

2. Description of the Related Art

Flat panel display devices are used as display devices for replacing a cathode ray tube display device due to light-weight and thin characteristics of the flat panel display devices. As representative examples of such flat panel display devices, there are a liquid crystal display device and an organic light emitting diode display device.

The display device may include a display area for displaying an image, and a peripheral area in which a gate driver, an electrostatic diode circuit part, signal and power lines, a pad electrode, and the like are disposed. The gate driver and the electrostatic diode circuit part may be electrically connected to the pad electrode through the signal and power lines. Each of the gate driver and the electrostatic diode circuit part may include transistors, and the transistors and the signal and power lines may be electrically connected to each other. In this case, the signal and power lines may be formed by using a gate electrode pattern and a source/drain electrode pattern. As the gate electrode pattern and the source/drain electrode pattern are disposed on different layers, the gate electrode pattern and the source/drain electrode pattern may be electrically connected to each other through a contact hole and a connection pattern. However, since the gate electrode pattern and the source/drain electrode pattern are spaced apart from each other, and a contact hole is formed in each of the gate electrode pattern and the source/drain electrode pattern, an area of the peripheral area may be relatively increased.

SUMMARY

Some embodiments provide a display device including a wire.

According to some embodiments, a display device includes a lower substrate, a light emitting structure, a lower wire, an upper wire, an insulating layer, and a connection pattern. The lower substrate includes a display area and a peripheral area. The light emitting structure is disposed in the display area on the lower substrate. The lower wire is disposed in the peripheral area on the lower substrate. The upper wire is disposed on the lower wire, and partially overlaps the lower wire. The insulating layer structure includes a first contact hole that exposes a first portion of the upper wire, which overlaps the lower wire, and a first portion of the lower wire, which is adjacent to a portion of the lower wire that overlaps the upper wire. The connection pattern is disposed on the insulating layer structure, the lower wire, and the upper wire, and electrically connects the upper wire to the lower wire through the first contact hole.

In embodiments, the insulating layer structure may include a gate insulating layer and an interlayer insulating layer. The gate insulating layer may be disposed on the lower substrate, and may include a first opening that exposes the first portion of the lower wire. The interlayer insulating layer may be disposed on the gate insulating layer, and may include a second opening that exposes the first portion of the upper wire and the first portion of the lower wire.

In embodiments, the first opening may expose a part of a bottom surface of the first portion of the upper wire.

In embodiments, the first opening and the second opening may be defined as the first contact hole of the insulating layer structure.

In embodiments, the lower wire may further include a second portion and a third portion. The second portion may be covered with the gate insulating layer, and may overlap the upper wire. The third portion may be covered with the gate insulating layer, and may be spaced apart from the second portion of the lower wire in a first direction parallel to a top surface of the lower substrate.

In embodiments, the first and second portions of the lower wire may be located inside the first contact hole, and the third portion may be located outside the first contact hole.

In embodiments, when viewed in a sectional view of the display device, the first portion of the lower wire may protrude from the third portion of the lower wire in a third direction opposite to the first direction, and the second portion of the lower wire may protrude from the first portion of the lower wire in the third direction.

In embodiments, the upper wire may further include a second portion covered with the interlayer insulating layer. The connection pattern may be disposed on a top surface of the interlayer insulating layer disposed on a portion under which the second portion of the upper wire is located, the first portion of the upper wire, the first portion of the lower wire, and a top surface of the interlayer insulating layer disposed on a portion under which the third portion of the lower wire is located.

In embodiments, the connection pattern may have an opening at a boundary between the first portion of the upper wire and the first portion of the lower wire in the first contact hole.

In embodiments, when viewed in a sectional view of the display device, the first portion of the upper wire may protrude from the second portion of the upper wire in the first direction.

In embodiments, the insulating layer structure may further include a second contact hole spaced apart from the first contact hole in the first direction.

In embodiments, the second contact hole may overlap the third portion of the lower wire.

In embodiments, the connection pattern may be electrically connected to the third portion of the lower wire through the second contact hole.

In embodiments, the connection pattern may include a first connection pattern located on the first portion of the upper wire and a second connection pattern located on the first portion of the lower wire. The first connection pattern and the second connection pattern may be spaced apart from each other in the first contact hole.

In embodiments, a size of the connection pattern may be greater than a size of the first contact hole.

In embodiments, when viewed in a plan view of the display device, the connection pattern may extend to an outer periphery of the first contact hole to cover the first contact hole.

In embodiments, the connection pattern may include an opening in the first contact hole.

In embodiments, the display device may further include a semiconductor element disposed between the light emitting structure and the lower substrate in the display area of the lower substrate. The semiconductor element may include a gate electrode disposed on the lower substrate, an active layer disposed on the gate electrode, a source electrode contacting a first portion of the active layer, and a drain electrode contacting a second portion of the active layer. The lower wire may be located on a same layer as the gate electrode, and the upper wire may be located on a same layer as the source and drain electrodes.

In embodiments, the active layer may include amorphous silicon.

In embodiments, the display device may further include an active pattern disposed between the upper wire and the lower wire. The active pattern may contact a bottom surface of the upper wire.

In the display device according to the embodiments, at least a part of each of the lower wire and the upper wire overlap each other, so that the lower wire and the upper wire may partially overlap each other in a portion where the contact hole is formed, and the connection pattern may be electrically connected to each of the lower wire and the upper wire through one contact hole. In other words, since the contact hole is configured to simultaneously connect the lower wire to the upper wire, a width in which the lower wire, the upper wire, and the connection pattern are arranged in the first direction may be relatively reduced. In addition, since the contact hole has the same size as an area in which two conventional contact holes are formed, a contact resistance between the connection pattern and the lower and upper wires may not be increased. Accordingly, an area of the peripheral area of the display device may be relatively reduced.

In the display device according to the embodiments, at least a part of each of the lower wire and the upper wire overlap each other, so that the lower wire and the upper wire may partially overlap each other in a portion where the first contact hole is formed, and the connection pattern may be electrically connected to each of the lower wire and the upper wire through one contact hole. In addition, the connection pattern may be electrically connected to the lower wire through the second contact hole formed in the third portion of the lower wire. In other words, although the connection pattern having the same width as in the related art is disposed, the number of contact holes may be relatively increased. Accordingly, the contact resistance between the connection pattern and the lower and upper wires may be relatively reduced.

BRIEF DESCRIPTION OF THE DRAWINGS

Embodiments can be understood in more detail from the following description taken in conjunction with the accompanying drawings.

FIGS. 3, 4, and 5 are layout views showing the lower wire, the upper wire, and the connection electrode of FIG. 2, respectively.

FIGS. 24, 25, and 26 are layout views showing a lower wire, an upper wire, and a connection electrode of FIG. 23, respectively.

FIGS. 36, 37, and 38 are layout views showing a lower wire, an upper wire, and a connection electrode of FIG. 35, respectively.

FIGS. 40, 41, and 42 are layout views showing a lower wire, an upper wire, and a connection electrode of FIG. 39, respectively.

DETAILED DESCRIPTION OF THE EMBODIMENTS

Figure 1:
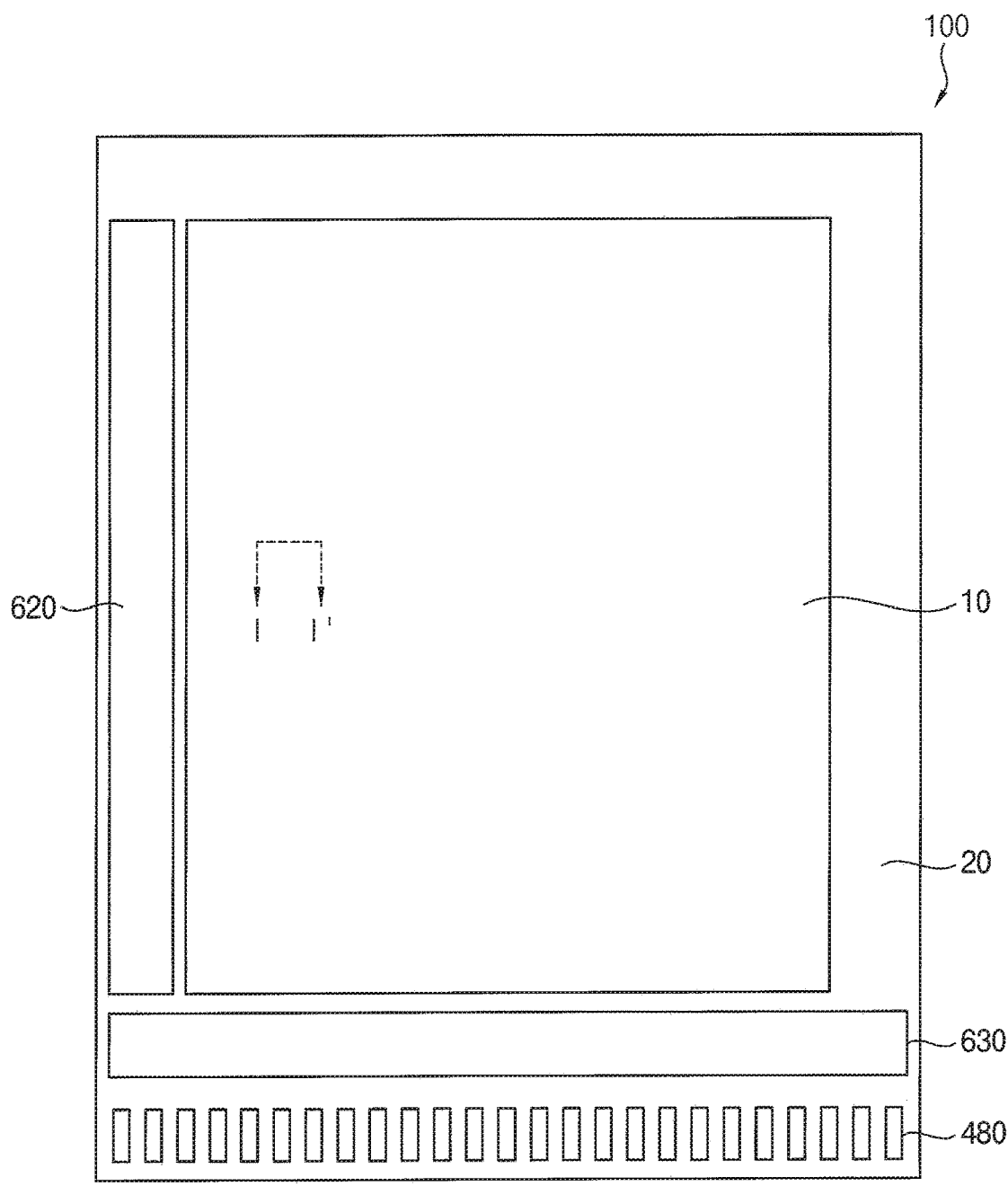
FIG. 1 is a plan view showing a display device according to embodiments.

Hereinafter, display devices and a method of manufacturing a display device according to embodiments will be described in detail with reference to the accompanying drawings. In the accompanying drawings, same or similar reference numerals refer to the same or similar elements.

FIG. 1 is a plan view showing a display device 100 according to embodiments.

Referring to FIG. 1, the display device 100 may include a display area 10 and a peripheral area 20. For example, the peripheral area 20 may surround the display area 10.

Figure 8:
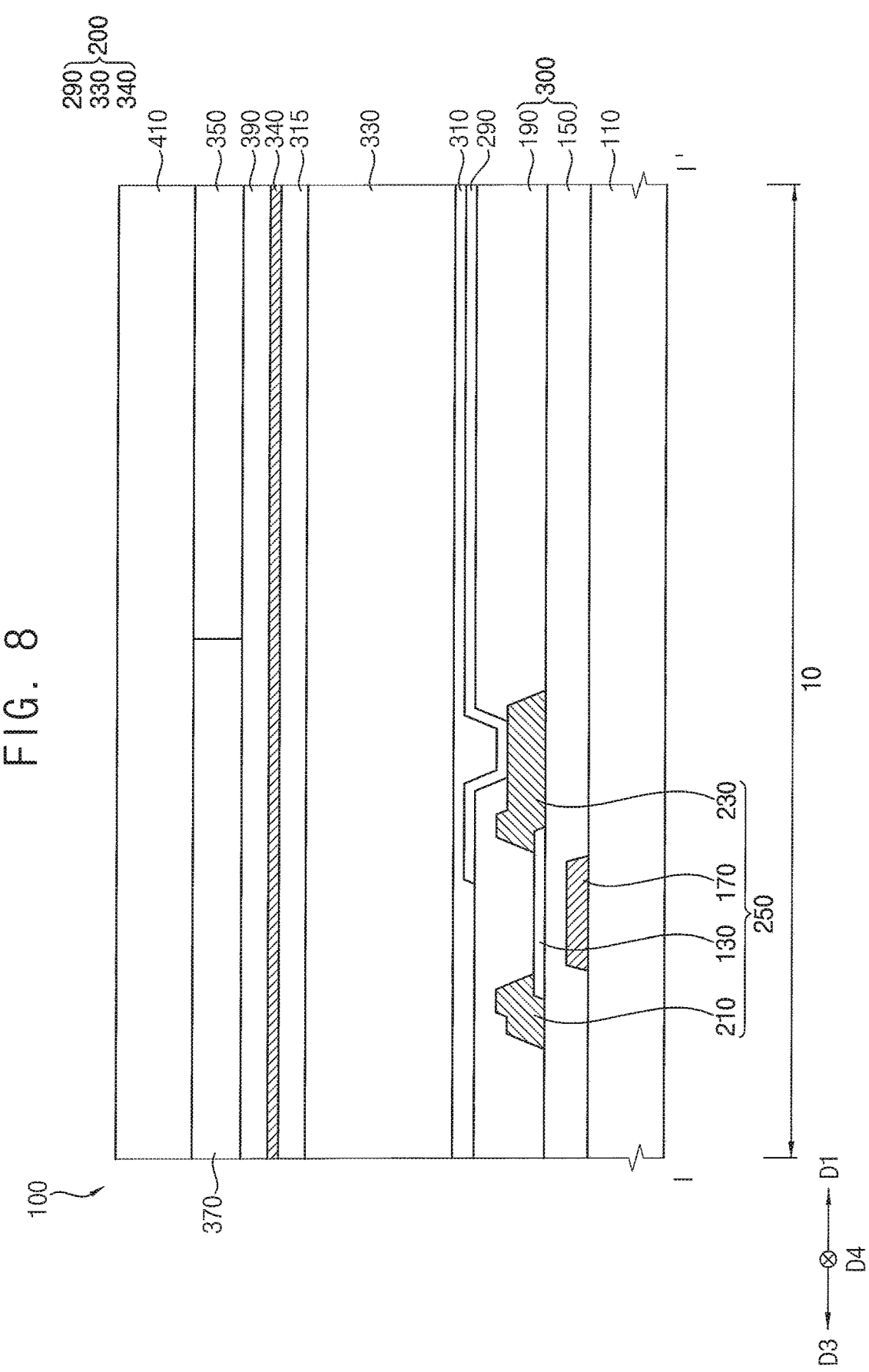
FIG. 8 is a sectional view taken along line I-I' of FIG. 1.

Light emitting structures, e.g., a light emitting structure 200 of FIG. 8, may be disposed in the display area 10. An image may be displayed in the display area 10 through the light emitting structures.

The peripheral area 20 may be a non-display area. A circuit structure 620 may be disposed on one side of the peripheral area 20, e.g., the peripheral area 20 adjacent to a left portion of the display area 10 in the view of FIG. 1. For example, the circuit structure 620 may be a gate driver, and may include transistors, capacitors, and signal lines, e.g., gate signal lines, clock signal lines, and similar lines.

In addition, pad electrodes 480 may be disposed on another side of the peripheral area 20, e.g., the peripheral area 20 adjacent to a lower portion of the display area 10 in the view of FIG. 1. Although the terms top, bottom, upper, lower, and similar terms may be used to describe features, the terms are relative directions and do not have a gravitational reference. The pad electrodes 480 may be arranged in a first direction D1 parallel to a top surface of the display device 100. The pad electrodes 480 may be electrically connected to an external device capable of generating a plurality of signals, e.g., gate signals, data signals, clock signals, power supply voltages, and similar signals, and the signals may be transmitted to the circuit structure 620 and the light emitting structures through the pad electrodes 480.

Moreover, an antistatic structure 630 may be disposed between the display area 10 and the pad electrodes 480 in the peripheral area 20. In other words, the antistatic structure 630 may be spaced apart from the pad electrodes 480 in a second direction D2 orthogonal to the first direction D1. The antistatic structure 630 may include diodes, wires, and the like. The clock signal, the gate signal, and the like may be provided to the circuit structure 620 through the antistatic structure 630. The gate signal may be provided to the light emitting structure through the circuit structure 620. The data signal, the power supply voltage, and the like may be provided to the light emitting structure through the antistatic structure 630. For example, when static electricity generated in a manufacturing process of the display device 100 penetrates into the light emitting structure and the circuit structure 620 through wires, the light emitting structure and the circuit structure 620 may be damaged by the static electricity. To prevent such damage, the antistatic structure 630 may be disposed in the peripheral area 20 of the display device 100.

In embodiments, in the peripheral area 20, wires configured to connect the pad electrode 480 to the diodes included in the antistatic structure 630, wires configured to connect the diodes to the light emitting structure, wires configured to connect the diodes to the gate signal lines and the clock signal lines included in the circuit structure 620, the gate signal lines configured to apply the gate signals to the transistors included in the circuit structure 620, the clock signal lines configured to apply the clock signals to the transistors, and the like may be connected to each other by one wire, or may be connected to each other by two wires electrically connected to each other through a contact hole. When the two wires, e.g., a first wire and a second wire disposed on a layer different from a layer on which the first wire is disposed, are electrically connected to each other through the contact hole, the first wire and the second wire may be spaced apart from each other, and a connection pattern may be disposed on the contact hole to electrically connect the first and second wires to each other. In addition, a plurality of contact holes may be formed to reduce a contact resistance between the first and second wires. Moreover, a plurality of contact holes may be formed in the transistors included in the circuit structure 620 and the diode included in the antistatic structure 630.

Although the clock signal and the gate signal have been described as being provided to the circuit structure 620 via the antistatic structure 630 in the display device 100, in other embodiments, other configurations are possible. For example, the clock signal and the gate signal may be directly provided to the circuit structure 620 without passing through the antistatic structure 630.

In addition, although each of the display area 10 and the peripheral area 20 has been described as having a rectangular shape when viewed in a plan view, in other embodiments, other configurations are possible. For example, each of the display area 10 and the peripheral area 20 may have a triangular shape, a rhombic shape, a polygonal shape, a circular shape, a track shape, or an elliptical shape when viewed in a plan view.

Figure 2:
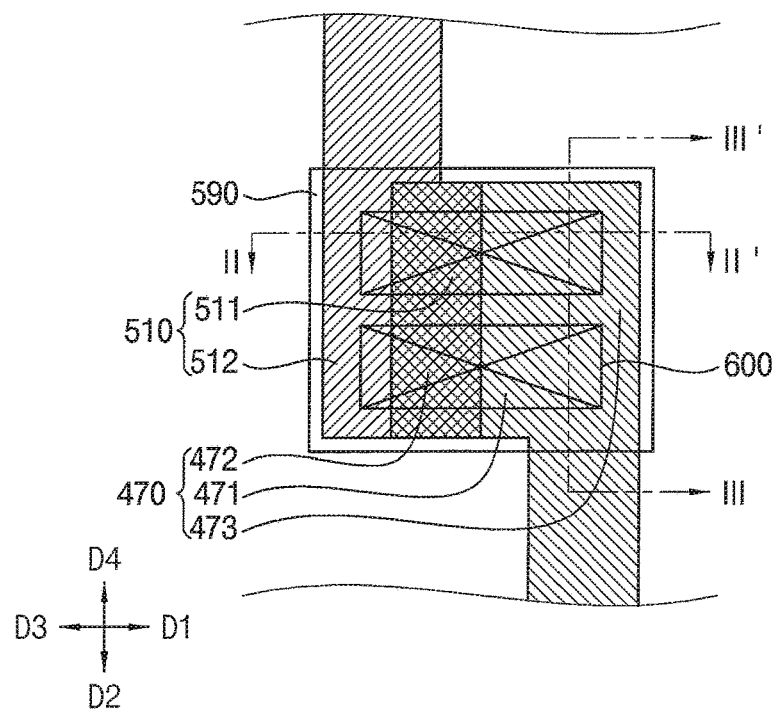
FIG. 2 is a plan view for describing an upper wire, a lower wire, and a connection electrode disposed in a peripheral area of the display device of FIG. 1.
Figure 3:
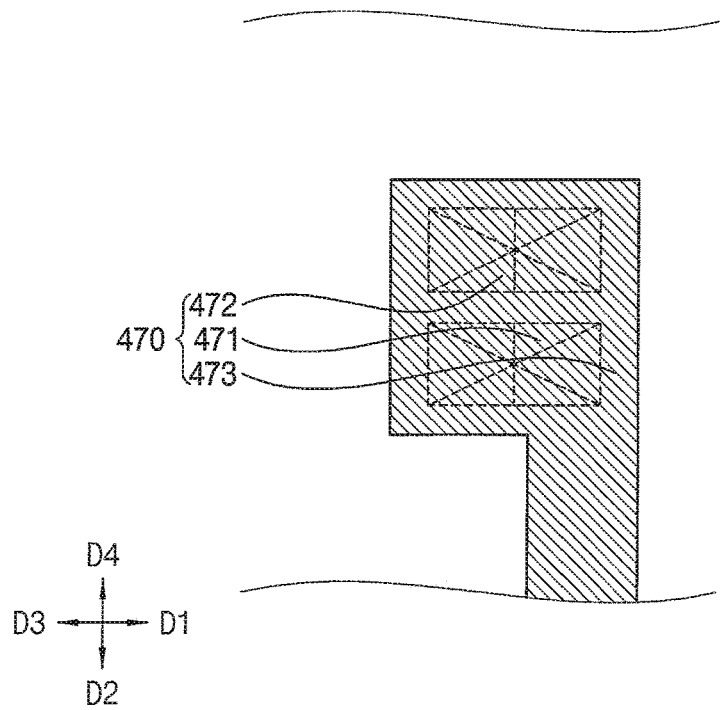

FIG. 2 is a plan view for describing an upper, e.g., first, wire 510, a lower, e.g., second, wire 470, and a connection electrode 590, also called a connection pattern 590, disposed in a peripheral area of the display device of FIG. 1. FIGS. 3, 4, and 5 are layout views showing the lower wire 470, the upper wire 510, and the connection electrode 590 of FIG. 2, respectively.

Referring to FIGS. 2, 3, 4, and 5 together, the display device 100 may include the lower wire 470, the upper wire 510, the connection pattern 590, and the like. In this case, the lower wire 470 may include a first portion 471, a second portion 472, and a third portion 473. The upper wire 510 may include a first portion 511 and a second portion 512.

The lower wire 470, the upper wire 510, and the connection pattern 590 may be disposed in the peripheral area 20 of the display device 100. For example, as described in FIG. 1, in the peripheral area 20, the wires configured to connect the pad electrode 480 to the diodes included in the antistatic structure 630, the wires configured to connect the diodes to the light emitting structure, the wires configured to connect the diodes to the gate signal lines and the clock signal lines included in the circuit structure 620, the gate signal lines configured to apply the gate signals to the transistors included in the circuit structure 620, and the clock signal lines configured to apply the clock signals to the transistors may include the lower wire 470 and the upper wire 510. The connection pattern 590 may electrically connect the lower wire 470 to the upper wire 510 through a contact hole 600.

As shown in FIGS. 2 and 3, when viewed in a plan view of the display device 100, the third portion 473 of the lower wire 470 may have a rectangular shape, and one part of the third portion 473 may extend in the second direction D2. For example, the one part of the third portion 473 may extend in the second direction D2 so as to be connected to the pad electrode 480. A portion of the lower wire 470 that is located in the contact hole 600 and does not overlap the upper wire 510 may be defined as the first portion 471. A portion of the lower wire 470 that is located in the contact hole 600 and overlaps the upper wire 510 may be defined as the second portion 472. Therefore, a remaining portion of the lower wire 470 except for a portion where the contact hole 600 is located, e.g., the first portion 471 and the second portion 472, may be defined as the third portion 473. For example, the second portion 472 may correspond to a portion that is not exposed by the contact hole 600, and the first portion 471 may correspond to a portion that is exposed by the contact hole 600.

As shown in FIGS. 2 and 4, the upper wire 510 may be disposed on the lower wire 470. When viewed in a plan view of the display device 100, the second portion 512 of the upper wire 510 may have a rectangular shape, and one part of the second portion 512 may extend in a fourth direction D4 opposite to the second direction D2. For example, the one part of the second portion 512 may extend in the fourth direction D4 so that the one part of the second portion 512 may be connected to the transistor of the circuit structure 620, the clock signal line and the gate signal line, or the diode of the antistatic structure 630. The upper wire 510 located in the contact hole 600 may be defined as the first portion 511, and the first portion 511 may correspond to a portion that overlaps the lower wire 470, or a portion exposed by the contact hole 600. Therefore, a remaining portion of the upper wire 510 except for a portion where the contact hole 600 is located, e.g., the first portion 511, may be defined as the second portion 512.

As shown in FIGS. 2 and 5, the connection pattern 590 may be disposed on the upper wire 510. The connection pattern 590 may electrically connect the lower wire 470 to the upper wire 510 through the contact hole 600. In the embodiments, the connection pattern 590 may have an opening 153 at a boundary between the first portion 511 of the upper wire 510 and the first portion 471 of the lower wire 470 in the contact hole 600. Due to the opening 153, a current may not flow through the connection pattern 590 in the first direction D1 within the contact hole 600, but the current may flow through a first path a1 and a second path a2. In other words, the first path a1 and the second path a2 may be one example of a current carrying path. Accordingly, even when the opening 153 is formed in the connection pattern 590, the lower wire 470 and the upper wire 510 may be electrically connected to each other by the connection pattern 590.

For example, in a conventional display device, a lower wire may extend in the second direction D2, and an upper wire may extend in the fourth direction D4. The lower wire and the upper wire may be spaced apart from each other. In other words, the lower wire and the upper wire may not overlap each other. To electrically connect the lower wire to the upper wire, a connection pattern may be disposed on the lower and upper wires to overlap a second end of the lower wire and a second end of the upper wire. In this case, a first contact hole may be formed in a portion where the connection pattern overlaps the lower wire, and a second contact hole may be formed in a portion where the connection pattern overlaps the upper wire. In this case, due to a process margin for forming the first and second contact holes, a width of each of the lower and upper wires has to be relatively large in the portions where the first and second contact holes are formed. In other words, a protrusion has to be formed on each of the upper wire and the lower wire in the portions where the first and second contact holes are formed. Therefore, the lower and upper wires may not overlap each other, and due to the process margin for forming the first and second contact holes, a wire connection space in which the lower and upper wires are disposed may have a relatively large width in the first direction D1, or a third direction D3 opposite the first direction D1. In addition, since the connection pattern is disposed on the lower wire and the upper wire in the portions where the first and second contact holes are formed, the wire connection space may be increased.

In the display device 100 according to the embodiments, at least a part of each of the lower wire 470 and the upper wire 510 overlap each other, so that the lower wire 470 and the upper wire 510 may partially overlap each other in a portion where the contact hole 600 is formed. The connection pattern 590 may be electrically connected to each of the lower wire 470 and the upper wire 510 through one contact hole, e.g., the contact hole 600. In other words, since the contact hole 600 is configured to simultaneously connect the lower wire 470 to the upper wire 510, a width in which the lower wire 470, the upper wire 510, and the connection pattern 590 are arranged in the first direction D1 may be relatively reduced. In addition, since the contact hole 600 has the same size as an area in which two conventional contact holes are formed, a contact resistance between the connection pattern 590 and the lower and upper wires 470 and 510 may not be increased. Accordingly, an area of the peripheral area 20, e.g., a dead space, of the display device 100 may be relatively reduced.

According to the inventive concept, although the wires configured to connect the pad electrode 480 to the diodes included in the antistatic structure 630, the wires configured to connect the diodes to the light emitting structure, the wires configured to connect the diodes to the gate signal lines and the clock signal lines included in the circuit structure 620, the gate signal lines configured to apply the gate signals to the transistors included in the circuit structure 620, and the clock signal lines configured to apply the clock signals to the transistors have been described as including the lower wire 470 and the upper wire 510, and the connection pattern 590 has been described as electrically connecting the lower wire 470 to the upper wire 510 through the contact hole 600, in other embodiments, other configurations are possible. For example, an embodiment may also be applied to a structure in which a first wire (or a first electrode) and a second wire (or a second electrode) disposed on a layer different from a layer on which the first wire is disposed are electrically connected to each other by a connection pattern (or a connection electrode) through a contact hole in the peripheral area 20.

Figure 6:
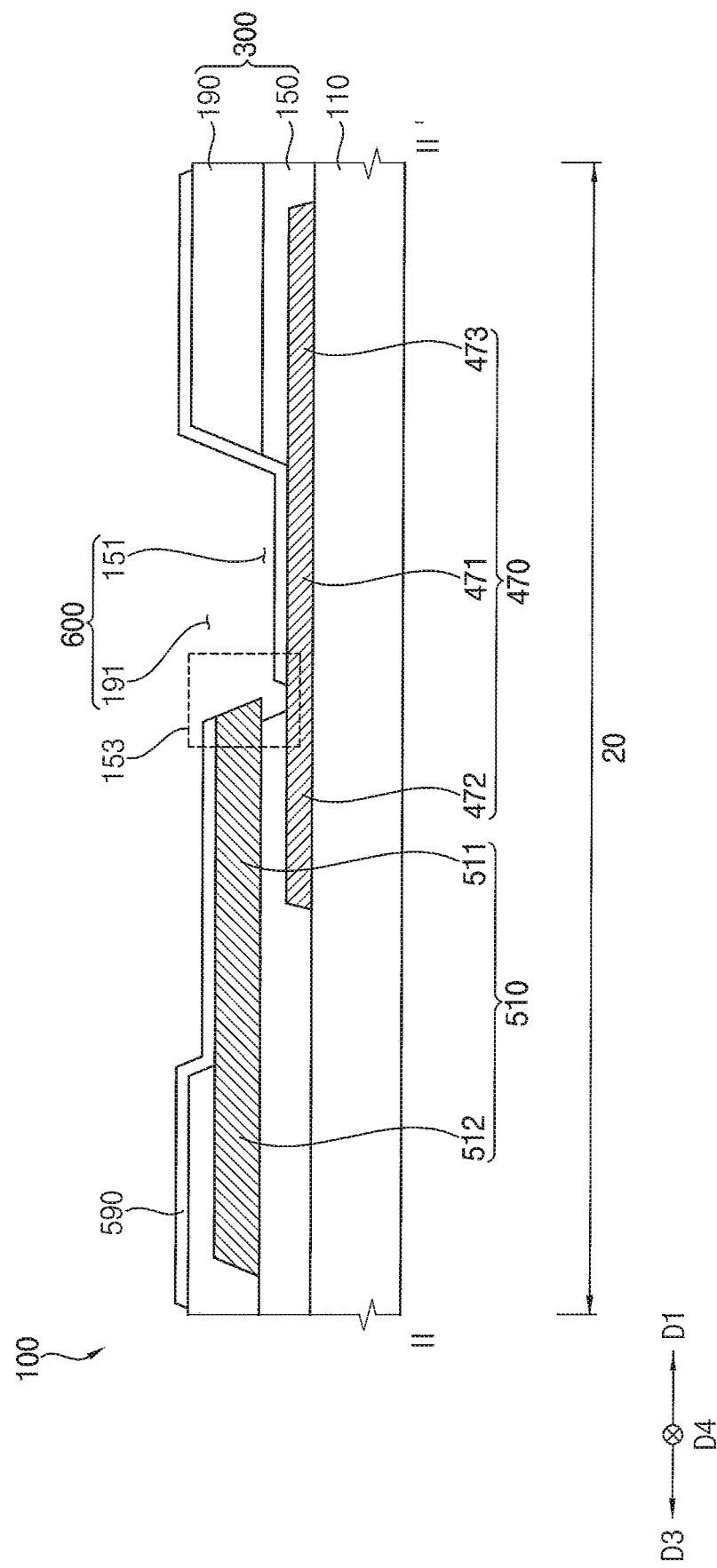
FIG. 6 is a sectional view taken along line II-II' of FIG. 2.
Figure 7:
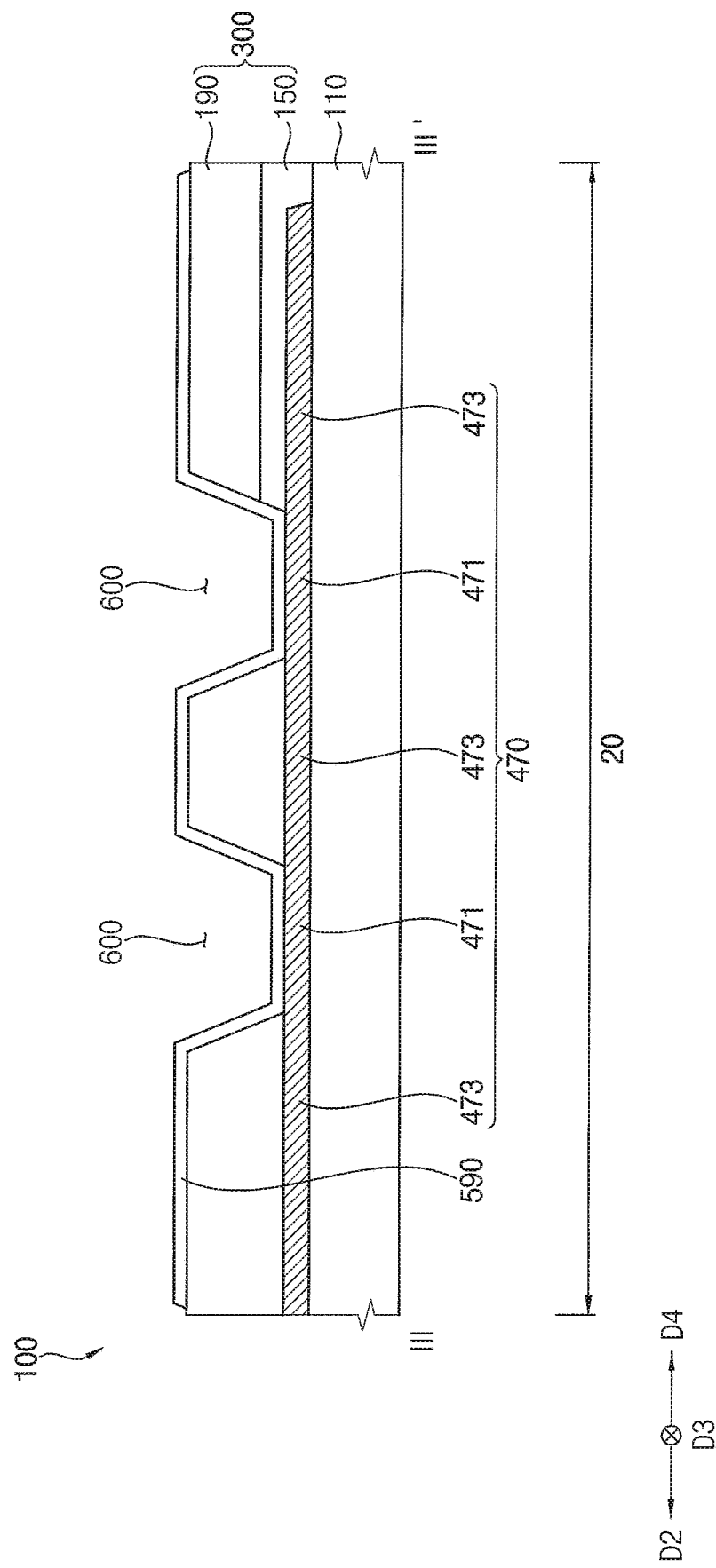
FIG. 7 is a sectional view taken along line III-III' of FIG. 2.

FIG. 6 is a sectional view taken along line II-II' of FIG. 2. FIG. 7 is a sectional view taken along line III-III' of FIG. 2. FIG. 8 is a sectional view taken along line I-I' of FIG. 1.

Referring to FIGS. 2, 6, 7, and 8 together, the display device 100 may include a lower substrate 110, a semiconductor element 250, an insulating layer structure 300, a lower wire 470, an upper wire 510, a connection pattern 590, the light emitting structure 200, a lower alignment layer 310, an upper alignment layer 315, a coating layer 390, a black matrix 370, a color filter 350, an upper substrate 410, and the like. In this case, the semiconductor element 250 may include a gate electrode 170, an active layer 130, a source electrode 210, and a drain electrode 230. The insulating layer structure 300 may include a gate insulating layer 150 and an interlayer insulating layer 190. In addition, the light emitting structure 200 may include a pixel electrode 290, a liquid crystal layer 330, and a common electrode 340. Moreover, the lower wire 470 may include the first portion 471, the second portion 472, and the third portion 473.

The upper wire 510 may include the first portion 511 and the second portion 512. In the sectional view of the display device 100 of FIG. 6, the first portion 471 of the lower wire 470 may have a shape protruding from the third portion 473 in the third direction D3. The second portion 472 of the lower wire 470 may have a shape protruding from the first portion 471 in the third direction D3. In other words, the first portion 471 may be located between the second portion 472 and the third portion 473. In addition, in the sectional view of the display device 100 of FIG. 6, the first portion 511 of the upper wire 510 may have a shape protruding from the second portion 512 in the first direction D1.

The lower substrate 110 including a transparent material may be provided. The lower substrate 110 may include a quartz substrate, a synthetic quartz substrate, a calcium fluoride substrate, a fluorine-doped quartz substrate (an F-doped quartz substrate), a soda lime glass substrate, a non-alkali glass substrate, and the like. In other embodiments, the lower substrate 110 may be a transparent resin substrate having flexibility. Since the display device 100 of FIG. 1 includes the display area 10 and the peripheral area 20, the lower substrate 110 may also be divided into a display area 10 and a peripheral area 20.

A backlight unit may be disposed under the lower substrate 110. The backlight unit may provide light in a direction from the lower substrate 110 to the liquid crystal layer 330.

The gate electrode 170 may be disposed in the display area 10 on the lower substrate 110. In other words, the gate electrode 170 may be disposed under the active layer 130. The gate electrode 170 may include a metal, an alloy, a metal nitride, a conductive metal oxide, a transparent conductive material, and the like. These materials may be used alone or in combination with each other. In other embodiments, the gate electrode 170 may have a multilayer structure including a plurality of metal layers. For example, the metal layers may have mutually different thicknesses, or may include mutually different materials.

The lower wire 470 may be disposed in the peripheral area 20 on the lower substrate 110. When viewed in a plan view of the display device 100, the third portion 473 of the lower wire 470 may extend in the second direction D2. In addition, the first portion 471 of the lower wire 470 may protrude from the third portion 473 of the lower wire 470 in the third direction D3. The second portion 472 of the lower wire 470 may protrude from the first portion 471 of the lower wire 470 in the third direction D3. The second portion 472 of the lower wire 470 may overlap the first portion 511 of the upper wire 510. The lower wire 470 may include a metal, an alloy, a metal nitride, a conductive metal oxide, a transparent conductive material, and the like. For example, the lower wire 470 may include gold (Au), silver (Ag), aluminum (Al), platinum (Pt), nickel (Ni), titanium (Ti), palladium (Pd), magnesium (Mg), calcium (Ca), lithium (Li), chromium (Cr), tantalum (Ta), tungsten (W), copper (Cu), molybdenum (Mo), scandium (Sc), neodymium (Nd), iridium (Ir), an aluminum-containing alloy, aluminum nitride (AlNx), a silver-containing alloy, tungsten nitride (WNx), a copper-containing alloy, a molybdenum-containing alloy, titanium nitride (TiNx), chromium nitride (CrNx), tantalum nitride (TaNx), strontium ruthenium oxide (SrRuxOy), zinc oxide (ZnOx), indium tin oxide (ITO), tin oxide (SnOx), indium oxide (InOx), gallium oxide (GaOx), indium zinc oxide (IZO), and the like. These materials may be used alone or in combination with each other. In the embodiments, the lower wire 470 may be disposed on the same layer as the gate electrode 170, e.g., on the lower substrate 110, and the lower wire 470 and the gate electrode 170 may include the same material. In other embodiments, the lower wire 470 may have a multilayer structure including a plurality of metal layers. For example, the metal layers may have mutually different thicknesses, or may include mutually different materials.

The gate insulating layer 150 may be disposed on the lower substrate 110, the gate electrode 170, and the lower wire 470. The gate insulating layer 150 may extend to the peripheral area 20 to cover the gate electrode 170 in the display area 10 on the lower substrate 110, and may cover the second portion 472 and the third portion 473 of the lower wire 470 in the peripheral area 20. In other words, the second portion 472 and the third portion 473 of the lower wire 470 may be covered with the gate insulating layer 150. In the embodiments, the gate insulating layer 150 may include a first opening 151 that extends to and exposes the first portion 471 of the lower wire 470. In addition, the first opening 151 of the gate insulating layer 150 may extend from a side surface of the first portion 511 of the upper wire 510 in the third direction D3. That is, a part of the upper wire 510 may protrude in an inward direction of the first opening 151, e.g., in the first direction D1. In other words, the gate insulating layer 150 may have an under-cut shape under the first portion 511 of the upper wire 510. For example, the gate insulating layer 150 may sufficiently cover the gate electrode 170 and the lower wire 470 on the lower substrate 110 except for the first portion 471 of the lower wire 470, e.g., exposed by the first opening 151, and may have a substantially flat top surface without creating a step around the gate electrode 170 and the lower wire 470. In some embodiments, the gate insulating layer 150 may be disposed along a profile of the gate electrode 170 and the lower wire 470 with a uniform thickness to cover the gate electrode 170 and the lower wire 470 on the lower substrate 110 except for the first portion 471 of the lower wire 470, e.g., exposed by the first opening 151. The gate insulating layer 150 may include a silicon compound, a metal oxide, and the like. For example, the gate insulating layer 150 may include silicon oxide (SiOx), silicon nitride (SiNx), silicon oxynitride (SiOxNy), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), and the like. In other embodiments, the gate insulating layer 150 may have a multilayer structure including a plurality of insulating layers. For example, the insulating layers may have mutually different thicknesses, or may include mutually different materials.

The active layer 130 may be disposed in the display area 10 on the gate insulating layer 150. In other words, the active layer 130 may be disposed on a portion of the gate insulating layer 150 under which the gate electrode 170 is disposed. The active layer 130 may include a metal oxide semiconductor, an inorganic semiconductor, e.g., amorphous silicon or poly silicon, an organic semiconductor, or the like. In the embodiments, the active layer 130 may be formed of amorphous silicon.

The source electrode 210 may be disposed in the display area 10 on the gate insulating layer 150 and a first portion of the active layer 130. In other words, the source electrode 210 may contact the first portion of the active layer 130. The source electrode 210 may include a metal, an alloy, a metal nitride, a conductive metal oxide, a transparent conductive material, and the like. These materials may be used alone or in combination with each other. In other embodiments, the source electrode 210 may have a multilayer structure including a plurality of metal layers. For example, the metal layers may have mutually different thicknesses, or may include mutually different materials.

The drain electrode 230 may be disposed in the display area 10 on the gate insulating layer 150 and a second portion of the active layer 130. In other words, the drain electrode 230 may contact the second portion of the active layer 130. The drain electrode 230 may include a metal, an alloy, a metal nitride, a conductive metal oxide, a transparent conductive material, and the like. These materials may be used alone or in combination with each other. In other embodiments, the drain electrode 230 may have a multilayer structure including a plurality of metal layers. For example, the metal layers may have mutually different thicknesses, or may include mutually different materials.

Accordingly, the semiconductor element 250 including the gate electrode 170, the active layer 130, the source electrode 210, and the drain electrode 230 may be provided.

Although the display device 100 has been described as having a configuration including one transistor, e.g., the semiconductor element 250, in other embodiments, other configurations are possible. For example, the display device 100 may have a configuration including a plurality of transistors and a plurality of capacitors.

The upper wire 510 may be disposed in the peripheral area 20 on the gate insulating layer 150. In the embodiments, the first portion 511 of the upper wire 510 may overlap the second portion 472 of the lower wire 470, and the second portion 512 of the upper wire 510 may not overlap the lower wire 470, e.g., may not overlap the first portion 471 and the third portion 473 of the lower wire 470. In addition, when viewed in a plan view of the display device 100, the second portion 512 of the upper wire 510 may extend in the fourth direction D4, and the first portion 511 of the upper wire 510 may protrude from the second portion 512 of the upper wire 510 in the first direction D1. As described above, a part of the first portion 511 of the upper wire 510 may protrude in the first direction D1 by and into the first opening 151 of the gate insulating layer 150. For example, a part of a bottom surface of the first portion 511 of the upper wire 510 may be exposed by the opening 153. The upper wire 510 may include a metal, an alloy, a metal nitride, a conductive metal oxide, a transparent conductive material, and the like. These materials may be used alone or in combination with each other. In the embodiments, the upper wire 510 may be disposed on the same layer as the source electrode 210 and the drain electrode 230, e.g., on the gate insulating layer 150, and the upper wire 510, the source electrode 210, and the drain electrode 230 may include the same material. In other embodiments, the upper wire 510 may have a multilayer structure including a plurality of metal layers. For example, the metal layers may have mutually different thicknesses, or may include mutually different materials.

The interlayer insulating layer 190 may be disposed on the gate insulating layer 150, the source electrode 210, the drain electrode 230, the active layer 130, and a part of the upper wire 510. The interlayer insulating layer 190 may extend to the peripheral area 20 to cover the source electrode 210, the drain electrode 230, and the active layer 130 in the display area 10 on the gate insulating layer 150. The interlayer insulating layer 190 may cover the gate insulating layer 150 disposed on the second portion 512 of the upper wire 510 and the third portion 473 of the lower wire 470 in the peripheral area 20. In other words, the gate insulating layer 150 disposed on the second portion 512 of the upper wire 510 and the third portion 473 of the lower wire 470 may be covered with the interlayer insulating layer 190. In the embodiments, the interlayer insulating layer 190 may include a second opening 191 that exposes the first portion 511 of the upper wire 510 and the first portion 471 of the lower wire 470. In addition, the second opening 191 may completely overlap the first opening 151. In other words, a size of the second opening 191 may be greater than a size of the first opening 151. For example, the interlayer insulating layer 190 may sufficiently cover the source electrode 210, the drain electrode 230, the active layer 130, and the upper wire 510 on the gate insulating layer 150 except for the first portion 511 of the upper wire 510 and the first opening 151 of the gate insulating layer 150. The interlayer insulating layer 190 may have a substantially flat top surface without creating a step around the source electrode 210, the drain electrode 230, the active layer 130, and the upper wire 510. In some embodiments, the interlayer insulating layer 190 may be disposed along a profile of the source electrode 210, the drain electrode 230, the active layer 130, and the upper wire 510 with a uniform thickness to cover the source electrode 210, the drain electrode 230, the active layer 130, and the upper wire 510 on the gate insulating layer 150 except for the first portion 511 of the upper wire 510 and the first opening 151 of the gate insulating layer 150. The gate insulating layer 150 may include a silicon compound, a metal oxide, and the like. In other embodiments, the gate insulating layer 150 may have a multilayer structure including a plurality of insulating layers. For example, the insulating layers may have mutually different thicknesses, or may include mutually different materials.

Accordingly, the insulating layer structure 300 including the gate insulating layer 150 having the first opening 151 and the interlayer insulating layer 190 having the second opening 191 may be provided. In this case, the first opening 151 and the second opening 191 may be defined as the contact hole 600 of the insulating layer structure 300.

The pixel electrode 290 may be disposed in the display area 10 on the interlayer insulating layer 190. The pixel electrode 290 may contact the drain electrode 230 through a contact hole formed by removing a part of the interlayer insulating layer 190. In other words, the pixel electrode 290 may be electrically connected to the semiconductor element 250. The pixel electrode 290 may include a metal, an alloy, a metal nitride, a conductive metal oxide, a transparent conductive material, and the like. These materials may be used alone or in combination with each other. In some embodiments, the pixel electrode 290 may have a multilayer structure including a plurality of metal layers. For example, the metal layers may have mutually different thicknesses, or may include mutually different materials.

The connection pattern 590 may be disposed in the peripheral area 20 on the interlayer insulating layer 190, the lower wire 470, and the upper wire 510. The connection pattern 590 may be disposed on the interlayer insulating layer 190 disposed on the second portion 512 of the upper wire 510, the first portion 511 of the upper wire 510, the first portion 471 of the lower wire 470, and the interlayer insulating layer 190 disposed on the third portion 473 of the lower wire 470. In other words, the connection pattern 590 may be disposed on a top surface of the interlayer insulating layer 190 disposed on a portion under which the second portion 512 of the upper wire 510 is located, the first portion 511 of the upper wire 510, the first portion 471 of the lower wire 470, and a top surface of the interlayer insulating layer 190 disposed on a portion under which the third portion 473 of the lower wire 470 is located. In some embodiments, the connection pattern 590 may be disposed on at least a part of the side surface of the first portion 511 of the upper wire 510.

In the embodiments, the connection pattern 590 may include the opening 153 in the contact hole 600. For example, the opening 153 may be located at a boundary between the first portion 471 and the second portion 472 of the lower wire 470. In other words, the connection pattern 590 may have an opening 153 at a boundary between the first portion 511 of the upper wire 510 and the first portion 471 of the lower wire 470 in the contact hole 600.

In this case, the connection pattern 590 disposed on the interlayer insulating layer 190, which is disposed on the second portion 512 of the upper wire 510, and the first portion 511 of the upper wire 510 may be defined as a first connection pattern. The connection pattern 590 disposed on the first portion 471 of the lower wire 470 and the interlayer insulating layer 190, which is disposed on and the third portion 473 of the lower wire 470, may be defined as a second connection pattern. The first connection pattern may extend in the first direction D1 on the interlayer insulating layer 190 disposed on the second portion 512 of the upper wire 510 so as to contact the first portion 511 of the upper wire 510, and the second connection pattern may extend in the third direction D3 on the interlayer insulating layer 190 disposed on the third portion 473 of the lower wire 470 so as to contact the first portion 471 of the lower wire 470. In addition, the first connection pattern and the second connection pattern may be spaced apart from each other by the opening 153 in the contact hole 600.

As shown in FIG. 7, a size of the connection pattern 590 may be greater than a size of the contact hole 600. For example, when viewed in a plan view of the display device 100, the connection pattern 590 may extend to an outer periphery of the contact hole 600 to cover the contact hole 600.

The connection pattern 590 may include a metal, an alloy, a metal nitride, a conductive metal oxide, a transparent conductive material, and the like. These materials may be used alone or in combination with each other.

In the embodiments, the connection pattern 590 may be disposed on the same layer as the pixel electrode 290, e.g., on the interlayer insulating layer 190, and the connection pattern 590 and the pixel electrode 290 may include the same material. In other embodiments, the connection pattern 590 may have a multilayer structure including a plurality of metal layers. For example, the metal layers may have mutually different thicknesses, or may include mutually different materials.

Referring again to FIGS. 6, 7, and 8 together, the lower alignment layer 310 may be disposed in the display area 10 on the interlayer insulating layer 190 and the pixel electrode 290. The lower alignment layer 310 may cover the pixel electrode 290 in the display area 10 on the interlayer insulating layer 190. In some embodiments, the lower alignment layer 310 may extend from the display area 10 to the peripheral area 20 to cover the connection pattern 590 in the peripheral area 20. For example, the lower alignment layer 310 may sufficiently cover the pixel electrode 290 on the interlayer insulating layer 190, and may have a substantially flat top surface without creating a step around the pixel electrode 290. Alternatively, the lower alignment layer 310 may be disposed along a profile of the pixel electrode 290 with a uniform thickness to cover the pixel electrode 290 on the interlayer insulating layer 190. The lower alignment layer 310 may include an inorganic insulating material or an organic insulating material. In the embodiments, the lower alignment layer 310 may include polyamic acid, polysiloxane, polyimide, and the like.

The liquid crystal layer 330 may be disposed in the display area 10 on the lower alignment layer 310. The liquid crystal layer 330 may include liquid crystal molecules having optical anisotropy. The liquid crystal molecules may be driven by an electric field generated from the pixel electrode 290 and the common electrode 340 to display an image by transmitting or blocking light that passes through the liquid crystal layer 330. In some embodiments, the liquid crystal layer 330 may extend from the display area 10 to the peripheral area 20 so as to be disposed in the peripheral area 20.

The upper alignment layer 315 may be disposed in the display area 10 on the liquid crystal layer 330. The upper alignment layer 315 may cover the liquid crystal layer 330. In some embodiments, the upper alignment layer 315 may extend from the display area 10 to the peripheral area 20 so as to be disposed in the peripheral area 20. For example, the upper alignment layer 315 may sufficiently cover the liquid crystal layer 330, and may have a substantially flat top surface without creating a step around the liquid crystal layer 330. Alternatively, the upper alignment layer 315 may be disposed along a profile of the liquid crystal layer 330 with a uniform thickness to cover the liquid crystal layer 330. The upper alignment layer 315 may include an inorganic insulating material or an organic insulating material. In the embodiments, the upper alignment layer 315 may include the same material as the lower alignment layer 310.

The common electrode 340 may be disposed in the display area 10 on the upper alignment layer 315. In some embodiments, the common electrode 340 may extend from the display area 10 to the peripheral area 20 so as to be disposed in the peripheral area 20. The common electrode 340 may include a metal, an alloy, a metal nitride, a conductive metal oxide, a transparent conductive material, and the like. These materials may be used alone or in combination with each other. In other embodiments, the common electrode 340 may have a multilayer structure including a plurality of metal layers. For example, the metal layers may have mutually different thicknesses, or may include mutually different materials.

Accordingly, the light emitting structure 200 including the pixel electrode 290, the liquid crystal layer 330, and the common electrode 340 may be provided.

The coating layer 390 may be disposed in the display area 10 on the common electrode 340. The coating layer 390 may planarize a step difference between the black matrix 370 and the color filter 350, and may protect the black matrix 370 and the color filter 350. For example, the coating layer 390 may sufficiently cover the black matrix 370 and the color filter 350, and may have a substantially flat top surface without creating a step around the black matrix 370 and the color filter 350. The coating layer 390 may include an organic material. For example, the coating layer 390 may include a photoresist, polyacryl, polyimide, polyamide, siloxane, acryl, epoxy, and the like.

The black matrix 370 may be disposed in the display area 10 on the coating layer 390. The black matrix 370 may overlap the semiconductor element 250. The black matrix 370 may include an organic material such as a photoresist, a polyacryl-based resin, a polyimide-based resin, a polyamide-based resin, a siloxane-based resin, an acryl-based resin, and an epoxy-based resin. In addition, the black matrix 370 may be substantially opaque. For example, the black matrix 370 may further include a light blocking material to absorb light. The light blocking material may include carbon black, titanium nitride oxide, titanium black, phenylene black, aniline black, cyanine black, nigrosine acid black, a black resin, and the like.

The color filter 350 may be disposed in the display area 10 on the coating layer 390. The color filter 350 may overlap the pixel electrode 290. The color filter 350 may include a red color filter, a green color filter, or a blue color filter. The color filter 350 may include a photosensitive resin and a color photoresist. In other embodiments, the color filter 350 may include a yellow color filter, a cyan color filter, or a purple color filter.

The upper substrate 410 may be disposed on the black matrix 370 and the color filter 350. The upper substrate 410 may face (or may be opposite to) the lower substrate 110. The upper substrate 410 and the lower substrate 110 may include substantially the same material. For example, the upper substrate 410 may include a quartz substrate, a synthetic quartz substrate, a calcium fluoride substrate, a fluorine-doped quartz substrate, a soda lime glass substrate, a non-alkali glass substrate, and the like.

Accordingly, the display device 100 shown in FIGS. 6, 7, and 8 may be provided.

Although the display device 100 has been described as specifically being a liquid crystal display device (LCD), in other embodiments, other configurations are possible. In other embodiments, the display device 100 may include an organic light emitting display device (OLED), a field emission display device (FED), a plasma display device (PDP), and an electrophoretic image display device (EPD).

Figure 9:
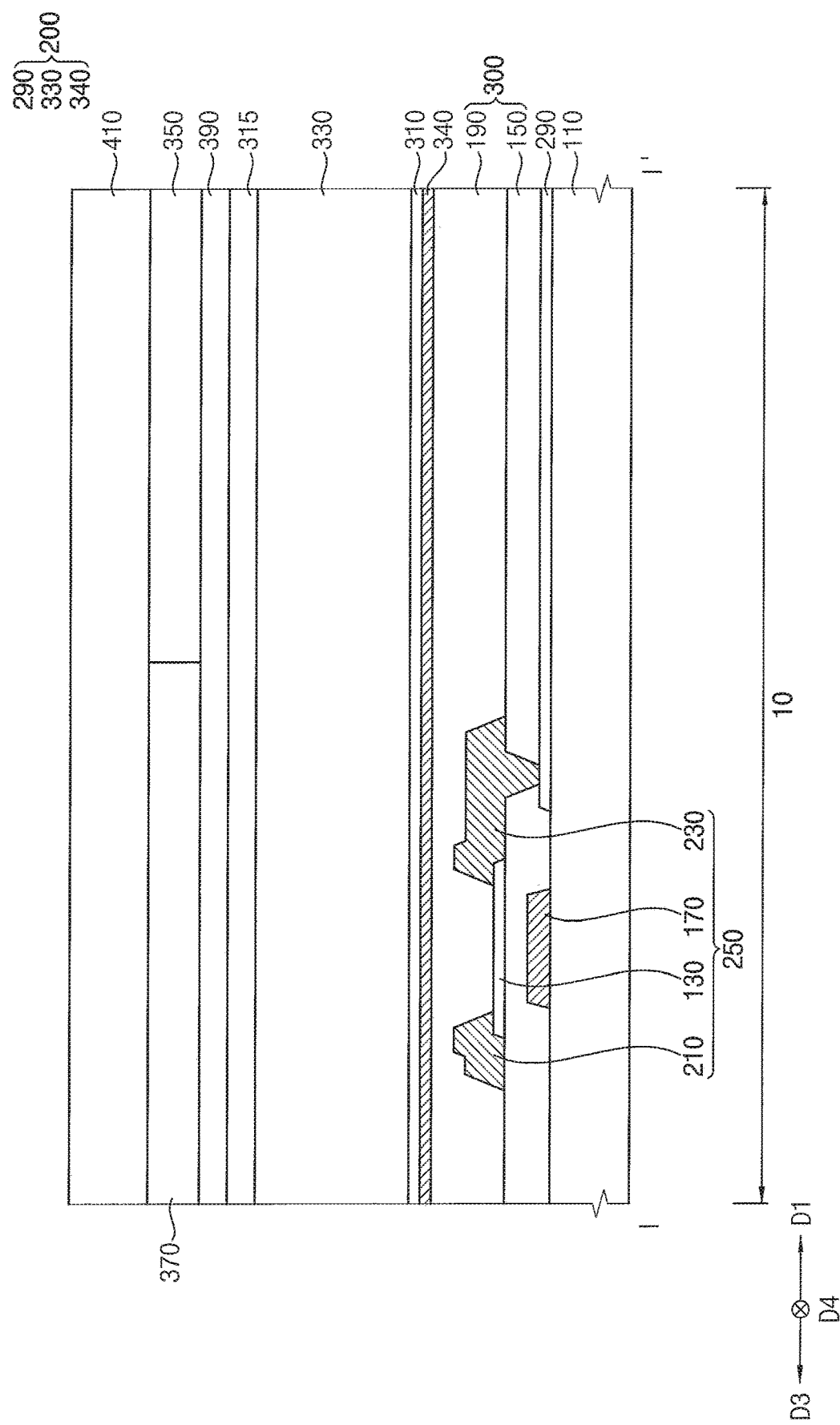
FIG. 9 is a sectional view showing an embodiment of a display device similar to the display device shown in FIG. 8.

FIG. 9 is a sectional view showing an embodiment of a display device similar to the display device shown in FIG. 8. The display device illustrated in FIG. 9 may have a configuration that is substantially identical or similar to the configuration of the display device 100 described with reference to FIGS. 6 to 8 except for positions of the pixel electrode 290 and the common electrode 340. In FIG. 9, redundant descriptions of components that are substantially identical or similar to the components described with reference to FIGS. 6 to 8 will be omitted.

Referring to FIG. 9, the display device may include a lower substrate 110, a semiconductor element 250, an insulating layer structure 300, a lower wire 470, an upper wire 510, a connection pattern 590, a light emitting structure 200, a lower alignment layer 310, an upper alignment layer 315, a coating layer 390, a black matrix 370, a color filter 350, an upper substrate 410, and the like. In this case, the semiconductor element 250 may include a gate electrode 170, an active layer 130, a source electrode 210, and a drain electrode 230. The insulating layer structure 300 may include a gate insulating layer 150 and an interlayer insulating layer 190. In addition, the light emitting structure 200 may include a pixel electrode 290, a liquid crystal layer 330, and a common electrode 340. Moreover, the lower wire 470 may include a first portion 471, a second portion 472, and a third portion 473. The upper wire 510 may include a first portion 511 and a second portion 512.

The pixel electrode 290 may be disposed in the display area 10 on the lower substrate 110. In the embodiments, the pixel electrode 290 may be located on the same layer as the gate electrode 170. For example, after the gate electrode 170 is formed on the lower substrate 110, a preliminary pixel electrode may be formed over the whole lower substrate 110. After the preliminary pixel electrode is formed, the pixel electrode 290 may be formed by partially etching the preliminary pixel electrode. The pixel electrode 290 may include a metal, an alloy, a metal nitride, a conductive metal oxide, a transparent conductive material, and the like. These materials may be used alone or in combination with each other. In some embodiments, the pixel electrode 290 may have a multilayer structure including a plurality of metal layers. For example, the metal layers may have mutually different thicknesses, or may include mutually different materials.

The drain electrode 230 may be disposed in the display area 10 on the gate insulating layer 150, the second portion of the active layer 130, and a part of the pixel electrode 290. In other words, a first portion of the drain electrode 230 may contact the second portion of the active layer 130. A second portion of the drain electrode 230 may contact the pixel electrode 290 through a contact hole formed by removing a part of the gate insulating layer 150. In other words, the semiconductor element 250 and the pixel electrode 290 may be electrically connected to each other. The drain electrode 230 may include a metal, an alloy, a metal nitride, a conductive metal oxide, a transparent conductive material, and the like. These materials may be used alone or in combination with each other. In other embodiments, the drain electrode 230 may have a multilayer structure including a plurality of metal layers. For example, the metal layers may have mutually different thicknesses, or may include mutually different materials.

The common electrode 340 may be disposed in the display area 10 on the interlayer insulating layer 190. The common electrode 340 may include a metal, an alloy, a metal nitride, a conductive metal oxide, a transparent conductive material, and the like. These materials may be used alone or in combination with each other. In other embodiments, the common electrode 340 may have a multilayer structure including a plurality of metal layers. For example, the metal layers may have mutually different thicknesses, or may include mutually different materials.

The connection pattern 590 may be disposed in the peripheral area 20 on the interlayer insulating layer 190, the lower wire 470, and the upper wire 510. In the embodiments, the connection pattern 590 may be formed simultaneously with the common electrode 340 by using the same material as the common electrode 340.

Figure 10:
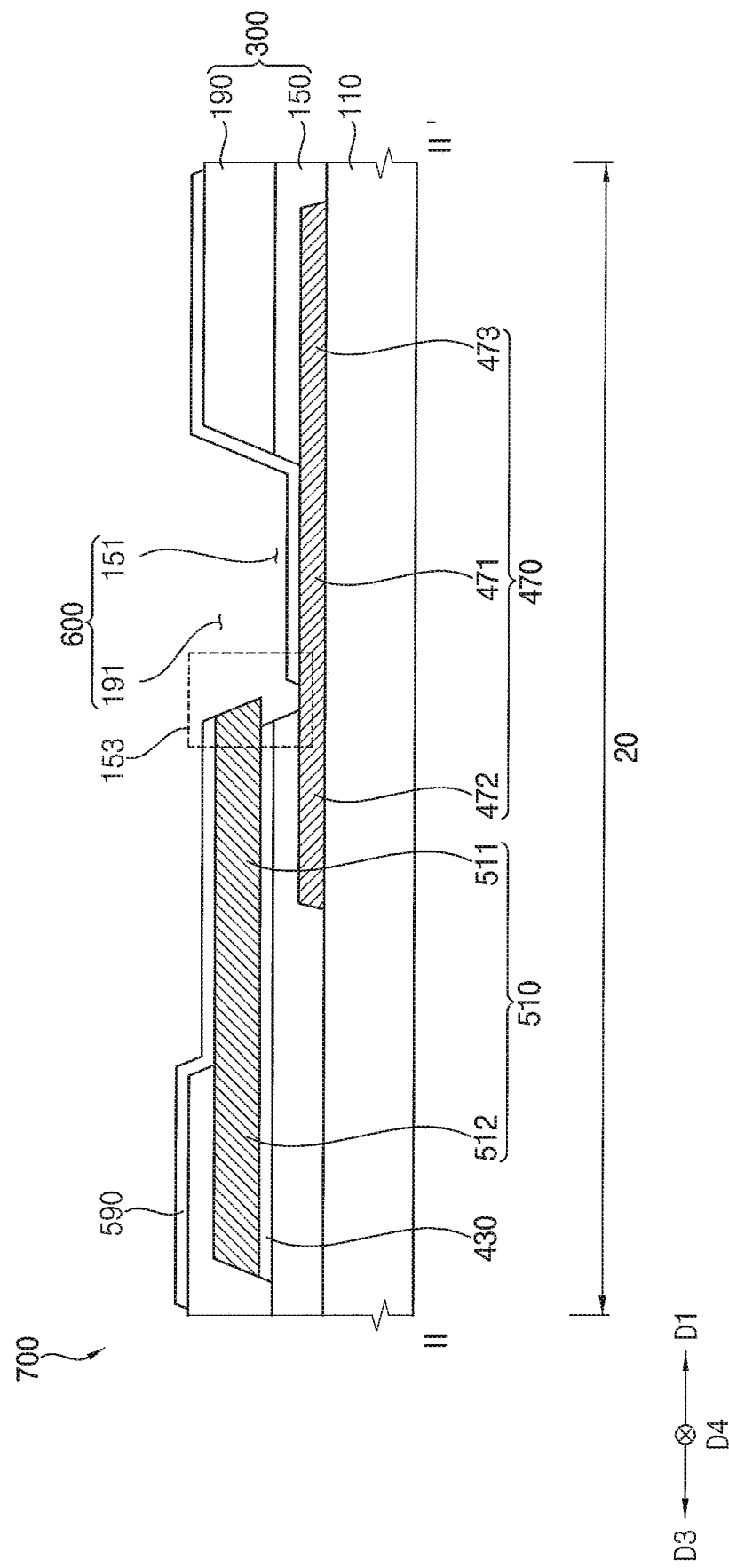
FIG. 10 is a sectional view showing a display device according to embodiments.

FIG. 10 is a sectional view showing the display device 700 according to embodiments. The display device 700 illustrated in FIG. 10 may have a configuration that is substantially identical or similar to the configuration of the display device 100 described with reference to FIGS. 1 to 8 except for an active pattern 430. In FIG. 10, redundant descriptions of components that are substantially identical or similar to the components described with reference to FIGS. 1 to 8 will be omitted.

Referring to FIGS. 8 and 10 together, the display device 700 may include a lower substrate 110, a semiconductor element 250, an insulating layer structure 300, a lower wire 470, an active pattern 430, an upper wire 510, a connection pattern 590, a light emitting structure 200, a lower alignment layer 310, an upper alignment layer 315, a coating layer 390, a black matrix 370, a color filter 350, an upper substrate 410, and the like. In this case, the semiconductor element 250 may include a gate electrode 170, an active layer 130, a source electrode 210, and a drain electrode 230, and the insulating layer structure 300 may include a gate insulating layer 150 and an interlayer insulating layer 190. In addition, the light emitting structure 200 may include a pixel electrode 290, a liquid crystal layer 330, and a common electrode 340. Moreover, the lower wire 470 may include a first portion 471, a second portion 472, and a third portion 473, and the upper wire 510 may include a first portion 511 and a second portion 512. In the sectional view of a display device 700 of FIG. 10, the first portion 471 of the lower wire 470 may have a shape protruding from the third portion 473 in the third direction D3. The second portion 472 of the lower wire 470 may have a shape protruding from the first portion 471 in the third direction D3. In other words, the first portion 471 may be located between the second portion 472 and the third portion 473. In addition, in the sectional view of the display device 700 of FIG. 10, the first portion 511 of the upper wire 510 may have a shape protruding from the second portion 512 in the first direction D1.

The active pattern 430 may be disposed in the peripheral area 20 on the gate insulating layer 150. The active pattern 430 may be disposed between the upper wire 510 and the lower wire 470, and may contact a bottom surface of the upper wire 510. In other words, a first portion of the active pattern 430 may overlap the second portion 472 of the lower wire 470, and a side surface of the first portion of the active pattern 430 may be aligned with a side surface of the gate insulating layer 150 defined by a first opening 151. A second portion opposite to the first portion of the active pattern 430 may overlap the second portion 512 of the upper wire 510. In the embodiments, the active pattern 430 may expose a part of a bottom surface of the first portion 511 of the upper wire 510. In addition, the active pattern 430 may be located on the same layer as the active layer 130, and the active pattern 430 and the active layer 130 may include the same material.

According to the embodiments, since the display device 700 includes the active pattern 430, wire resistances of the upper wire 510 and the lower wire 470 may be relatively reduced.

FIGS. 11, 12, 13, 14, 15, 16, 17, 18, 19, 20, 21, and 22 are sectional views showing a method of manufacturing a display device according to embodiments.

Figure 11:
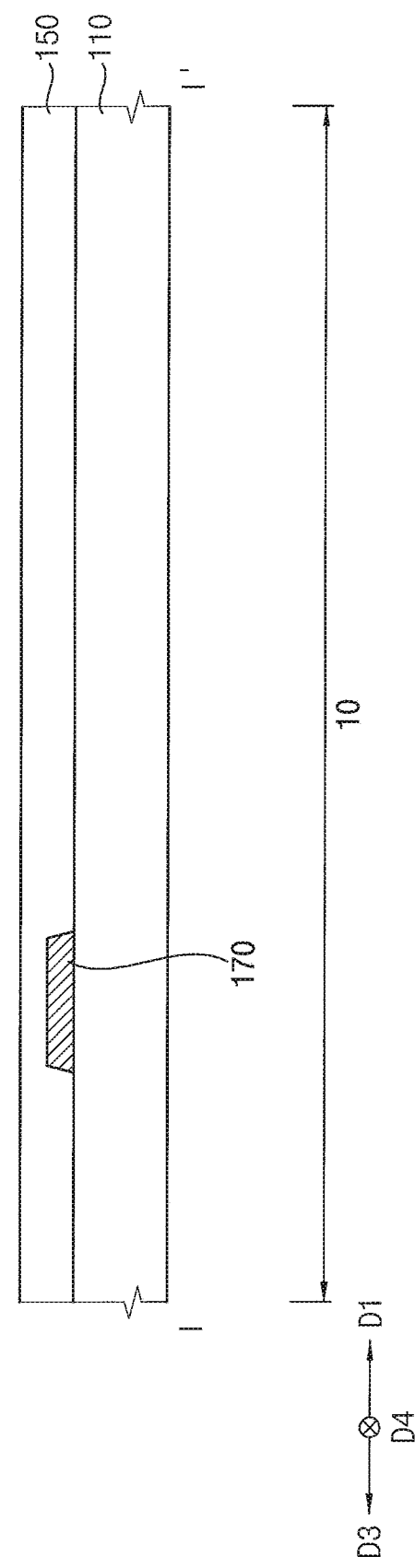
FIGS. 11, 12, 13, 14, 15, 16, 17, 18, 19, 20, 21, and 22 are sectional views showing a method of manufacturing a display device according to embodiments.
Figure 12:
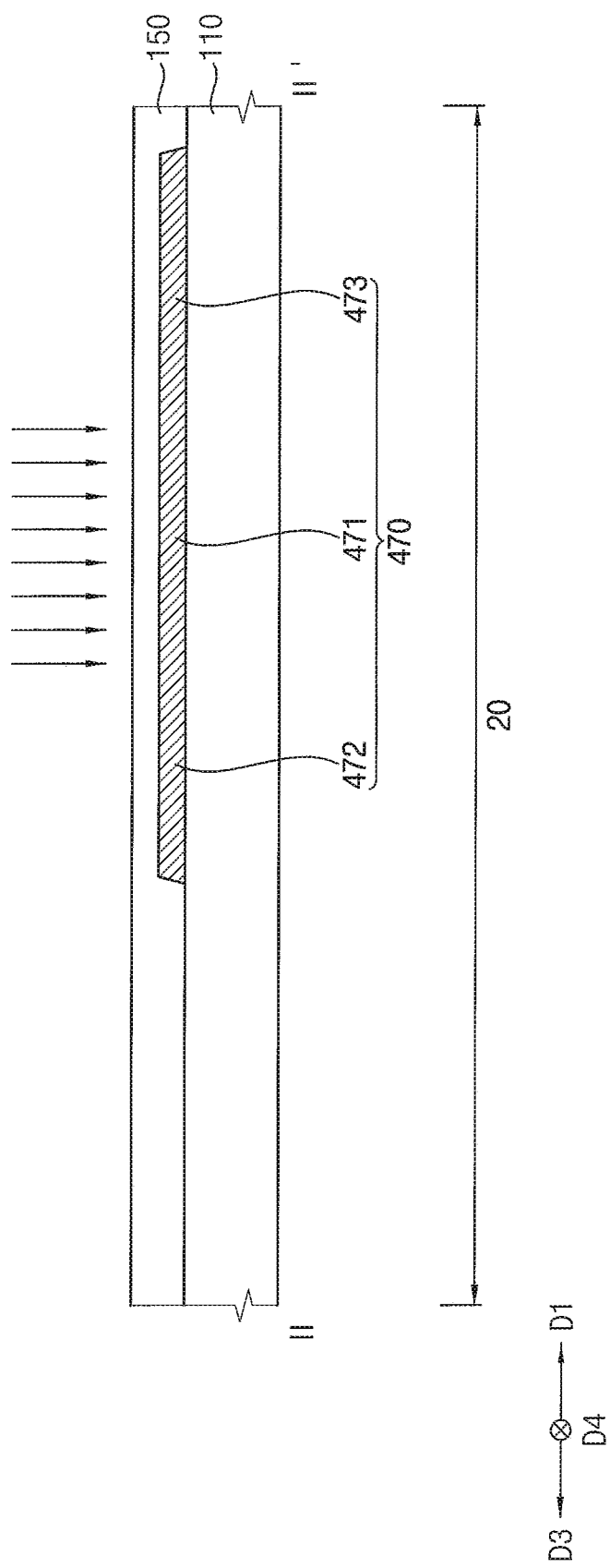

Referring to FIGS. 11 and 12, the lower substrate 110 including a transparent material may be provided. The lower substrate 110 may be formed by using a quartz substrate, a synthetic quartz substrate, a calcium fluoride substrate, a fluorine-doped quartz substrate, a soda lime glass substrate, a non-alkali glass substrate, and the like. The lower substrate 110 may be divided into the display area 10 and the peripheral area 20.

The gate electrode 170 may be formed in the display area 10 on the lower substrate 110. The gate electrode 170 may be formed by using a metal, an alloy, a metal nitride, a conductive metal oxide, a transparent conductive material, and the like. These materials may be used alone or in combination with each other.

The lower wire 470 may be formed in the peripheral area 20 on the lower substrate 110. The lower wire 470 may include a first portion 471, a second portion 472, and a third portion 473. The lower wire 470 may be formed by using a metal, an alloy, a metal nitride, a conductive metal oxide, a transparent conductive material, and the like. For example, the lower wire 470 may include gold, silver, aluminum, platinum, nickel, titanium, palladium, magnesium, calcium, lithium, chromium, tantalum, tungsten, copper, molybdenum, scandium, neodymium, iridium, an aluminum-containing alloy, aluminum nitride, a silver-containing alloy, tungsten nitride, a copper-containing alloy, a molybdenum-containing alloy, titanium nitride, chromium nitride, tantalum nitride, strontium ruthenium oxide, zinc oxide, indium tin oxide, tin oxide, indium oxide, gallium oxide, indium zinc oxide, and the like. These materials may be used alone or in combination with each other. In the embodiments, the lower wire 470 may be formed simultaneously with the gate electrode 170 on the same layer as the gate electrode 170 by using the same material as the gate electrode 170. For example, after a first metal layer is formed over the whole lower substrate 110, the lower wire 470 and the gate electrode 170 may be simultaneously formed on the lower substrate 110 by partially etching the first metal layer.

The gate insulating layer 150 may be formed on the lower substrate 110, the gate electrode 170, and the lower wire 470. The gate insulating layer 150 may extend to the peripheral area 20 to cover the gate electrode 170 in the display area 10 on the lower substrate 110, and may cover the lower wire 470 in the peripheral area 20. For example, the gate insulating layer 150 may sufficiently cover the gate electrode 170 and the lower wire 470 on the lower substrate 110, and may have a substantially flat top surface without creating a step around the gate electrode 170 and the lower wire 470. In some embodiments, the gate insulating layer 150 may be formed along a profile of the gate electrode 170 and the lower wire 470 with a uniform thickness to cover the gate electrode 170 and the lower wire 470 on the lower substrate 110. The gate insulating layer 150 may be formed by using a silicon compound, a metal oxide, and the like. For example, the gate insulating layer 150 may include silicon oxide, silicon nitride, silicon oxynitride, silicon oxycarbide, silicon carbonitride, aluminum oxide, aluminum nitride, tantalum oxide, hafnium oxide, zirconium oxide, titanium oxide, and the like.

As shown in FIG. 12, after the gate insulating layer 150 is formed, a first etching process may be performed on the gate insulating layer 150 that overlaps a portion under which the first portion 471 of the lower wire 470 is located.

Figure 13:
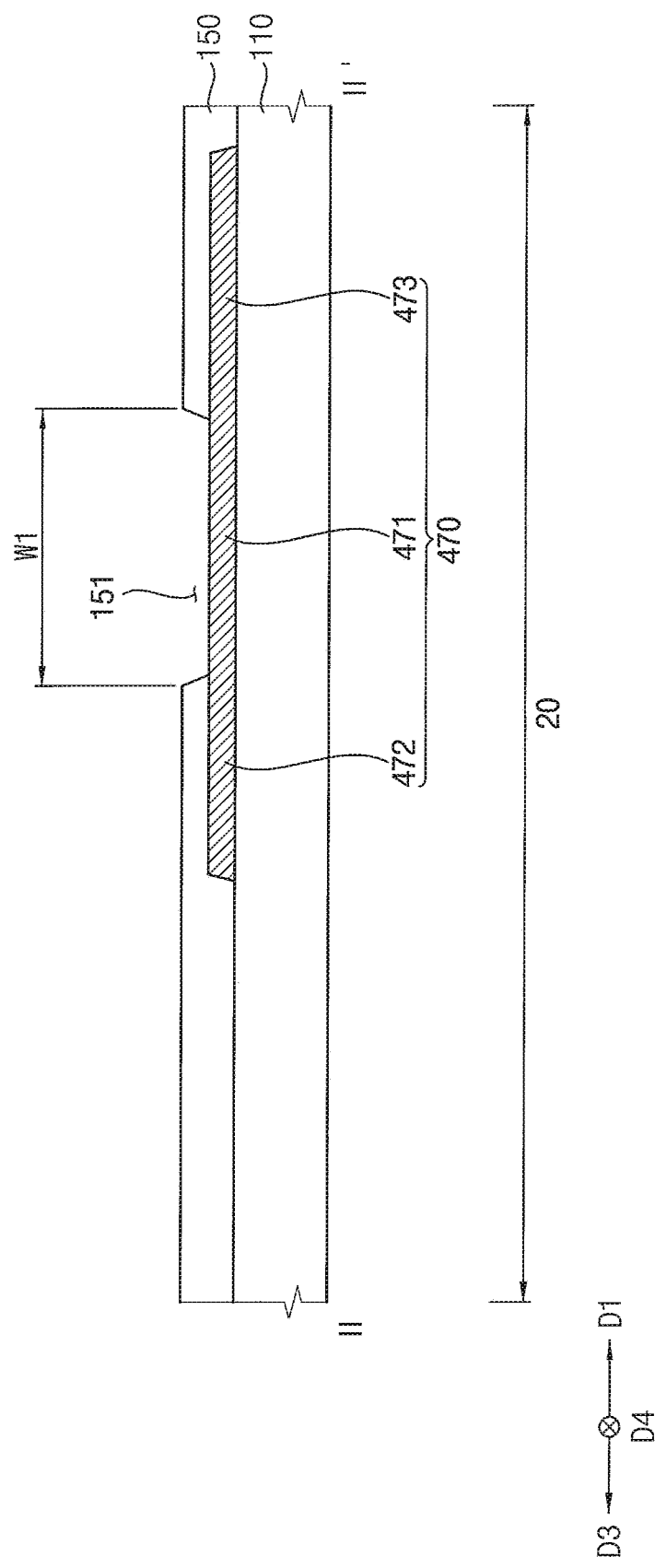

Referring to FIG. 13, the first etching process may be performed so that the gate insulating layer 150 may have a first opening 151 that exposes the first portion 471 of the lower wire 470. For example, the first opening 151 may have a first width W1.

Figure 14:
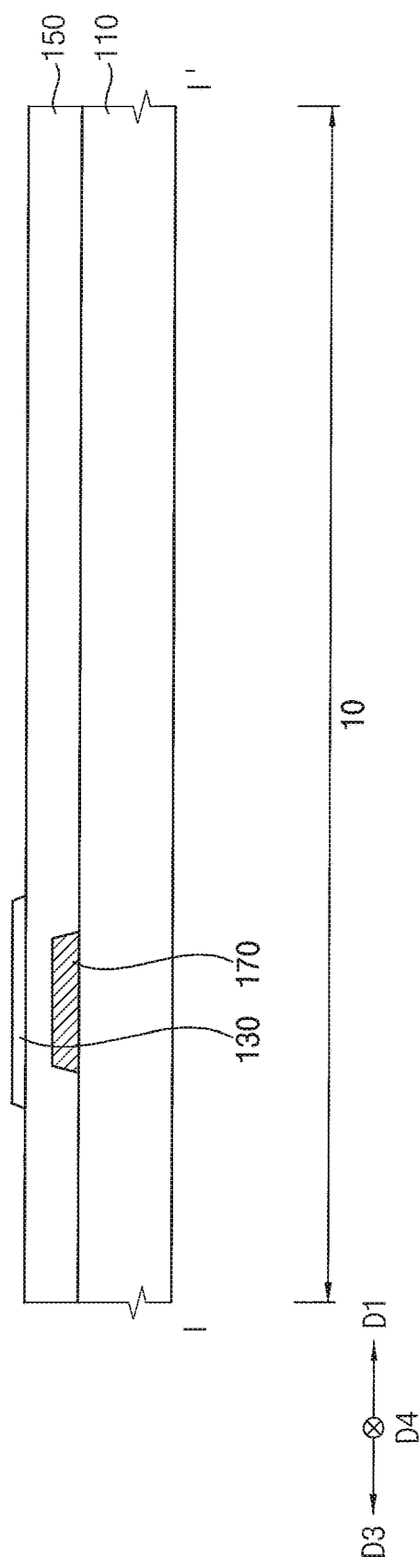
Figure 15:
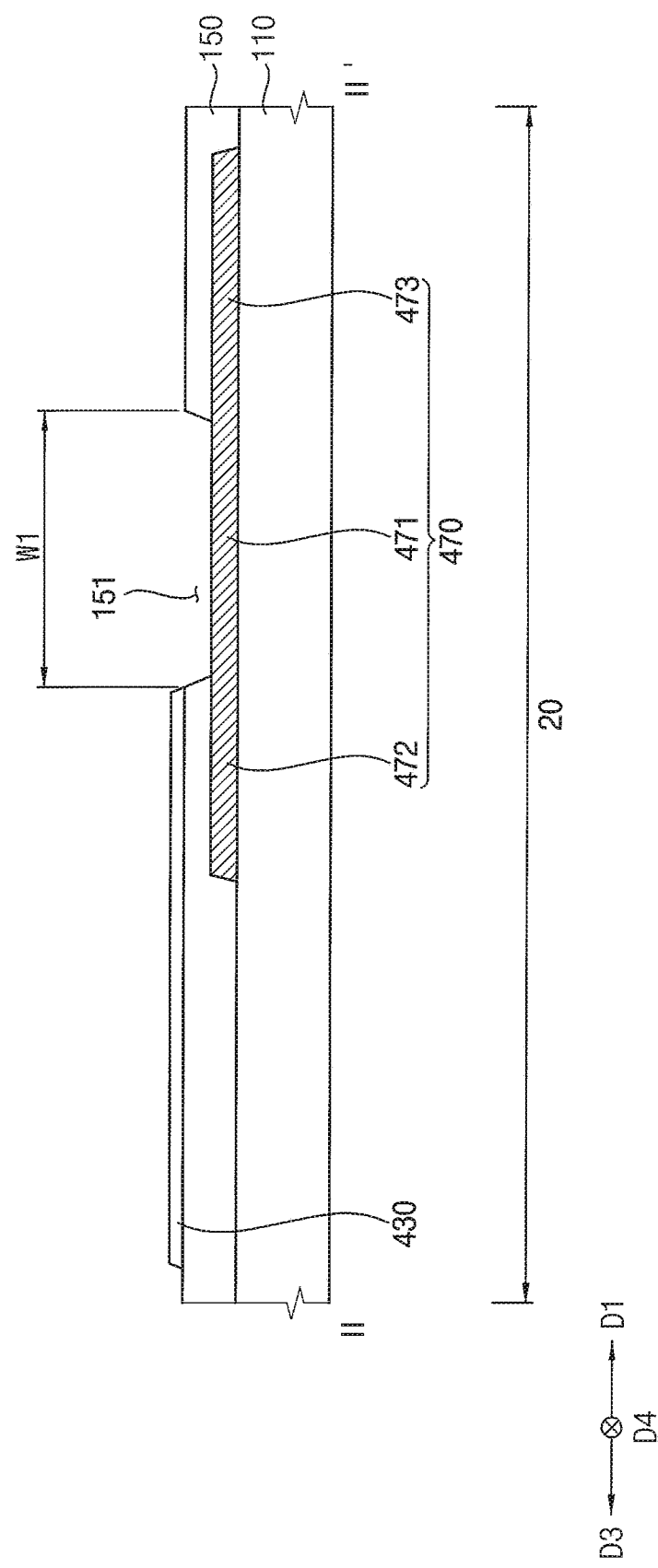

Referring to FIGS. 14 and 15, the active layer 130 may be formed in the display area 10 on the gate insulating layer 150. In other words, the active layer 130 may be formed on a portion of the gate insulating layer 150 under which the gate electrode 170 is disposed. In the embodiments, the active layer 130 may be formed by using amorphous silicon.

The active pattern 430 may be formed in the peripheral area 20 on the gate insulating layer 150. A first portion of the active pattern 430 may overlap the second portion 472 of the lower wire 470, and a side surface of the first portion of the active pattern 430 may be aligned with a side surface of the gate insulating layer 150 defined by the first opening 151. In the embodiments, the active pattern 430 may be formed simultaneously with the active layer 130 on the same layer as the active layer 130 by using the same material as the active layer 130. For example, after a preliminary active layer is formed over the whole gate insulating layer 150, the active layer 130 and the active pattern 430 may be simultaneously formed on the gate insulating layer 150 by partially etching the preliminary active layer.

Figure 16:
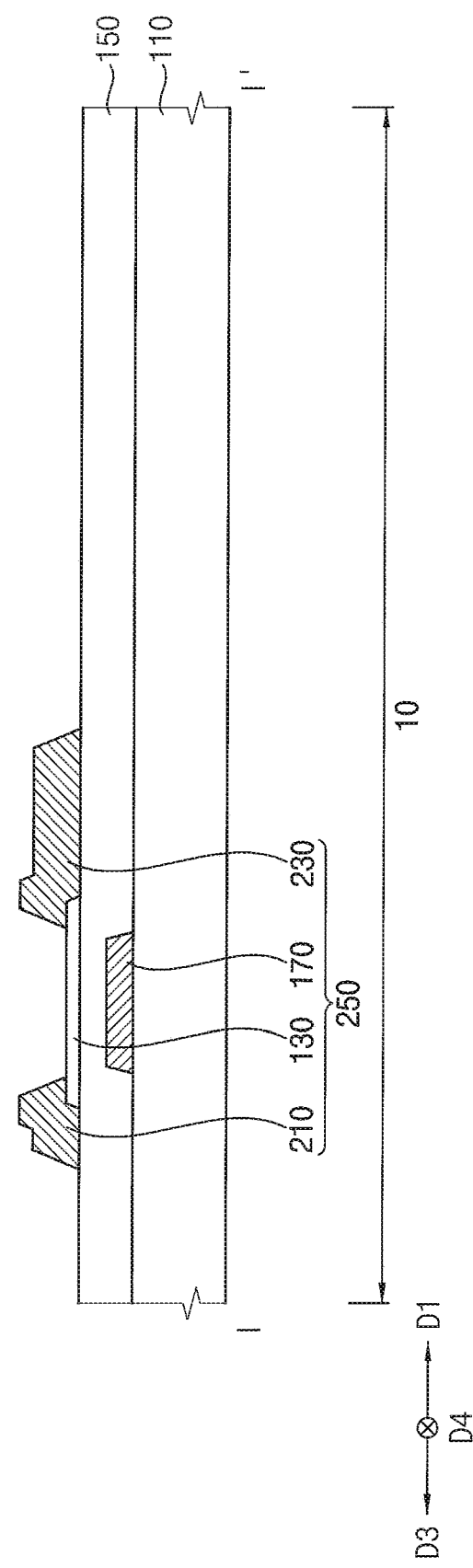
Figure 17:
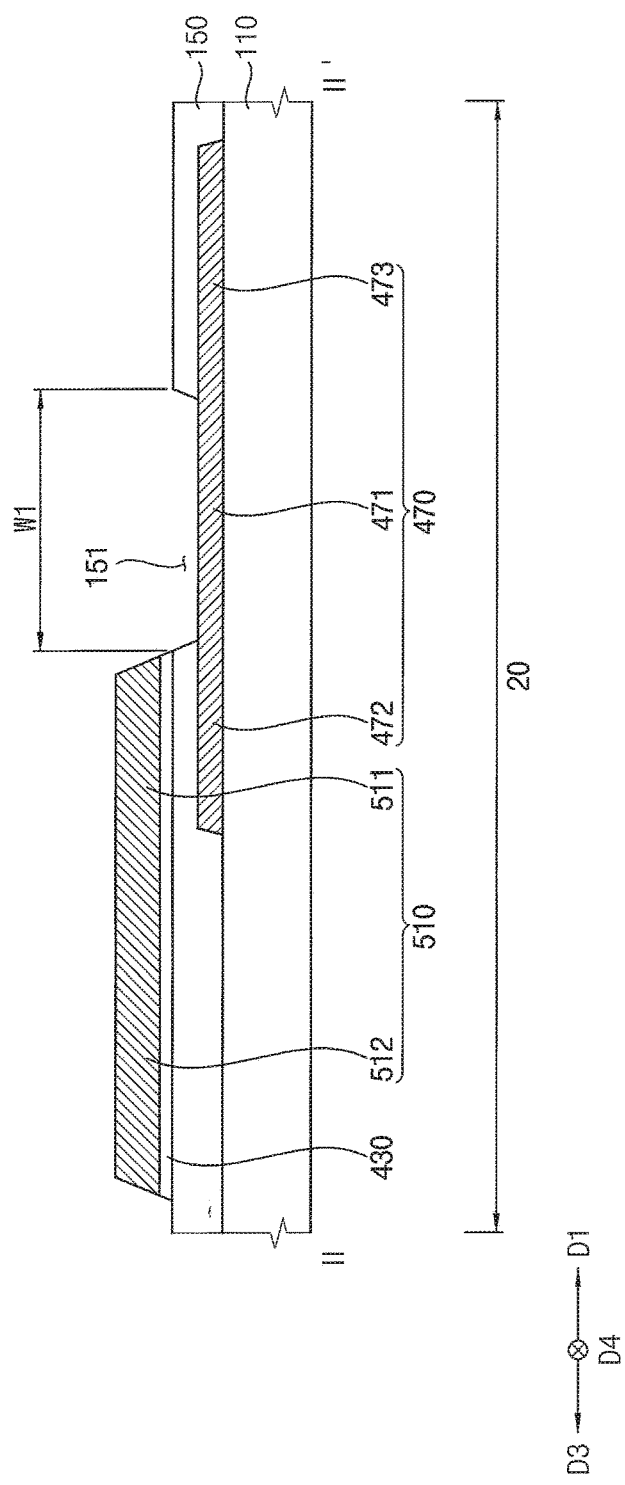

Referring to FIGS. 16 and 17, the source electrode 210 may be formed in the display area 10 on the gate insulating layer 150 and a first portion of the active layer 130. In other words, the source electrode 210 may contact the first portion of the active layer 130. The source electrode 210 may include a metal, an alloy, a metal nitride, a conductive metal oxide, a transparent conductive material, and the like. These may be used alone or in combination with each other.

The drain electrode 230 may be formed in the display area 10 on the gate insulating layer 150 and a second portion of the active layer 130. In other words, the drain electrode 230 may contact the second portion of the active layer 130. The drain electrode 230 may include a metal, an alloy, a metal nitride, a conductive metal oxide, a transparent conductive material, and the like. These materials may be used alone or in combination with each other.

Accordingly, the semiconductor element 250 including the gate electrode 170, the active layer 130, the source electrode 210, and the drain electrode 230 may be formed.

The upper wire 510 may be formed in the peripheral area 20 on the active pattern 430. The upper wire 510 may include a first portion 511 and a second portion 512. In the embodiments, the first portion 511 of the upper wire 510 may overlap the second portion 472 of the lower wire 470, and the second portion 512 of the upper wire 510 may not overlap the lower wire 470. In addition, a side surface of the first portion 511 of the upper wire 510 may be aligned with the side surface of the first portion of the active pattern 430 and the side surface of the gate insulating layer 150 defined by the first opening 151. Moreover, the upper wire 510 may be formed with the source electrode 210 and the drain electrode 230 on the same layer as the source electrode 210 and the drain electrode 230 by using the same material as the source electrode 210 and the drain electrode 230. For example, after a second electrode layer is formed over the whole of the gate insulating layer 150, the active layer 130, the active pattern 430, and the first portion 471 of the lower wire 470, the source electrode 210, the drain electrode 230, and the upper wire 510 may be simultaneously formed by partially etching the second electrode layer.

Figure 18:
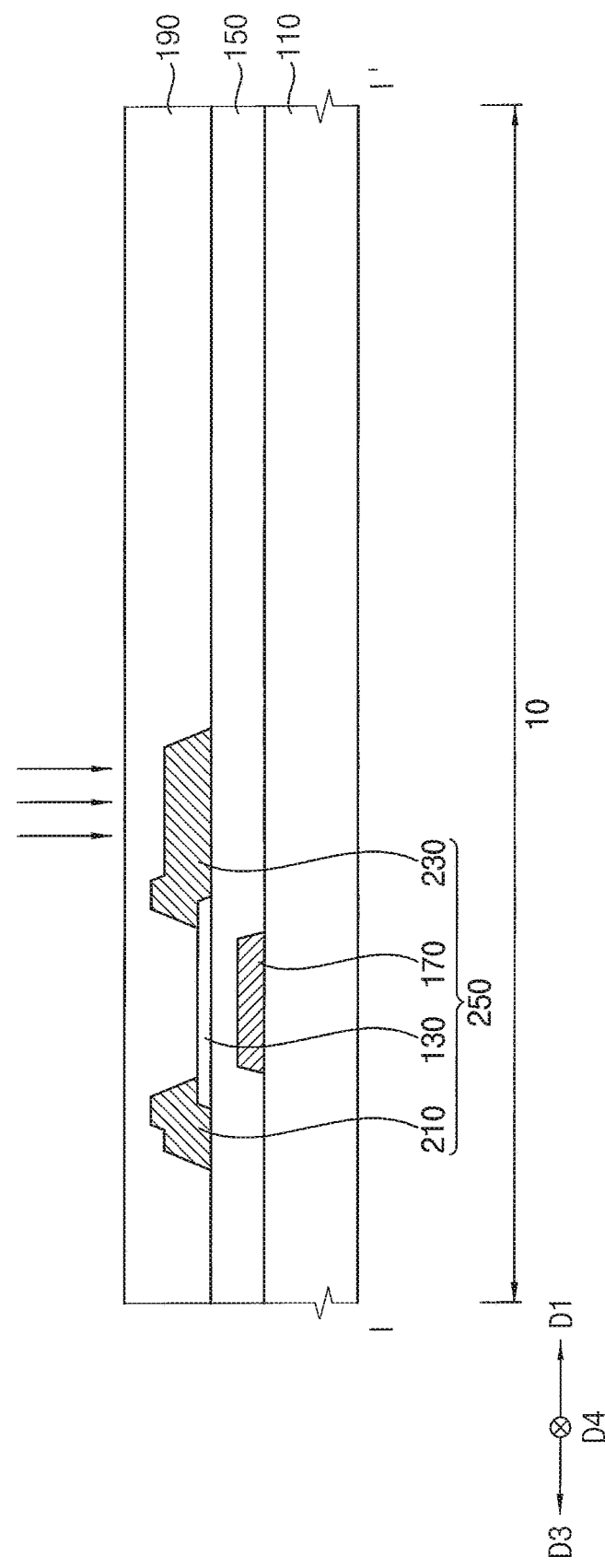
Figure 19:
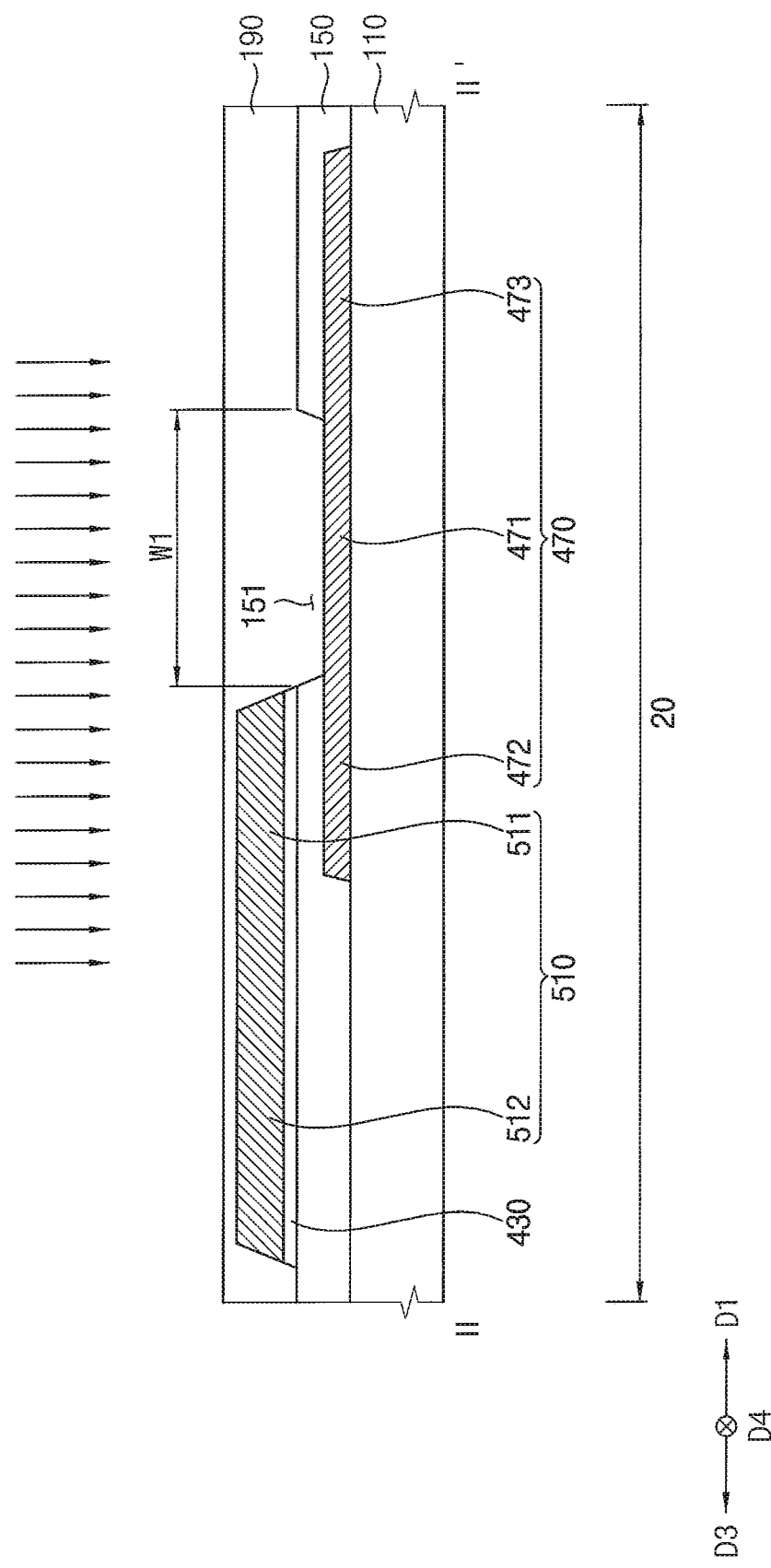

Referring to FIGS. 18 and 19, the interlayer insulating layer 190 may be formed on the gate insulating layer 150, the source electrode 210, the drain electrode 230, the active layer 130, the first portion 471 of the lower wire 470, and the upper wire 510. The interlayer insulating layer 190 may extend to the peripheral area 20 to cover the source electrode 210, the drain electrode 230, and the active layer 130 in the display area 10 on the gate insulating layer 150, and may cover the upper wire 510 and the first portion 471 of the lower wire 470 in the peripheral area 20. For example, the interlayer insulating layer 190 may sufficiently cover the source electrode 210, the drain electrode 230, the active layer 130, the first portion 471 of the lower wire 470, and the upper wire 510 on the gate insulating layer 150, and may have a substantially flat top surface without creating a step around the source electrode 210, the drain electrode 230, the active layer 130, the first portion 471 of the lower wire 470, and the upper wire 510. In some embodiments, the interlayer insulating layer 190 may be formed along a profile of the source electrode 210, the drain electrode 230, the active layer 130, the first portion 471 of the lower wire 470, and the upper wire 510 with a uniform thickness to cover the source electrode 210, the drain electrode 230, the active layer 130, the first portion 471 of the lower wire 470, and the upper wire 510 on the gate insulating layer 150. The interlayer insulating layer 190 may be formed by using a silicon compound, a metal oxide, and the like.

After the interlayer insulating layer 190 is formed, a second etching process may be performed on: the interlayer insulating layer 190 that overlaps a portion under which the drain electrode 230 is located as shown in FIG. 18; and the interlayer insulating layer 190 under which the first portion 511 of the upper wire 510 is located, the interlayer insulating layer 190 under which the first portion 471 of the lower wire 470 is located, and the interlayer insulating layer 190 adjacent to a boundary between the first portion 471 and the third portion 473 of the lower wire 470 as shown in FIG. 19.

Figure 20:
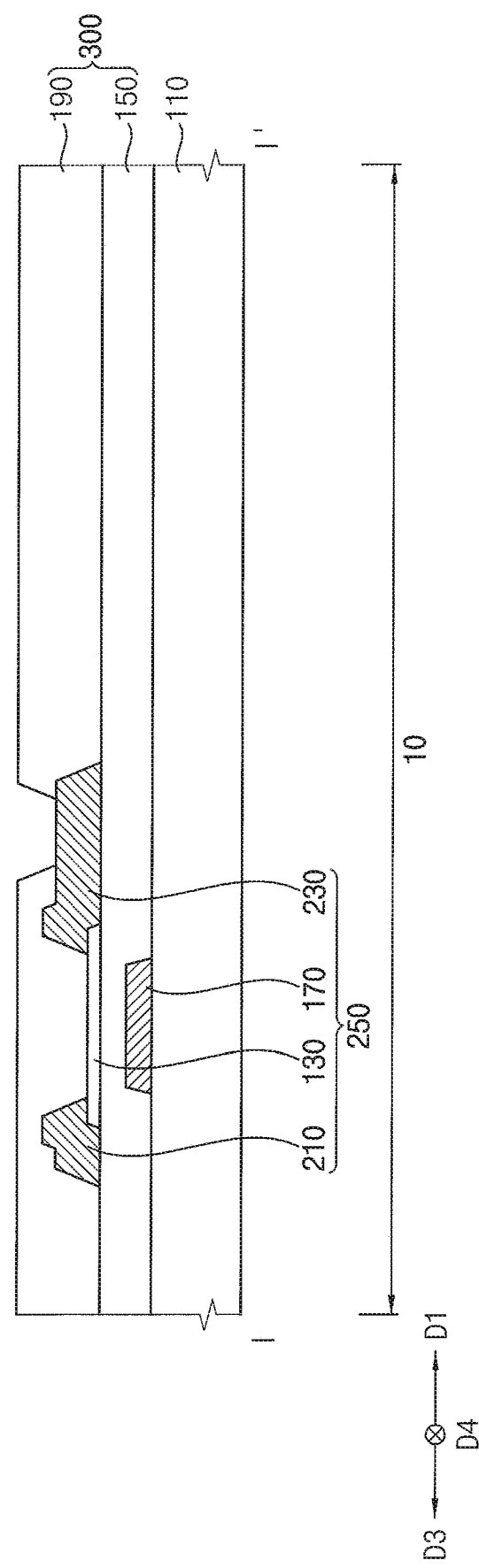
Figure 21:
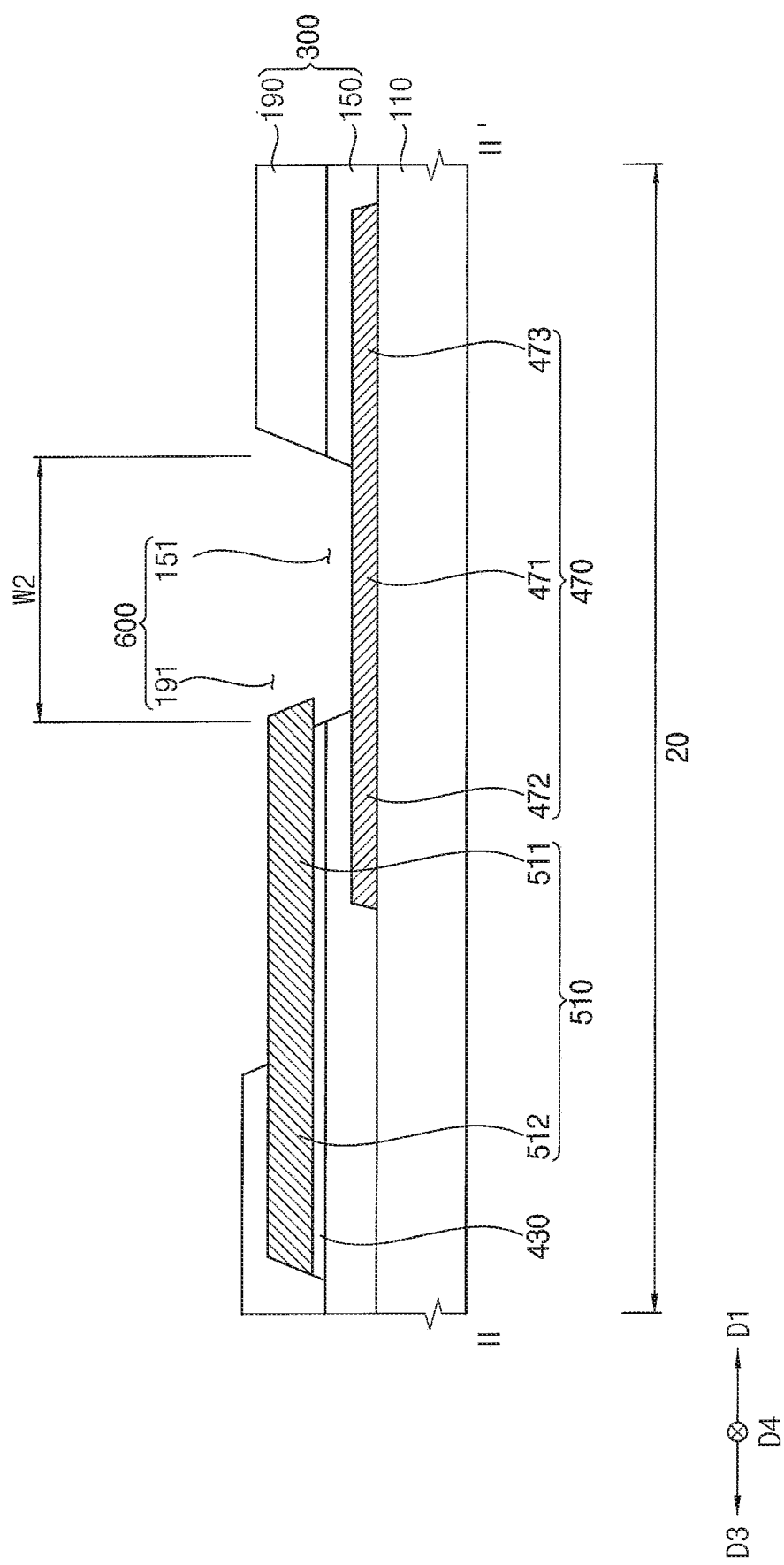

Referring to FIGS. 20 and 21, in the display area 10, a contact hole that exposes a part of the drain electrode 230 may be formed in the interlayer insulating layer 190. In the peripheral area 20, a second opening 191 that exposes the first portion 511 of the upper wire 510 and the first portion 471 of the lower wire 470 may be formed in the interlayer insulating layer 190. While the second etching process is performed, the first width W1 of the first opening 151 may be changed into a second width W2. In this case, the second width W2 may be greater than the first width W1. For example, while the interlayer insulating layer 190 is etched, parts of the gate insulating layer 150 and the active pattern 430 that are adjacent to the first opening 151, e.g., the first opening 151 in FIG. 19, having the first width W1 may be etched, so that the width of the first opening 151 of the gate insulating layer 150 may be increased, and the first opening 151 may have the second width W2. Accordingly, a first side wall of the first opening 151, or a first side surface of the gate insulating layer 150, that is adjacent to the boundary between the first portion 471 and the third portion 473 of the lower wire 470 may be aligned with a side surface of the interlayer insulating layer 190. A second side wall of the first opening 151, or a second side surface of the gate insulating layer 150, opposite to the first side wall of the first opening 151 may extend from the side surface of the first portion 511 of the upper wire 510 in the third direction D3. In other words, a part of the upper wire 510 may protrude in an inward direction of the first opening 151, e.g., in the first direction D1, and the gate insulating layer 150 may have an under-cut shape under the first portion 511 of the upper wire 510.

In addition, while the second etching process is performed, a part of the active pattern 430 may be removed. For example, the side surface of the first portion of the active pattern 430 may be aligned with the second side wall of the first opening 151.

Accordingly, the insulating layer structure 300 including the gate insulating layer 150 that includes the first opening 151 having the second width W2 and the interlayer insulating layer 190 that includes the second opening 191 may be formed. In this case, the first opening 151 having the second width W2 and the second opening 191 may be defined as a contact hole 600 of the insulating layer structure 300.

Figure 22:
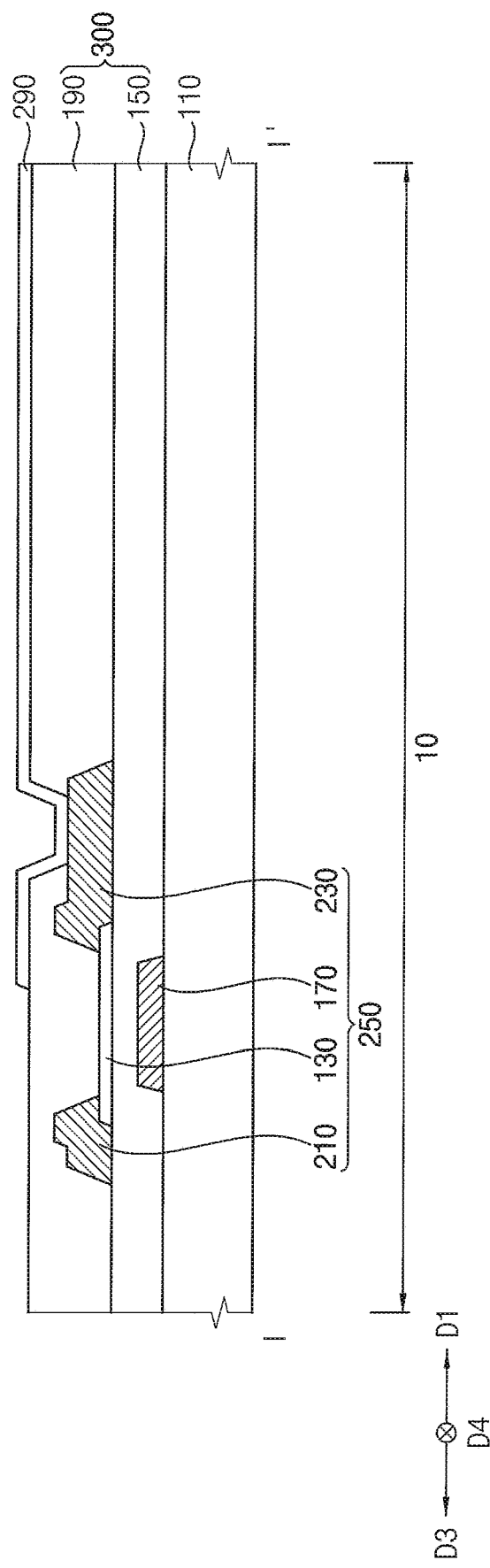

Referring to FIGS. 10 and 22, the pixel electrode 290 may be formed in the display area 10 on the interlayer insulating layer 190. The pixel electrode 290 may contact the drain electrode 230 through a contact hole formed by removing a part of the interlayer insulating layer 190. The pixel electrode 290 may be formed by using a metal, an alloy, a metal nitride, a conductive metal oxide, a transparent conductive material, and the like. These materials may be used alone or in combination with each other.

The connection pattern 590 may be formed in the peripheral area 20 on the interlayer insulating layer 190, the lower wire 470, and the upper wire 510. The connection pattern 590 may be formed on the interlayer insulating layer 190 formed on the second portion 512 of the upper wire 510, the first portion 511 of the upper wire 510, the first portion 471 of the lower wire 470, and the interlayer insulating layer 190 formed on the third portion 473 of the lower wire 470. In some embodiments, the connection pattern 590 may be formed on at least a part of the side surface of the first portion 511 of the upper wire 510.

In the embodiments, due to the under-cut shape of the active pattern 430 and the gate insulating layer 150 under the first portion 511 of the upper wire 510, the connection pattern 590 may include the opening 153 in the contact hole 600. For example, the opening 153 may be formed at a boundary between the first portion 471 and the second portion 472 of the lower wire 470.

The connection pattern 590 may be formed by using a metal, an alloy, a metal nitride, a conductive metal oxide, a transparent conductive material, and the like. These materials may be used alone or in combination with each other.

In the embodiments, the connection pattern 590 may be formed simultaneously with the pixel electrode 290 on the same layer as the pixel electrode 290 by using the same material as the pixel electrode 290. For example, after a third electrode layer is formed over the whole of the interlayer insulating layer 190, the first portion 511 of the upper wire 510, and the first portion 471 of the lower wire 470, the pixel electrode 290 and the connection pattern 590 may be simultaneously formed by partially etching the third electrode layer. However, even when the third electrode layer is formed over the whole lower substrate 110, due to the under-cut structure, e.g., the second side wall of the first opening 151 and a side surface of the active pattern 430, the opening 153 may be formed in the contact hole 600.

Referring to FIG. 8, the lower alignment layer 310 may be formed in the display area 10 on the interlayer insulating layer 190 and the pixel electrode 290. The lower alignment layer 310 may cover the pixel electrode 290 in the display area 10 on the interlayer insulating layer 190. For example, the lower alignment layer 310 may sufficiently cover the pixel electrode 290 on the interlayer insulating layer 190, and may have a substantially flat top surface without creating a step around the pixel electrode 290. Alternatively, the lower alignment layer 310 may be formed along a profile of the pixel electrode 290 with a uniform thickness to cover the pixel electrode 290 on the interlayer insulating layer 190. In the embodiments, the lower alignment layer 310 may be formed by using polyamic acid, polysiloxane, polyimide, and the like.

The liquid crystal layer 330 may be formed in the display area 10 on the lower alignment layer 310. The liquid crystal layer 330 may be formed by using liquid crystal molecules having optical anisotropy.

The upper alignment layer 315 may be formed in the display area 10 on the liquid crystal layer 330. The upper alignment layer 315 may cover the liquid crystal layer 330. For example, the upper alignment layer 315 may sufficiently cover the liquid crystal layer 330, and may have a substantially flat top surface without creating a step around the liquid crystal layer 330. Alternatively, the upper alignment layer 315 may be formed along a profile of the liquid crystal layer 330 with a uniform thickness to cover the liquid crystal layer 330. In the embodiments, the lower alignment layer 310 may be formed by using the same material as the lower alignment layer 310.

The common electrode 340 may be formed in the display area 10 on the upper alignment layer 315. The common electrode 340 may be formed by using a metal, an alloy, a metal nitride, a conductive metal oxide, a transparent conductive material, and the like. These materials may be used alone or in combination with each other.

Accordingly, the light emitting structure 200 including the pixel electrode 290, the liquid crystal layer 330, and the common electrode 340 may be formed.

The coating layer 390 may be formed in the display area 10 on the common electrode 340. The coating layer 390 may planarize a step difference between the black matrix 370 and the color filter 350, and may protect the black matrix 370 and the color filter 350. For example, the coating layer 390 may sufficiently cover the black matrix 370 and the color filter 350, and may have a substantially flat top surface without creating a step around the black matrix 370 and the color filter 350. The coating layer 390 may be formed by using an organic material such as a photoresist, polyacryl, polyimide, polyamide, siloxane, acryl, and epoxy.

The black matrix 370 may be formed in the display area 10 on the coating layer 390. The black matrix 370 may overlap the semiconductor element 250. The black matrix 370 may be formed by using an organic material such as a photoresist, a polyacryl-based resin, a polyimide-based resin, a polyamide-based resin, a siloxane-based resin, an acryl-based resin, and an epoxy-based resin. In addition, the black matrix 370 may be substantially opaque. For example, the black matrix 370 may further be formed by using a light blocking material to absorb light. The light blocking material may include carbon black, titanium nitride oxide, titanium black, phenylene black, aniline black, cyanine black, nigrosine acid black, a black resin, and the like.

The color filter 350 may be formed in the display area 10 on the coating layer 390. The color filter 350 may overlap the pixel electrode 290. The color filter 350 may include a red color filter, a green color filter, or a blue color filter. The color filter 350 may be formed by using a photosensitive resin and a color photoresist.

The upper substrate 410 may be formed on the black matrix 370 and the color filter 350. The upper substrate 410 may face (or may be opposite to) the lower substrate 110. The upper substrate 410 and the lower substrate 110 may include substantially the same material. For example, the upper substrate 410 may be formed by using a quartz substrate, a synthetic quartz substrate, a calcium fluoride substrate, a fluorine-doped quartz substrate, a soda lime glass substrate, a non-alkali glass substrate, and the like.

Accordingly, the display device 700 shown in FIGS. 1 to 5, 7, and 10 may be manufactured.

Figure 23:
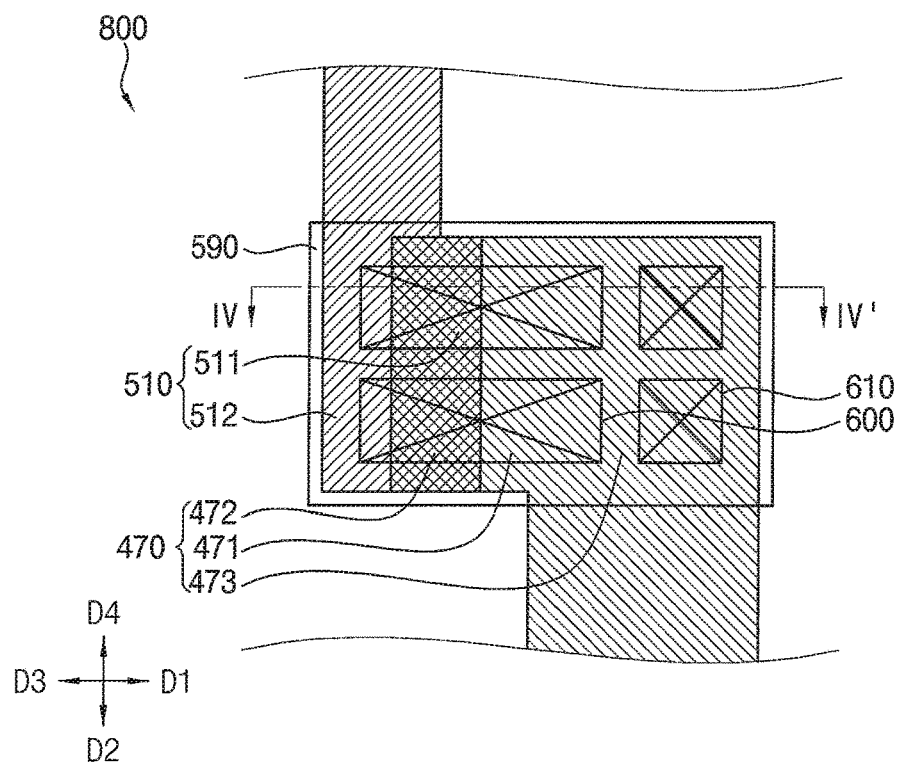
FIG. 23 is a plan view showing a display device according to embodiments.
Figure 24:
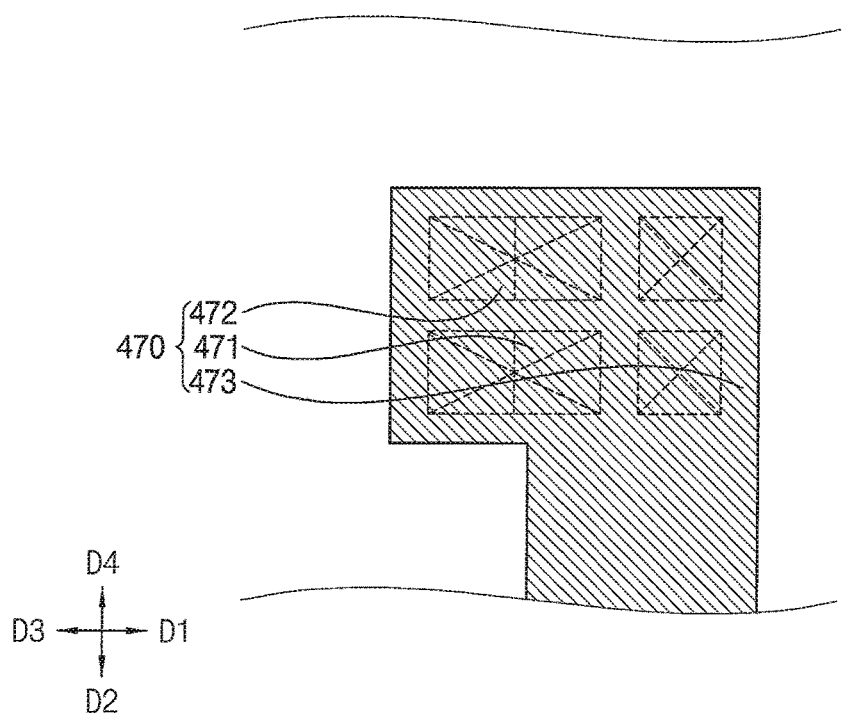

FIG. 23 is a plan view showing a display device 800 according to embodiments. FIGS. 24 to 26 are layout views showing a lower wire, an upper wire, and a connection electrode of FIG. 23, respectively. The display device 800 illustrated in FIGS. 24 to 26 may have a configuration that is substantially identical or similar to the configuration of the display device 100 described with reference to FIGS. 2 to 5 except for a second contact hole 610. In FIGS. 24 to 26, redundant descriptions of components that are substantially identical or similar to the components described with reference to FIGS. 2 to 5 will be omitted.

Referring to FIGS. 23, 24, 25, and 26, the display device 800 may include a lower wire 470, an upper wire 510, a connection pattern 590, and the like. In this case, the lower wire 470 may include a first portion 471, a second portion 472, and a third portion 473, and the upper wire 510 may include a first portion 511 and a second portion 512.

The lower wire 470, the upper wire 510, and the connection pattern 590 may be disposed in the peripheral area 20 of the display device 800. For example, as described in FIG. 1, in the peripheral area 20, the wires configured to connect the pad electrode 480 to the diodes included in the antistatic structure 630, the wires configured to connect the diodes to the light emitting structure, the wires configured to connect the diodes to the gate signal lines and the clock signal lines included in the circuit structure 620, the gate signal lines configured to apply the gate signals to the transistors included in the circuit structure 620, and the clock signal lines configured to apply the clock signals to the transistors may include the lower wire 470 and the upper wire 510, and the connection pattern 590 may electrically connect the lower wire 470 to the upper wire 510 through a first contact hole 600 and the second contact hole 610.

As shown in FIGS. 23 and 24, when viewed in a plan view of the display device 800, the third portion 473 of the lower wire 470 may have a rectangular shape, and one part of the third portion 473 may extend in the second direction D2. For example, the one part of the third portion 473 may extend in the second direction D2 so as to be connected to the pad electrode 480. A portion of the lower wire 470 that is located in the first contact hole 600 and does not overlap the upper wire 510 may be defined as the first portion 471. A portion of the lower wire 470 that is located in the first contact hole 600 and overlaps the upper wire 510 may be defined as the second portion 472. Therefore, a remaining portion of the lower wire 470 except for a portion where the first contact hole 600 is located, e.g., the first portion 471 and the second portion 472, may be defined as the third portion 473.

As shown in FIGS. 23 and 25, the upper wire 510 may be disposed on the lower wire 470. When viewed in a plan view of the display device 800, the second portion 512 of the upper wire 510 may have a rectangular shape, and one part of the second portion 512 may extend in a fourth direction D4. For example, the one part of the second portion 512 may extend in the fourth direction D4 so that the one part of the second portion 512 may be connected to the transistor of the circuit structure 620, the clock signal line and the gate signal line, or the diode of the antistatic structure 630. The upper wire 510 located in the first contact hole 600 may be defined as the first portion 511. The first portion 511 may correspond to a portion that overlaps the lower wire 470 (or a portion exposed by the first contact hole 600). Therefore, a remaining portion of the upper wire 510 except for a portion where the first contact hole 600 is located, e.g., the first portion 511, may be defined as the second portion 512.

As shown in FIGS. 23 and 26, the connection pattern 590 may be disposed on the upper wire 510. The connection pattern 590 may electrically connect the lower wire 470 to the upper wire 510 through the first contact hole 600, and may be electrically connected to the lower wire 470 through the second contact hole 610. In the embodiments, the connection pattern 590 may have an opening 153 at a boundary between the first portion 511 of the upper wire 510 and the first portion 471 of the lower wire 470 in the first contact hole 600. Due to the opening 153, a current may not flow through the connection pattern 590 in the first direction D1 within the first contact hole 600, but the current may flow through a first path a1 and a second path a2 as shown in FIG. 5. Accordingly, even when the opening 153 is formed in the connection pattern 590, the lower wire 470 and the upper wire 510 may be electrically connected to each other by the connection pattern 590.

In the display device 800 according to the embodiments, at least a part of each of the lower wire 470 and the upper wire 510 overlap each other, so that the lower wire 470 and the upper wire 510 may partially overlap each other in a portion where the first contact hole 600 is formed. The connection pattern 590 may be electrically connected to each of the lower wire 470 and the upper wire 510 through one contact hole, e.g., the first contact hole 600. In addition, the connection pattern 590 may be electrically connected to the lower wire 470 through the second contact hole 610 formed in the third portion 473 of the lower wire 470. In other words, although the connection pattern 590 having the same width as in the related art is disposed, the number of contact holes may be relatively increased. Accordingly, the contact resistance between the connection pattern 590 and the lower and upper wires 470 and 510 may be relatively reduced.

Figure 27:
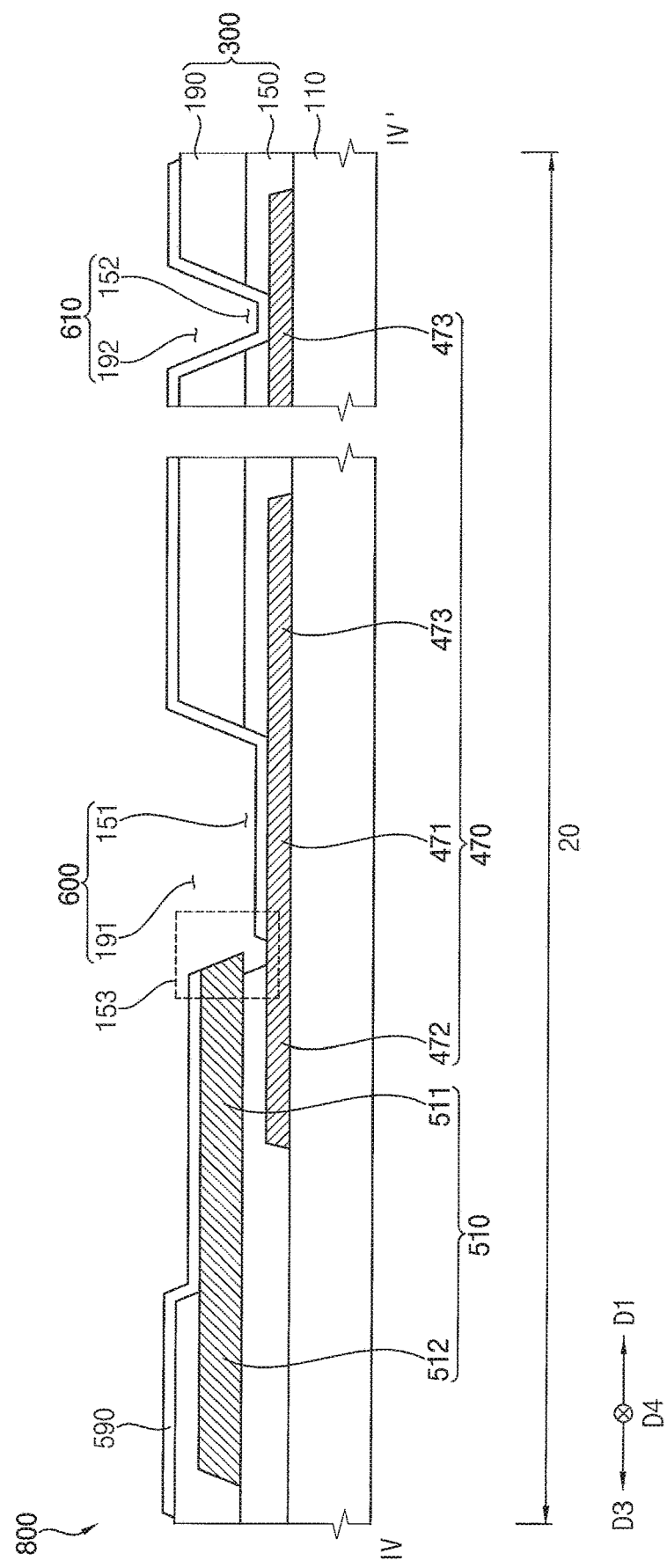
FIG. 27 is a sectional view taken along line IV-IV' of FIG. 23.
Figure 28:
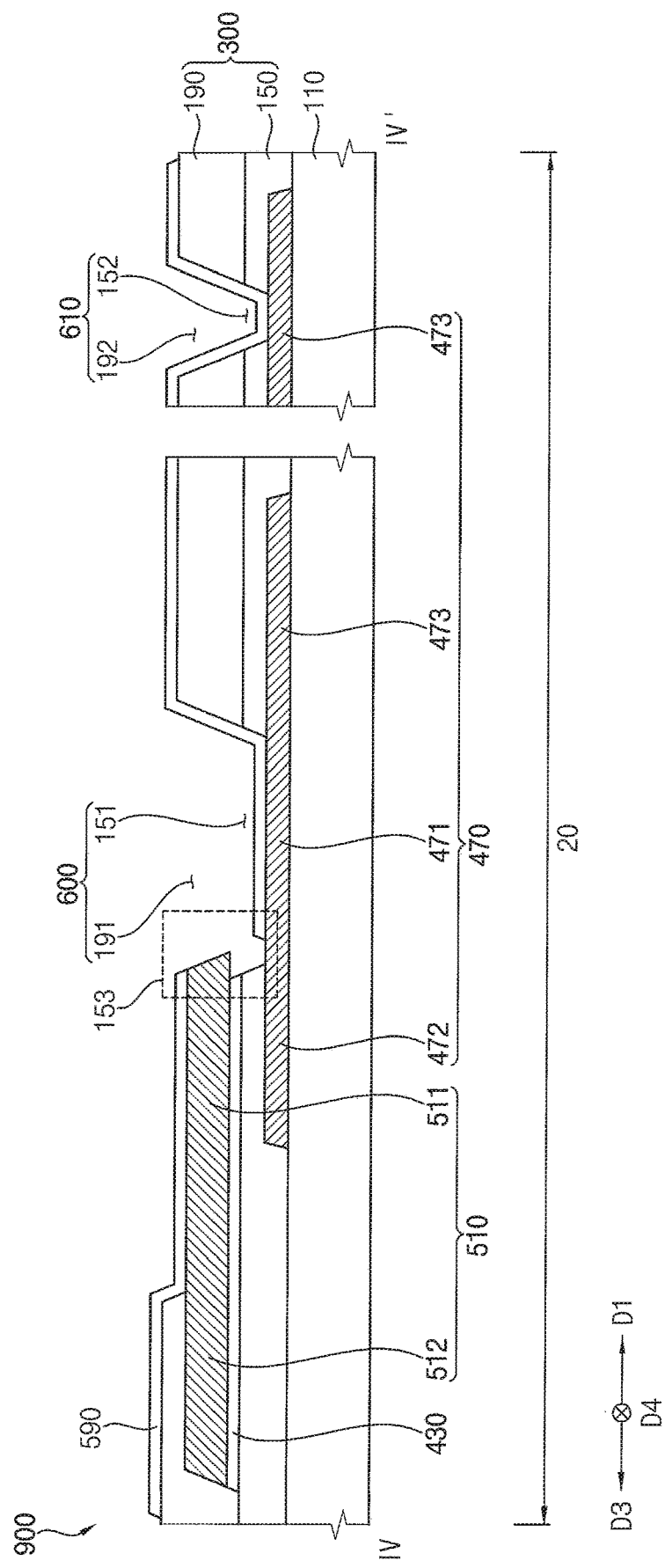
FIG. 28 is a sectional view showing a display device according to embodiments.

FIG. 27 is a sectional view taken along line IV-IV' of FIG. 23. FIG. 28 is a sectional view showing a display device 900 according to embodiments. Display devices 800 and 900 illustrated in FIGS. 27 and 28 may have a configuration that is substantially identical or similar to the configuration of the display device 100 described with reference to FIGS. 6 to 8 except for the second contact hole 610 and the active pattern 430. In FIGS. 27 and 28, redundant descriptions of components that are substantially identical or similar to the components described with reference to FIGS. 6 to 8 will be omitted.

Referring to FIGS. 8 and 27, the display device 800 may include a lower substrate 110, a semiconductor element 250, an insulating layer structure 300, a lower wire 470, an upper wire 510, a connection pattern 590, a light emitting structure 200, a lower alignment layer 310, an upper alignment layer 315, a coating layer 390, a black matrix 370, a color filter 350, an upper substrate 410, and the like. In this case, the insulating layer structure 300 may include a gate insulating layer 150 and an interlayer insulating layer 190. In addition, the lower wire 470 may include a first portion 471, a second portion 472, and a third portion 473. The upper wire 510 may include a first portion 511 and a second portion 512. In the sectional view of the display device 800 of FIG. 27, the first portion 471 of the lower wire 470 may have a shape protruding from the third portion 473 in the third direction D3. The second portion 472 of the lower wire 470 may have a shape protruding from the first portion 471 in the third direction D3. In other words, the first portion 471 may be located between the second portion 472 and the third portion 473. In addition, in the sectional view of the display device 800 of FIG. 27, the first portion 511 of the upper wire 510 may have a shape protruding from the second portion 512 in the first direction D1.

The gate insulating layer 150 may be disposed on the lower substrate 110, the gate electrode 170, and the lower wire 470. The gate insulating layer 150 may extend to the peripheral area 20 to cover the gate electrode 170 in the display area 10 on the lower substrate 110, and may cover the second portion 472 and a part of the third portion 473 of the lower wire 470 in the peripheral area 20. In other words, the second portion 472 and a part of the third portion 473 of the lower wire 470 may be covered with the gate insulating layer 150. In the embodiments, the gate insulating layer 150 may include a first opening 151 that exposes the first portion 471 of the lower wire 470, and a second opening 152 that exposes a part of the third portion 473 of the lower wire 470. In addition, the first opening 151 of the gate insulating layer 150 may extend from a side surface of the first portion 511 of the upper wire 510 in the third direction D3. That is, a part of the upper wire 510 may protrude in the inward direction of the first opening 151. In other words, the gate insulating layer 150 may have an under-cut shape under the first portion 511 of the upper wire 510.

For example, the gate insulating layer 150 may sufficiently cover the gate electrode 170 and the lower wire 470 on the lower substrate 110 except for the first portion 471 of the lower wire 470, e.g., the first opening 151, and a part of the third portion 473 of the lower wire 470, e.g., the second opening 152, and may have a substantially flat top surface without creating a step around the gate electrode 170 and the lower wire 470. In some embodiments, the gate insulating layer 150 may be disposed along a profile of the gate electrode 170 and the lower wire 470 with a uniform thickness to cover the gate electrode 170 and the lower wire 470 on the lower substrate 110 except for the first portion 471 of the lower wire 470, e.g., the first opening 151, and a part of the third portion 473 of the lower wire 470, e.g., the second opening 152. The gate insulating layer 150 may include a silicon compound, metal oxide, and the like.

The interlayer insulating layer 190 may be disposed on the gate insulating layer 150, the source electrode 210, the drain electrode 230, the active layer 130, and a part of the upper wire 510. The interlayer insulating layer 190 may extend to the peripheral area 20 to cover the source electrode 210, the drain electrode 230, and the active layer 130 in the display area 10 on the gate insulating layer 150. The interlayer insulating layer 190 may cover the second portion 512 of the upper wire 510 and the gate insulating layer 150 disposed on a part of the third portion 473 of the lower wire 470 in the peripheral area 20. In other words, the gate insulating layer 150 disposed on a part of the third portion 473 of the lower wire 470 may be covered with the interlayer insulating layer 190. In the embodiments, the interlayer insulating layer 190 may include a third opening 191 that exposes the first portion 511 of the upper wire 510 and the first portion 471 of the lower wire 470, and a fourth opening 192 that exposes a part of the third portion 473 of the lower wire 470. In addition, the third opening 191 may completely overlap the first opening 151, and the fourth opening 192 may completely overlap the second opening 152. In other words, a size of the third opening 191 may be greater than a size of the first opening 151, and a size of the fourth opening 192 may be greater than a size of the second opening 152.

For example, the interlayer insulating layer 190 may sufficiently cover the source electrode 210, the drain electrode 230, the active layer 130, and the upper wire 510 on the gate insulating layer 150 except for the first opening 151, the second opening 152, the third opening 191, and the fourth opening 192. The interlayer insulating layer 190 may have a substantially flat top surface without creating a step around the source electrode 210, the drain electrode 230, the active layer 130, and the upper wire 510. In some embodiments, the interlayer insulating layer 190 may be disposed along a profile of the source electrode 210, the drain electrode 230, the active layer 130, and the upper wire 510 with a uniform thickness to cover the source electrode 210, the drain electrode 230, the active layer 130, and the upper wire 510 on the gate insulating layer 150 except for the first opening 151, the second opening 152, the third opening 191, and the fourth opening 192. The interlayer insulating layer 190 may include a silicon compound, a metal oxide, and the like.

Accordingly, the insulating layer structure 300 including the gate insulating layer 150 having the first opening 151 and the second opening 152, and the interlayer insulating layer 190 having the third opening 191 and the fourth opening 192 may be provided. In this case, the first opening 151 and the third opening 191 may be defined as the first contact hole 600 of the insulating layer structure 300. The second opening 152 and the fourth opening 192 may be defined as the second contact hole 610 of the insulating layer structure 300.

Referring to FIGS. 8 and 28, the display device 900 may include a lower substrate 110, a semiconductor element 250, an insulating layer structure 300, a lower wire 470, an active pattern 430, an upper wire 510, a connection pattern 590, a light emitting structure 200, a lower alignment layer 310, an upper alignment layer 315, a coating layer 390, a black matrix 370, a color filter 350, an upper substrate 410, and the like. In this case, the insulating layer structure 300 may include a gate insulating layer 150 and an interlayer insulating layer 190. In addition, the lower wire 470 may include a first portion 471, a second portion 472, and a third portion 473. The upper wire 510 may include a first portion 511 and a second portion 512. In the sectional view of the display device 900 of FIG. 28, the first portion 471 of the lower wire 470 may have a shape protruding from the third portion 473 in the third direction D3. The second portion 472 of the lower wire 470 may have a shape protruding from the first portion 471 in the third direction D3. In other words, the first portion 471 may be located between the second portion 472 and the third portion 473. In addition, in the sectional view of the display device 900 of FIG. 28, the first portion 511 of the upper wire 510 may have a shape protruding from the second portion 512 in the first direction D1.

The active pattern 430 may be disposed in the peripheral area 20 on the gate insulating layer 150. The active pattern 430 may be disposed between the upper wire 510 and the lower wire 470, and may contact a bottom surface of the upper wire 510. In other words, a first portion of the active pattern 430 may overlap the second portion 472 of the lower wire 470, and a side surface of the first portion of the active pattern 430 may be aligned with a side surface of the gate insulating layer 150 defined by a first opening 151. A second portion opposite to the first portion of the active pattern 430 may overlap the second portion 512 of the upper wire 510. In the embodiments, the active pattern 430 may expose a part of a bottom surface of the first portion 511 of the upper wire 510. In addition, the active pattern 430 may be located on the same layer as the active layer 130, and the active pattern 430 and the active layer 130 may include the same material.

Figure 29:
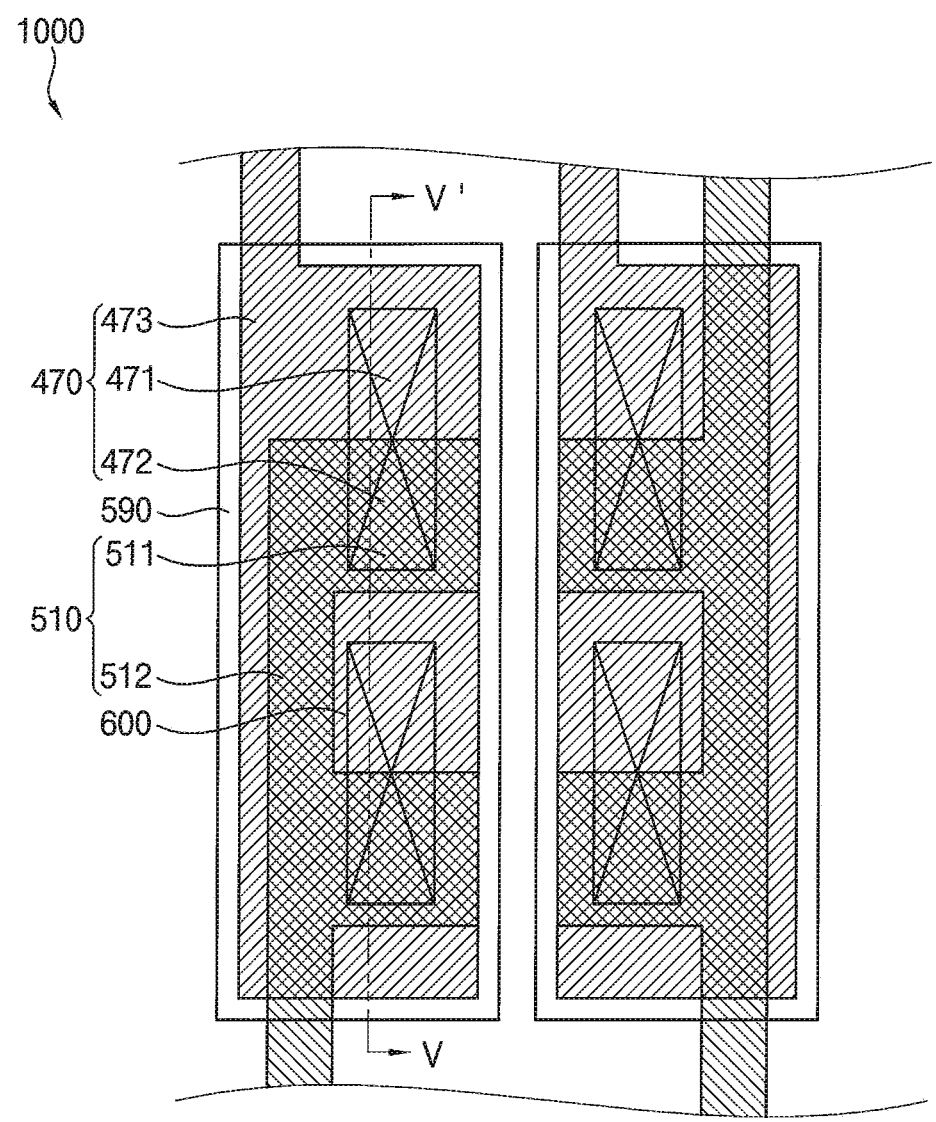
FIG. 29 is a plan view showing a display device according to embodiments.
Figure 30:
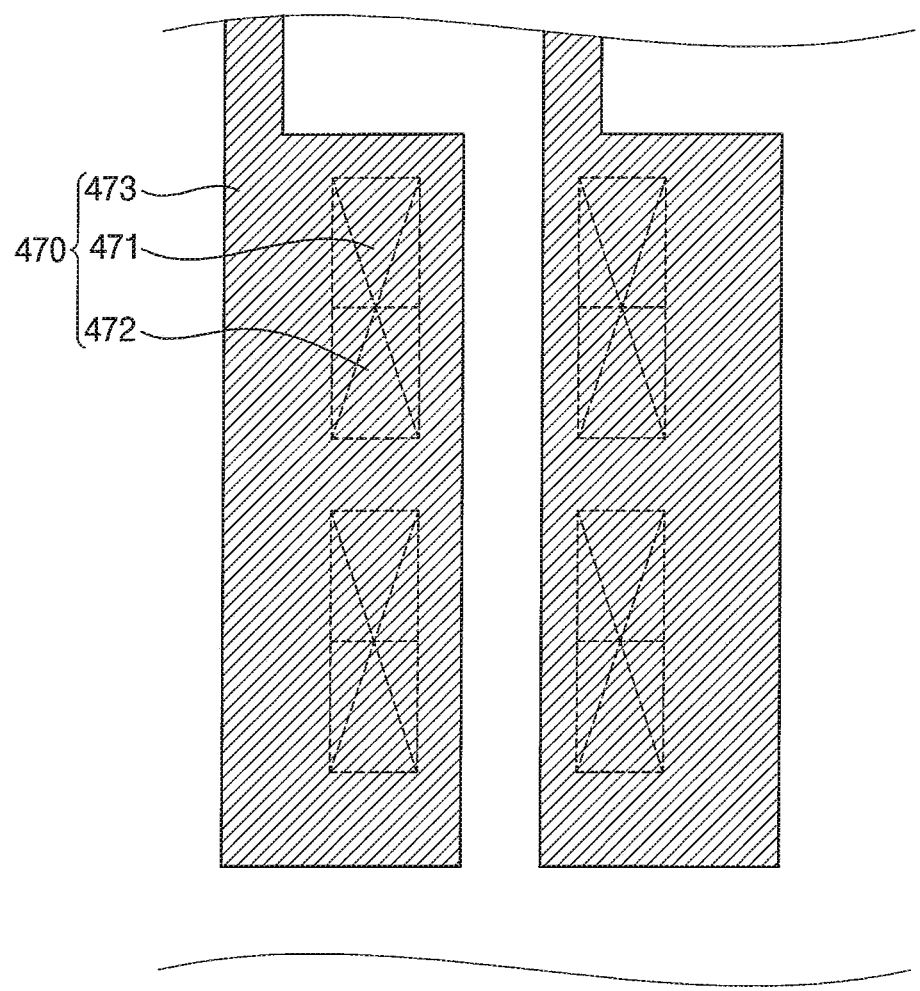
FIGS. 30, 31, and 32 are layout views showing a lower wire, an upper wire, and a connection electrode of FIG. 29, respectively.
Figure 31:
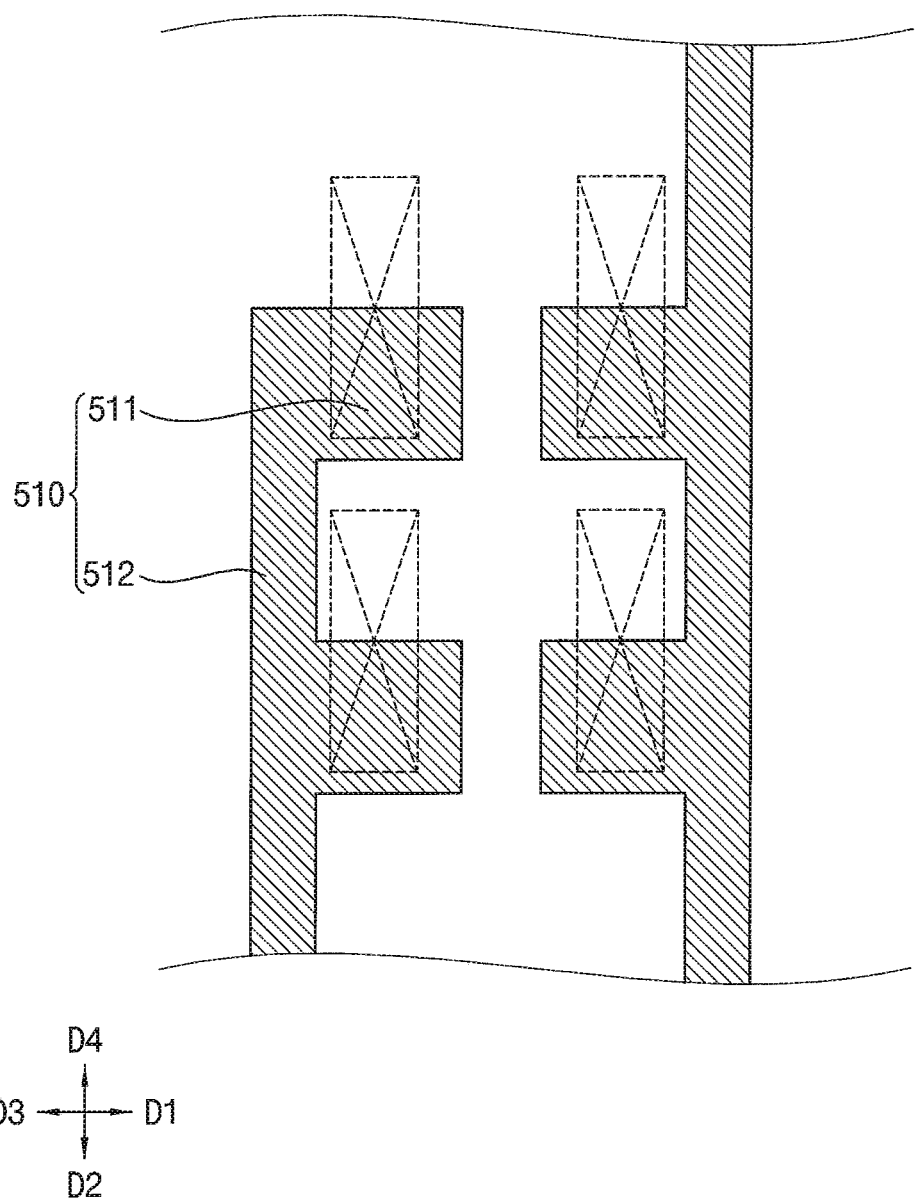
Figure 32:
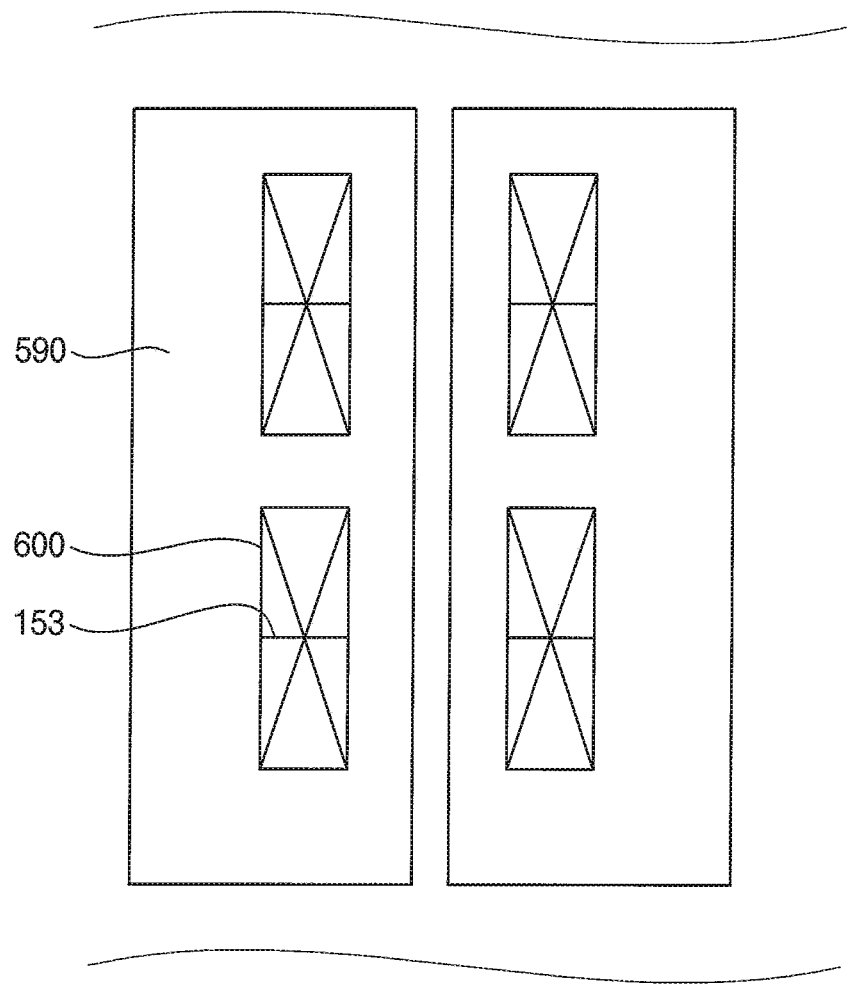
Figure 33:
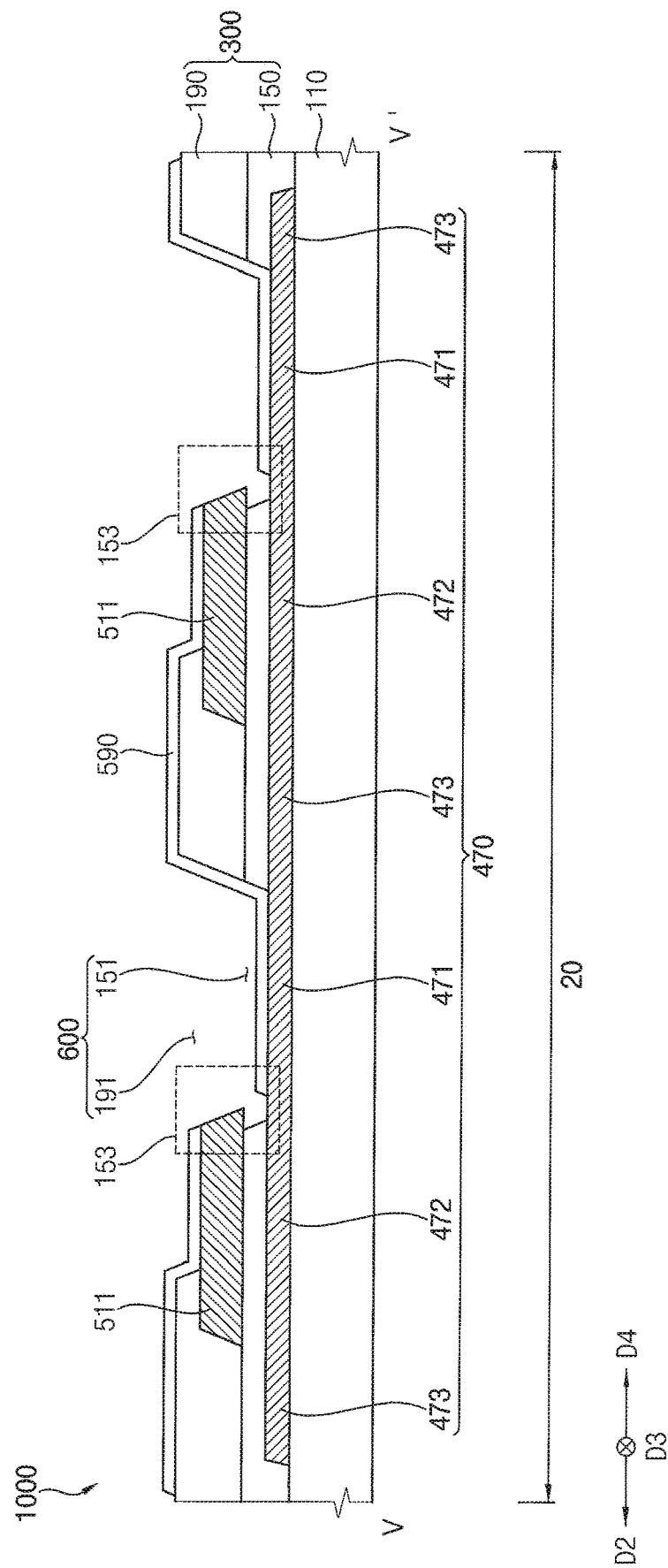
FIG. 33 is a sectional view showing the display device according to embodiments.

FIG. 29 is a plan view showing a display device 1000 according to embodiments. FIGS. 30 to 32 are layout views showing a lower wire, an upper wire, and a connection electrode of FIG. 29, respectively. FIG. 33 is a sectional view showing the display device 1000 according to embodiments. The display device 1000 illustrated in FIGS. 29 to 33 may have a configuration that is substantially identical or similar to the configuration of the display device 100 described with reference to FIGS. 2 to 8 except for a shape of the upper wire 510. In FIGS. 29 to 33, redundant descriptions of components that are substantially identical or similar to the components described with reference to FIGS. 2 to 8 will be omitted.

Referring to FIGS. 8, 29, 30, 31, 32, and 33, the display device 1000 may include a lower substrate 110, a semiconductor element 250, an insulating layer structure 300, a lower wire 470, an upper wire 510, a connection pattern 590, a light emitting structure 200, a lower alignment layer 310, an upper alignment layer 315, a coating layer 390, a black matrix 370, a color filter 350, an upper substrate 410, and the like. In this case, the semiconductor element 250 may include a gate electrode 170, an active layer 130, a source electrode 210, and a drain electrode 230. The insulating layer structure 300 may include a gate insulating layer 150 and an interlayer insulating layer 190. In addition, the light emitting structure 200 may include a pixel electrode 290, a liquid crystal layer 330, and a common electrode 340. Moreover, the lower wire 470 may include a first portion 471, a second portion 472, and a third portion 473. The upper wire 510 may include a first portion 511 and a second portion 512. In the sectional view of the display device 1000 of FIG. 33, the first portion 471 of the lower wire 470 may have a shape protruding from the third portion 473 in the second direction D2, and the second portion 472 of the lower wire 470 may have a shape protruding from the first portion 471 in the second direction D2. In other words, the first portion 471 may be located between the second portion 472 and the third portion 473. In addition, in the plan views of the display device 1000 of FIGS. 29, 31, the first portion 511 of the upper wire 510 may have a shape protruding from the second portion 512 in the first direction D1.

As shown in FIGS. 29, 30, and 33, when viewed in a plan view of the display device 1000, the third portion 473 of the lower wire 470 may have a rectangular shape, and one part of the third portion 473 may extend in the fourth direction D4. A portion of the lower wire 470 that is located in the contact hole 600 and does not overlap the upper wire 510 may be defined as the first portion 471. A portion of the lower wire 470 that is located in the contact hole 600 and overlaps the upper wire 510 may be defined as the second portion 472. Therefore, a remaining portion of the lower wire 470 except for a portion where the contact hole 600 is located, e.g., the first portion 471 and the second portion 472, may be defined as the third portion 473.

For example, the second portion 472 may correspond to a portion that is not exposed by the contact hole 600 since the second portion 472 overlaps the first portion 511, and the first portion 471 may correspond to a portion that is exposed by the contact hole 600 when the connection pattern 590 is not disposed.

As shown in FIGS. 29, 31, and 33, the upper wire 510 may be disposed on the lower wire 470. When viewed in a plan view of the display device 1000, the second portion 512 of the upper wire 510 may have a rectangular shape, and one part of the second portion 512 may extend in the second direction D2 and/or the fourth direction D4. The upper wire 510 located in the contact hole 600 may be defined as the first portion 511, and the first portion 511 may correspond to a portion that overlaps the lower wire 470 (or a portion exposed by the contact hole 600). Therefore, a remaining portion of the upper wire 510 except for a portion where the contact hole 600 is located, e.g., the first portion 511, may be defined as the second portion 512.

As shown in FIGS. 29, 32, and 33, the connection pattern 590 may be disposed on the upper wire 510. The connection pattern 590 may electrically connect the lower wire 470 to the upper wire 510 through the contact hole 600. In the embodiments, the connection pattern 590 may have an opening 153 at a boundary between the first portion 511 of the upper wire 510 and the first portion 471 of the lower wire 470 in the contact hole 600. Due to the opening 153, a current may not flow through the connection pattern 590 in the fourth direction D4 within the contact hole 600, but the current may flow through a first path a1 and a second path a2 as shown in FIG. 5. Accordingly, even when the opening 153 is formed in the connection pattern 590, the lower wire 470 and the upper wire 510 may be electrically connected to each other by the connection pattern 590.

Figure 34:
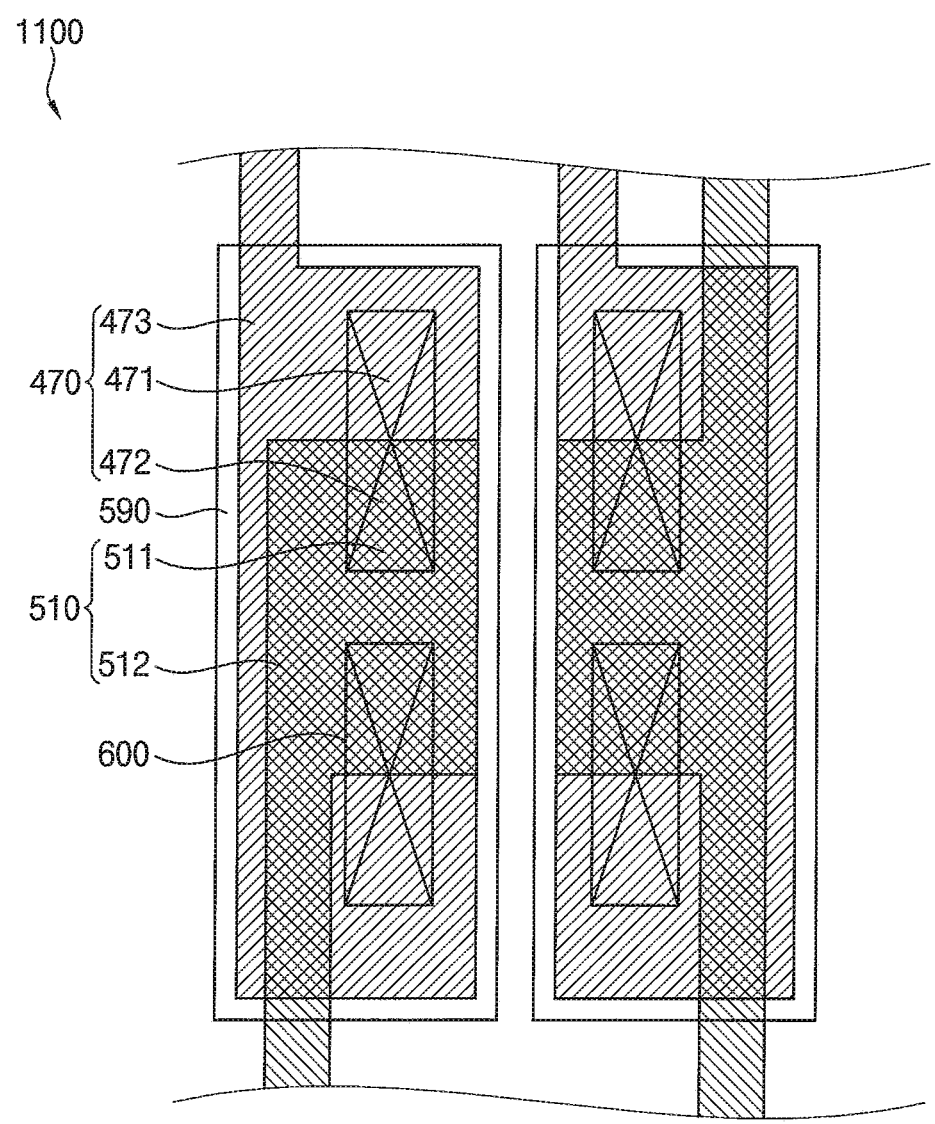
FIG. 34 is a plan view showing a display device according to embodiments.

FIG. 34 is a plan view showing a display device 1100 according to embodiments. The display device 1100 illustrated in FIG. 34 may have a configuration that is substantially identical or similar to the configuration of the display device 1000 described with reference to FIGS. 29 to 33 except for the shape of the upper wire 510. In FIG. 34, redundant descriptions of components that are substantially identical or similar to the components described with reference to FIGS. 29 to 33 will be omitted.

Referring to FIG. 34, the upper wire 510 may be disposed on the lower wire 470. When viewed in a plan view of the display device 1100, the second portion 512 of the upper wire 510 may have a rectangular shape, and one part of the second portion 512 may extend in the second direction D2 and/or the fourth direction D4. The upper wire 510 located in the contact hole 600 may be defined as the first portion 511, and the first portion 511 may correspond to a portion that overlaps the lower wire 470 (or a portion exposed by the contact hole 600). Therefore, a remaining portion of the upper wire 510 except for a portion where the contact hole 600 is located, e.g., the first portion 511, may be defined as the second portion 512.

When compared with the upper wire 510 of FIG. 31, the upper wire 510 of FIG. 34 may also be disposed in a space between contact holes 600 adjacent to each other in the second direction D2 (or the fourth direction D4), so that the wire resistance may be relatively reduced.

Figure 35:
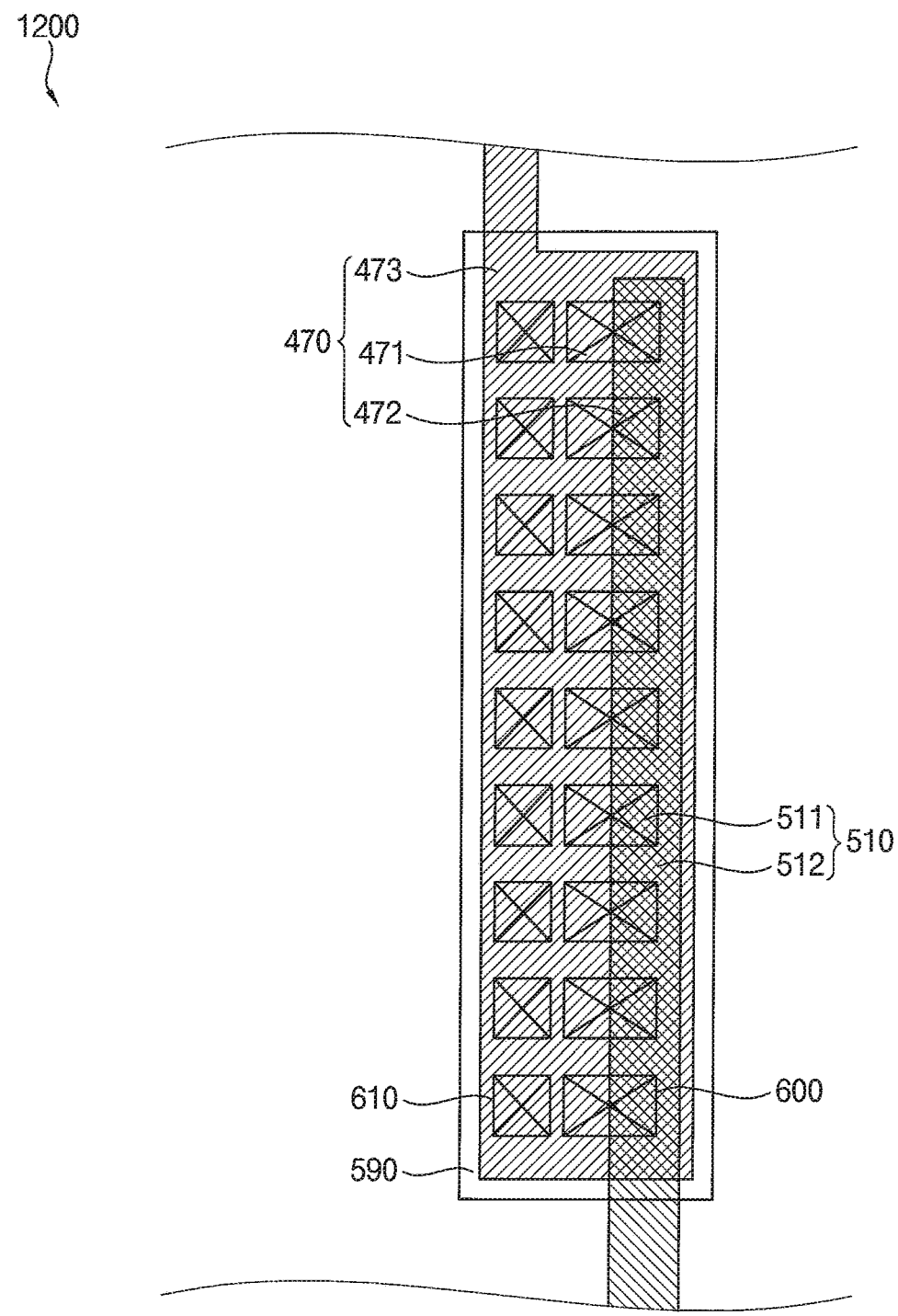
FIG. 35 is a plan view showing a display device according to embodiments.
Figure 37:
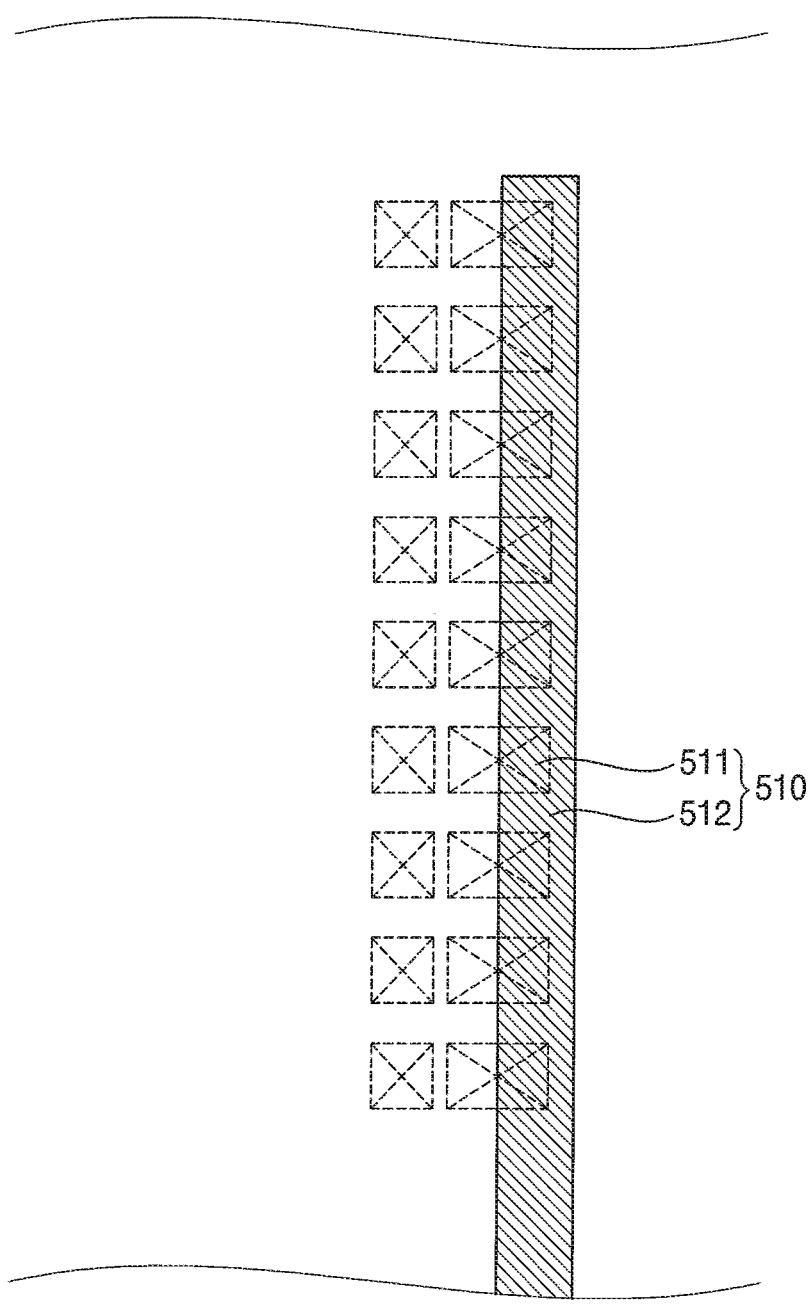
Figure 38:
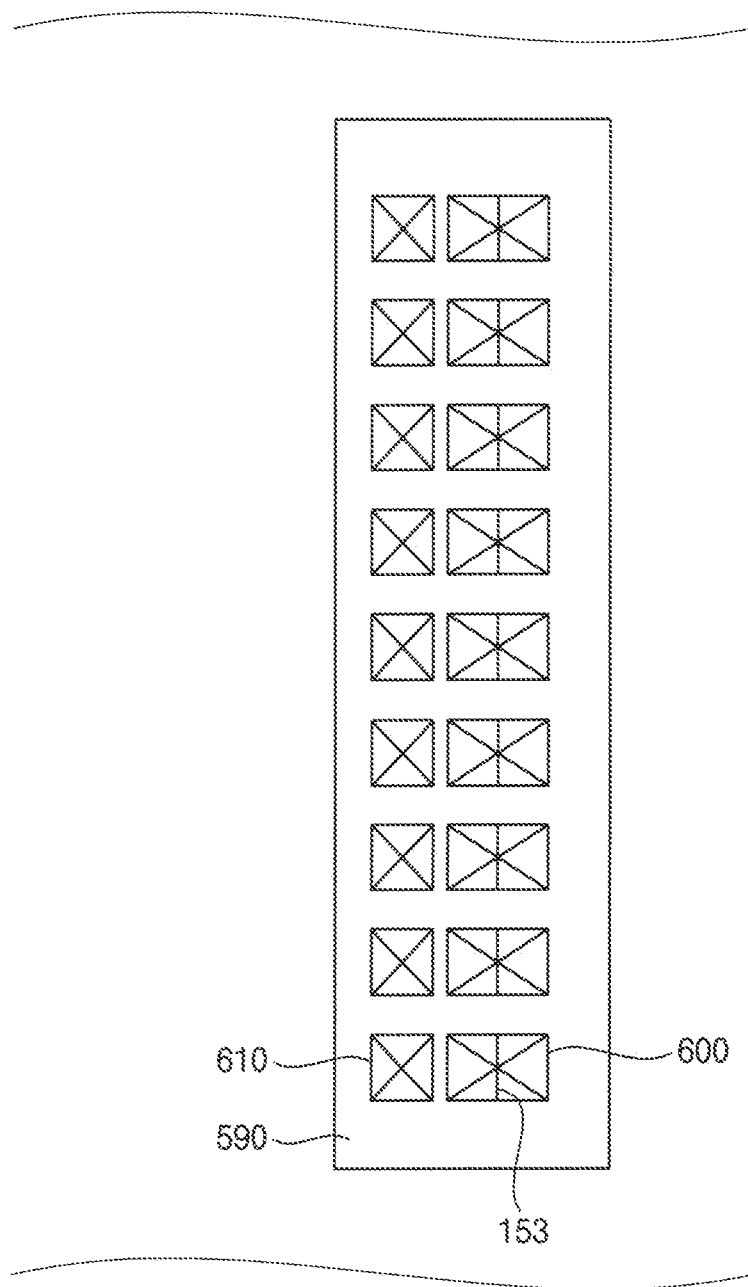

FIG. 35 is a plan view showing a display device 1200 according to embodiments. FIGS. 36 to 38 are layout views showing a lower wire 470, an upper wire 510, and a connection electrode 590 of FIG. 35, respectively. The display device 1200 illustrated in FIGS. 35 to 38 may have a configuration that is substantially identical or similar to the configuration of the display device 1000 described with reference to FIGS. 29 to 33 except for the shape of the upper wire 510 and the second contact hole 610. In FIGS. 35 to 38, redundant descriptions of components that are substantially identical or similar to the components described with reference to FIGS. 29 to 33 will be omitted.

Referring to FIGS. 35, 36, 37, and 38, the display device 1200 may include the lower wire 470, the upper wire 510, the connection pattern 590, and the like. In this case, the lower wire 470 may include a first portion 471, a second portion 472, and a third portion 473. The upper wire 510 may include a first portion 511 and a second portion 512.

The lower wire 470, the upper wire 510, and the connection pattern 590 may be disposed in the peripheral area 20 of the display device 1200. For example, as described in FIG. 1, in the peripheral area 20, the wires configured to connect the pad electrode 480 to the diodes included in the antistatic structure 630, the wires configured to connect the diodes to the light emitting structure, the wires configured to connect the diodes to the gate signal lines and the clock signal lines included in the circuit structure 620, the gate signal lines configured to apply the gate signals to the transistors included in the circuit structure 620, and the clock signal lines configured to apply the clock signals to the transistors may include the lower wire 470 and the upper wire 510. The connection pattern 590 may electrically connect the lower wire 470 to the upper wire 510 through a first contact hole 600 and a second contact hole 610.

As shown in FIGS. 35 and 36, when viewed in a plan view of the display device 1200, the third portion 473 of the lower wire 470 may have a rectangular shape, and one part of the third portion 473 may extend in the fourth direction D4. For example, the one part of the third portion 473 may extend in the fourth direction D4 so that the one part of the third portion 473 may be connected to the transistor of the circuit structure 620, the clock signal line and the gate signal line, or the diode of the antistatic structure 630. A portion of the lower wire 470 that is located in the first contact hole 600 and does not overlap the upper wire 510 may be defined as the first portion 471. A portion of the lower wire 470 that is located in the first contact hole 600 and overlaps the upper wire 510 may be defined as the second portion 472. Therefore, a remaining portion of the lower wire 470 except for a portion where the first contact hole 600 is located, e.g., the first portion 471 and the second portion 472, may be defined as the third portion 473.

As shown in FIGS. 35 and 37, the upper wire 510 may be disposed on the lower wire 470. When viewed in a plan view of the display device 1200, the second portion 512 of the upper wire 510 may have a rectangular shape, and may extend in the second direction D2. For example, the upper wire 510 extending in the second direction D2 may be connected to the pad electrode 480. The upper wire 510 located in the first contact hole 600 may be defined as the first portion 511, and the first portion 511 may correspond to a portion that overlaps the lower wire 470 (or a portion exposed by the first contact hole 600). Therefore, a remaining portion of the upper wire 510 except for a portion where the first contact hole 600 is located, e.g., the first portion 511, may be defined as the second portion 512.

As shown in FIGS. 35 and 38, the connection pattern 590 may be disposed on the upper wire 510. The connection pattern 590 may electrically connect the lower wire 470 to the upper wire 510 through the first contact hole 600, and may be electrically connected to the lower wire 470 through the second contact hole 610. In the embodiments, the connection pattern 590 may have an opening 153 at a boundary between the first portion 511 of the upper wire 510 and the first portion 471 of the lower wire 470 in the first contact hole 600. Due to the opening 153, a current may not flow through the connection pattern 590 in the first direction D1 within the first contact hole 600, but the current may flow through a first path a1 and a second path a2 as shown in FIG. 5. Accordingly, even when the opening 153 is formed in the connection pattern 590, the lower wire 470 and the upper wire 510 may be electrically connected to each other by the connection pattern 590.

In the display device 1200 according to the embodiments, the upper wire 510 may overlap the lower wire 470 in portions where the first contact hole 600 is formed, and the connection pattern 590 may be electrically connected to each of the lower wire 470 and the upper wire 510 through one contact hole, e.g., the first contact hole 600. In addition, the connection pattern 590 may be electrically connected to the lower wire 470 through the second contact hole 610 formed in the third portion 473 of the lower wire 470. In addition, since the display device 1200 includes a plurality of first contact holes 600 and a plurality of second contact holes 610, the contact resistance between the connection pattern 590 and the lower and upper wires 470 and 510 may be further reduced.

Figure 39:
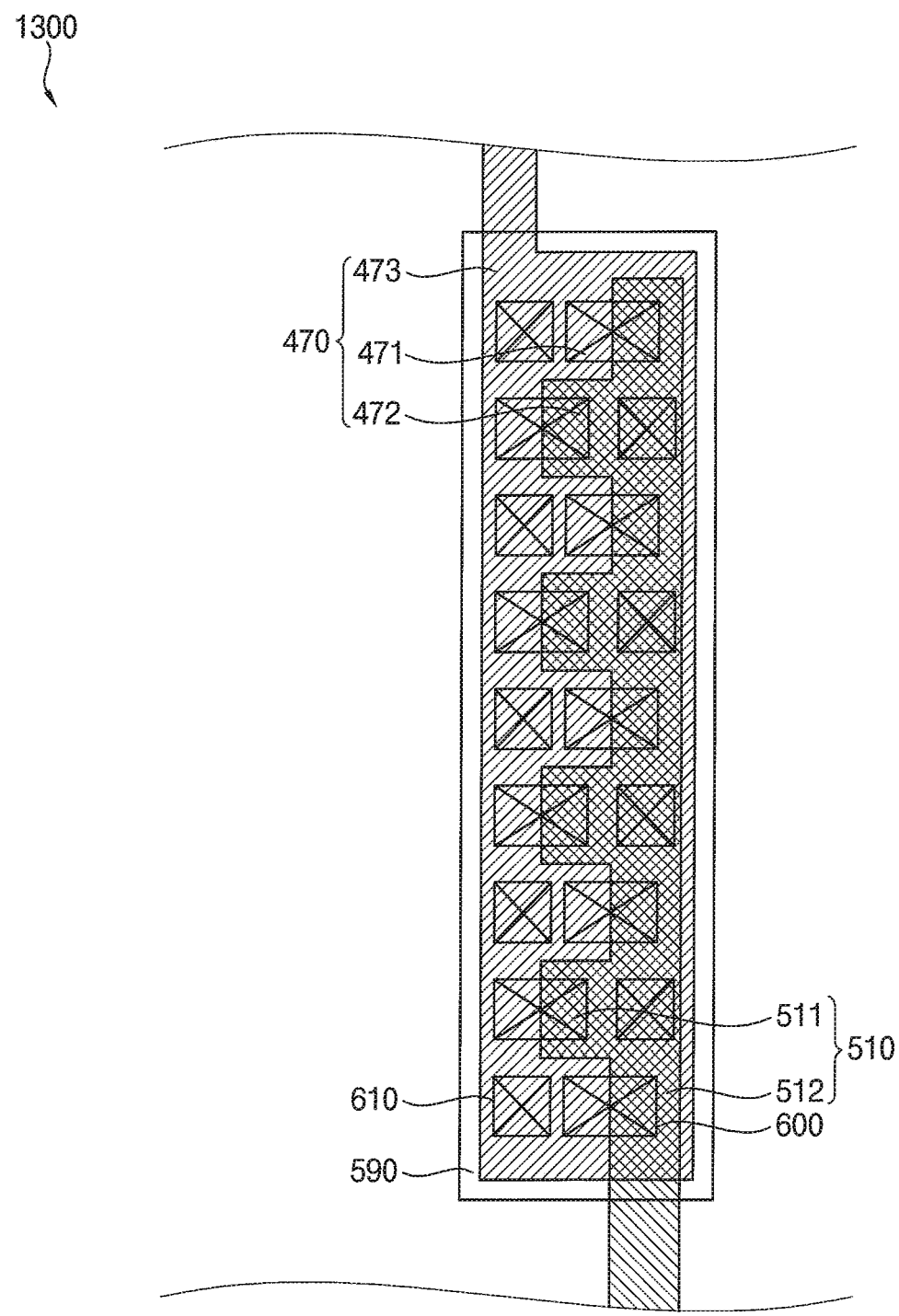
FIG. 39 is a plan view showing a display device according to embodiments.
Figure 41:
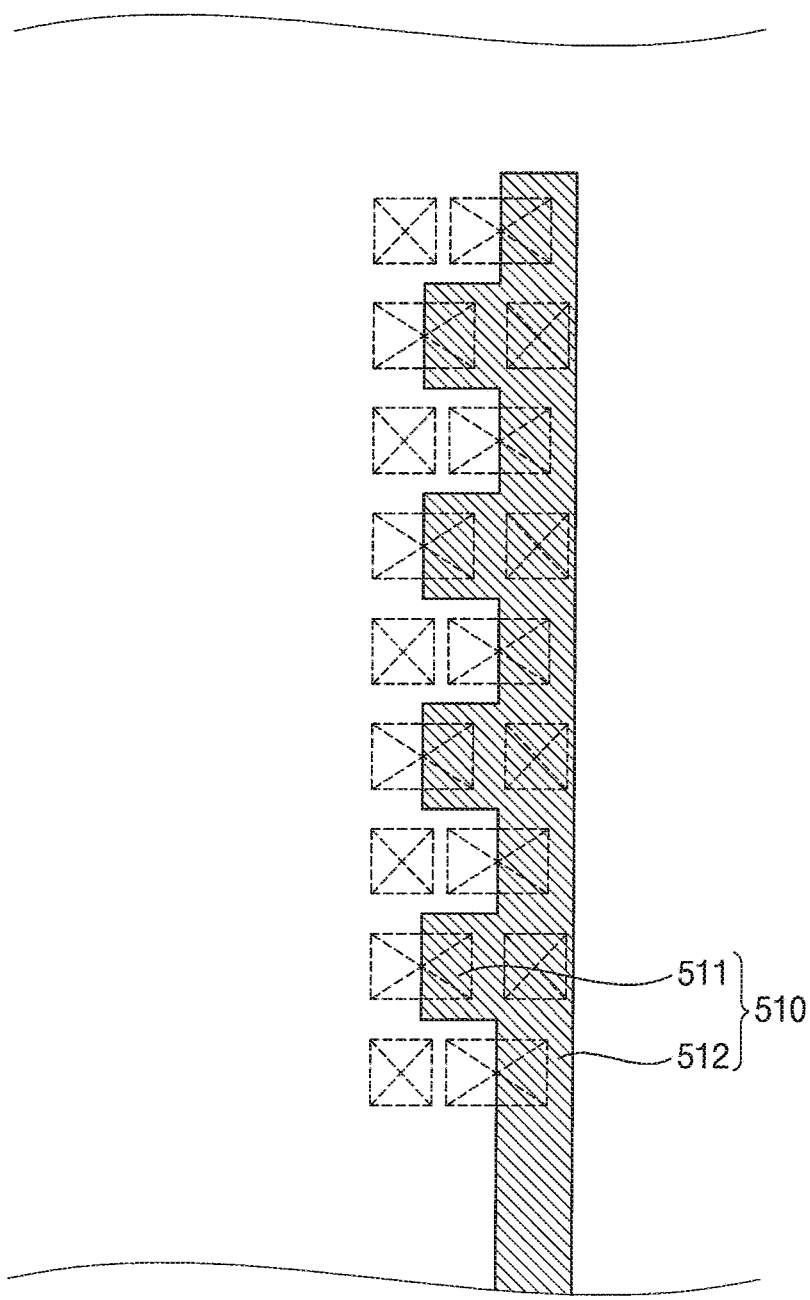
Figure 42:
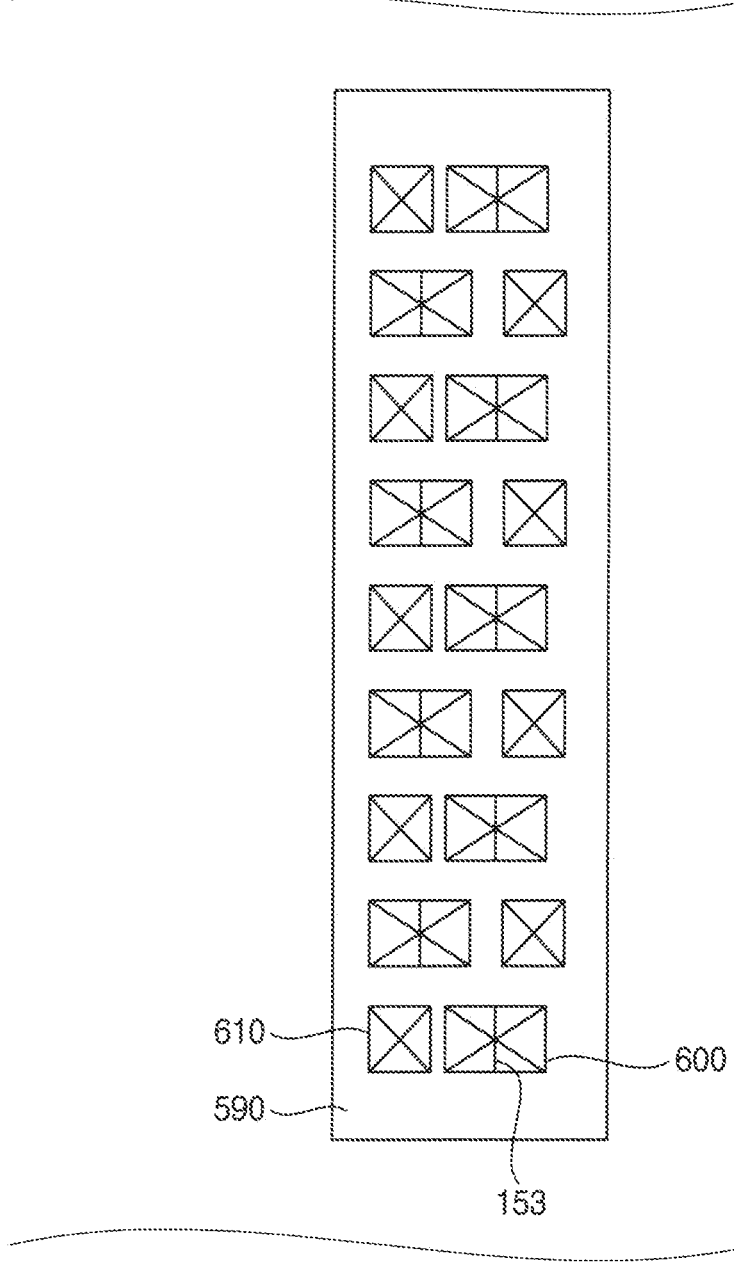

FIG. 39 is a plan view showing a display device 1300 according to embodiments. FIGS. 40 to 42 are layout views showing a lower wire 470, an upper wire 510, and a connection electrode 590 of FIG. 39, respectively. The display device 1300 illustrated in FIGS. 39 to 42 may have a configuration that is substantially identical or similar to the configuration of the display device 1200 described with reference to FIGS. 35 to 38 except for the first contact hole 600 and the second contact hole 610. In FIGS. 39 to 42, redundant descriptions of components that are substantially identical or similar to the components described with reference to FIGS. 35 to 38 will be omitted.

Referring to FIGS. 39, 40, 41, and 42, the display device 1300 may include the lower wire 470, the upper wire 510, the connection pattern 590, and the like. In this case, the lower wire 470 may include a first portion 471, a second portion 472, and a third portion 473. The upper wire 510 may include a first portion 511 and a second portion 512.

As shown in FIGS. 39 and 40, when viewed in a plan view of the display device 1300, the third portion 473 of the lower wire 470 may have a rectangular shape, and one part of the third portion 473 may extend in the fourth direction D4. A portion of the lower wire 470 that is located in the first contact hole 600 and does not overlap the upper wire 510 may be defined as the first portion 471. A portion of the lower wire 470 that is located in the first contact hole 600 and overlaps the upper wire 510 may be defined as the second portion 472. Therefore, a remaining portion of the lower wire 470 except for a portion where the first contact hole 600 is located, e.g., the first portion 471 and the second portion 472, may be defined as the third portion 473.

As shown in FIGS. 39 and 41, the upper wire 510 may be disposed on the lower wire 470. When viewed in a plan view of the display device 1300, the second portion 512 of the upper wire 510 may have a rectangular shape, may extend in the second direction D2, and may have a protrusion protruding in the third direction D3. The upper wire 510 located in the first contact hole 600 may be defined as the first portion 511, and the first portion 511 may correspond to a portion that overlaps the lower wire 470 (or a portion exposed by the first contact hole 600). Therefore, a remaining portion of the upper wire 510 except for a portion where the first contact hole 600 is located, e.g., the first portion 511, may be defined as the second portion 512.

As shown in FIGS. 39 and 42, the connection pattern 590 may be disposed on the upper wire 510. The connection pattern 590 may electrically connect the lower wire 470 to the upper wire 510 through the first contact hole 600, and may be electrically connected to the lower wire 470 through the second contact hole 610. In the embodiments, the connection pattern 590 may have an opening 153 at a boundary between the first portion 511 of the upper wire 510 and the first portion 471 of the lower wire 470 in the first contact hole 600. Due to the opening 153, a current may not flow through the connection pattern 590 in the first direction D1 within the first contact hole 600, but the current may flow through a first path a1 and a second path a2 as shown in FIG. 5. Accordingly, even when the opening 153 is formed in the connection pattern 590, the lower wire 470 and the upper wire 510 may be electrically connected to each other by the connection pattern 590.

When compared with the connection pattern 590 of FIG. 38, first contact holes 600 and second contact holes 610 may be alternately arranged in the connection pattern 590 of FIG. 42. Accordingly, since the upper wire 510 of FIG. 41 includes the protrusion, the upper wire 510 of FIG. 41 may overlap the first contact holes 600 that are alternately arranged.

The inventive concept may be applied to various electronic devices including a display device. For example, the inventive concept may be applied to numerous electronic devices such as a vehicle-display device, a ship-display device, an aircraft-display device, portable communication devices, display devices for display or for information transfer, a medical-display device, etc.

The foregoing is illustrative of embodiments and is not to be construed as limiting. Although a few embodiments have been described, those skilled in the art will readily appreciate that many modifications are possible in the embodiments without materially departing from the novel teachings and features of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
 a lower substrate including a display area and a peripheral area;
 a light emitting structure disposed in the display area on the lower substrate;
 a lower wire disposed in the peripheral area on the lower substrate;
 an upper wire disposed in the peripheral area on the lower wire and partially overlapping the lower wire;
 an insulating layer structure including a first contact hole that exposes a first portion of the upper wire which overlaps the lower wire along a first direction parallel to a top surface of the lower substrate and a first portion of the lower wire which is disposed adjacent to a portion of the lower wire that overlaps the upper wire in a plan view; and
 a connection pattern disposed on the insulating layer structure, the lower wire, and the upper wire, and electrically connecting the upper wire to the lower wire, the connection pattern including a first portion disposed in the first contact hole and a second portion disposed to surround the first contact hole,
 wherein the upper wire includes a protrusion portion which protrudes out of the insulating layer structure to form an undercut portion disposed under the protrusion portion in the insulating layer structure, wherein the lower wire and the upper wire are not connected to each other via the first portion of the connection pattern, and wherein the lower wire and the upper wire are connected to each other via the second portion of the connection pattern.

2. The display device of claim 1, wherein the insulating layer structure includes:
a gate insulating layer disposed on the lower substrate, and including a first opening that exposes the first portion of the lower wire; and
an interlayer insulating layer disposed on the gate insulating layer, and including a second opening that exposes the first portion of the upper wire and the first portion of the lower wire.

3. The display device of claim 2, wherein the first opening exposes a part of a bottom surface of the first portion of the upper wire.

4. The display device of claim 2, wherein the first opening and the second opening are connected each other to form the first contact hole of the insulating layer structure.

5. The display device of claim 2, wherein the lower wire further includes:
a second portion covered with the gate insulating layer, and overlapping the upper wire; and
a third portion covered with the gate insulating layer, and spaced apart from the second portion of the lower wire in a first direction parallel to a top surface of the lower substrate.

6. The display device of claim 5, wherein the first and second portions of the lower wire are located inside the first contact hole, and
the third portion is located outside the first contact hole.

7. The display device of claim 5, wherein, when viewed in a sectional view of the display device, the first portion of the lower wire protrudes from the third portion of the lower wire in a third direction opposite to the first direction, and the second portion of the lower wire protrudes from the first portion of the lower wire in the third direction.

8. The display device of claim 5, wherein the upper wire further includes a second portion covered with the interlayer insulating layer, and
the connection pattern is disposed on a top surface of the interlayer insulating layer disposed on a portion under which the second portion of the upper wire is located, the first portion of the upper wire, the first portion of the lower wire, and a top surface of the interlayer insulating layer disposed on a portion under which the third portion of the lower wire is located.

9. The display device of claim 8, wherein the connection pattern has a disconnected portion at a boundary between the first portion of the upper wire and the first portion of the lower wire in the first contact hole.

10. The display device of claim 8, wherein, when viewed in a sectional view of the display device, the first portion of the upper wire protrudes from the second portion of the upper wire in the first direction.

11. The display device of claim 5, wherein the insulating layer structure further includes a second contact hole spaced apart from the first contact hole in the first direction.

12. The display device of claim 11, wherein the second contact hole overlaps the third portion of the lower wire.

13. The display device of claim 11, wherein the connection pattern is electrically connected to the third portion of the lower wire through the second contact hole.

14. The display device of claim 1, wherein the connection pattern includes:
a first connection pattern located on the first portion of the upper wire; and
a second connection pattern located on the first portion of the lower wire, and
the first connection pattern and the second connection pattern are disposed to be spaced apart from each other in the first contact hole.

15. The display device of claim 1, wherein a size of the connection pattern is greater than a size of the first contact hole.

16. The display device of claim 1, wherein, when viewed in a plan view of the display device, the connection pattern extends to an outer periphery of the first contact hole to cover the first contact hole.

17. The display device of claim 1, wherein the connection pattern includes a disconnected portion in the first contact hole.

18. The display device of claim 1, further comprising a semiconductor element disposed between the light emitting structure and the lower substrate in the display area of the lower substrate,
wherein the semiconductor element includes:
a gate electrode disposed on the lower substrate;
an active layer disposed on the gate electrode;
a source electrode contacting a first portion of the active layer; and
a drain electrode contacting a second portion of the active layer,
wherein the lower wire is located on a same layer as the gate electrode, and
wherein the upper wire is located on a same layer as the source and drain electrodes.

19. The display device of claim 18, wherein the active layer includes amorphous silicon.

20. The display device of claim 1, further comprising an active pattern disposed between the upper wire and the lower wire, and contacting a bottom surface of the upper wire.

* * * * *